United States Patent
Cho

(10) Patent No.: US 9,513,702 B2
(45) Date of Patent: Dec. 6, 2016

(54) MOBILE TERMINAL FOR VEHICULAR DISPLAY SYSTEM WITH GAZE DETECTION

(71) Applicant: LG ELECTRONICS INC., Seoul (KR)

(72) Inventor: Kyoungmin Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 34 days.

(21) Appl. No.: 14/280,162

(22) Filed: May 16, 2014

(65) Prior Publication Data

US 2015/0015479 A1    Jan. 15, 2015

(30) Foreign Application Priority Data

Jul. 15, 2013  (KR) .................. 10-2013-0083062
Jul. 15, 2013  (KR) .................. 10-2013-0083064

(51) Int. Cl.
| | |
|---|---|
| G06F 3/01 | (2006.01) |
| B60K 35/00 | (2006.01) |
| G06F 3/14 | (2006.01) |
| B60W 50/00 | (2006.01) |
| B60W 50/14 | (2012.01) |

(52) U.S. Cl.
CPC .............. G06F 3/013 (2013.01); B60K 35/00 (2013.01); G06F 3/1423 (2013.01); B60W 2050/0064 (2013.01); B60W 2050/146 (2013.01); G09G 2380/10 (2013.01)

(58) Field of Classification Search
CPC .......... G06F 3/01; G06F 3/011; G06F 3/012; G06F 3/013; B60K 2350/00–2350/967
See application file for complete search history.

(56) References Cited

U.S. PATENT DOCUMENTS

| | | | |
|---|---|---|---|
| 6,545,669 B1 | 4/2003 | Kinawi et al. | |
| 8,953,841 B1 * | 2/2015 | Leblang et al. | 382/103 |
| 9,317,759 B2 * | 4/2016 | Inada | B60K 35/00 |
| 9,383,579 B2 * | 7/2016 | Madau | A61B 5/18 |
| 2003/0169306 A1 * | 9/2003 | Makipaa et al. | 345/864 |
| 2008/0284615 A1 | 11/2008 | Tauchi et al. | |
| 2010/0131307 A1 * | 5/2010 | Collopy et al. | 705/4 |
| 2010/0220250 A1 * | 9/2010 | Vanderwall et al. | 348/837 |
| 2010/0315438 A1 * | 12/2010 | Horodezky et al. | 345/661 |
| 2012/0092253 A1 * | 4/2012 | Irani | G06F 1/1692 345/157 |

(Continued)

FOREIGN PATENT DOCUMENTS

| | | |
|---|---|---|
| EP | 1 971 143 A1 | 9/2008 |
| EP | 2642250 A2 | 9/2013 |

(Continued)

OTHER PUBLICATIONS

Poitschke et al., "Gaze-based interaction on multiple displays in an automotive environment", Systems, Man, and Cybernetics (SMC), 2011 IEEE International Conference on, IEEE, Oct. 9, 2011, pp. 543-548, XP031999555.

*Primary Examiner* — Gene W Lee
(74) *Attorney, Agent, or Firm* — Birch, Stewart, Kolasch & Birch, LLP

(57) ABSTRACT

A mobile terminal including a terminal body; a display unit; a wireless communication unit configured to be wirelessly connected to an in-vehicle video display apparatus; and a controller configured to detect a directional change of a driver's eyes from a first display to a second display included in the in-vehicle video display apparatus, and control the second display to display at least a portion of a first screen displayed on the first display, in response to the detected directional change of the driver's eyes from the first display to the second display.

15 Claims, 34 Drawing Sheets

(56) References Cited

U.S. PATENT DOCUMENTS

| | | | |
|---|---|---|---|
| 2013/0097557 A1* | 4/2013 | Madau | A61B 5/18 715/810 |
| 2013/0314503 A1* | 11/2013 | Nix et al. | 348/46 |
| 2014/0015849 A1* | 1/2014 | Miyake et al. | 345/593 |
| 2014/0033142 A1* | 1/2014 | Ding | 715/867 |
| 2014/0062880 A1* | 3/2014 | Saint-Requier et al. | 345/158 |
| 2014/0129082 A1* | 5/2014 | Takahashi | B60R 1/12 701/36 |
| 2014/0258441 A1* | 9/2014 | L'Heureux et al. | 709/217 |
| 2015/0010207 A1* | 1/2015 | Inada | B60K 35/00 382/103 |

FOREIGN PATENT DOCUMENTS

| | | |
|---|---|---|
| JP | 2009-3595 A | 1/2009 |
| WO | WO 2006/006689 A1 | 1/2006 |
| WO | WO 2013/101044 A1 | 7/2013 |

* cited by examiner

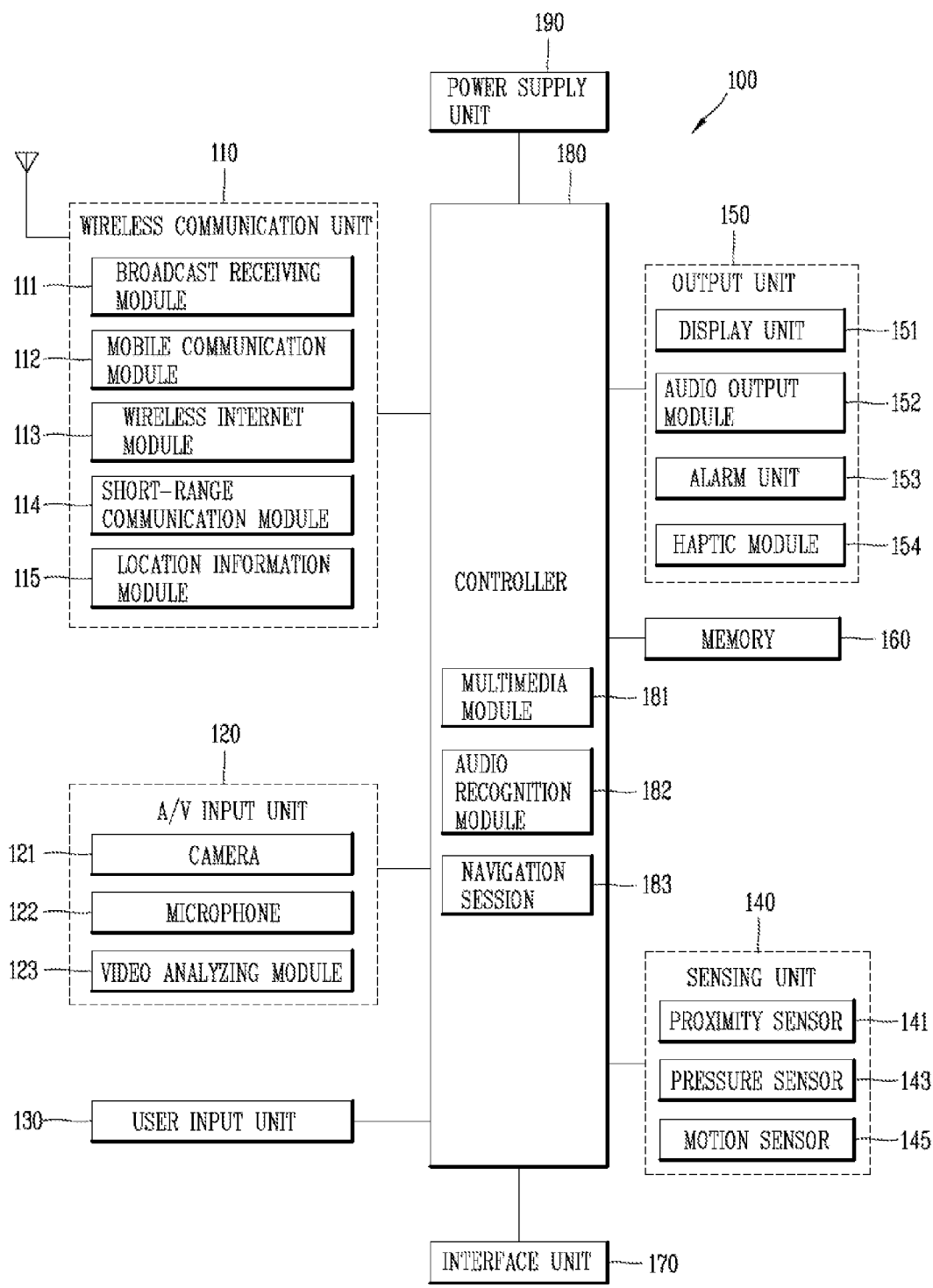

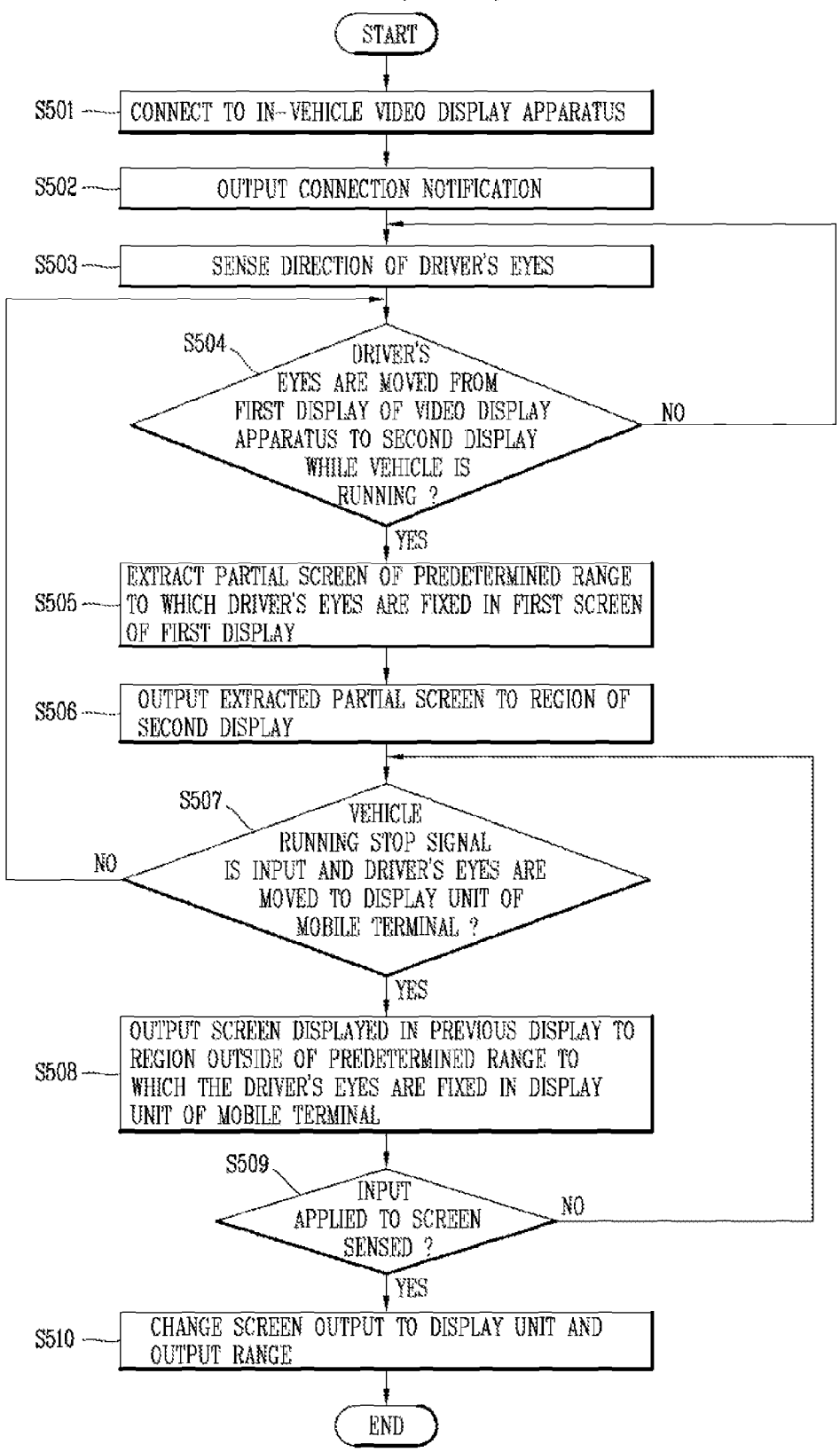

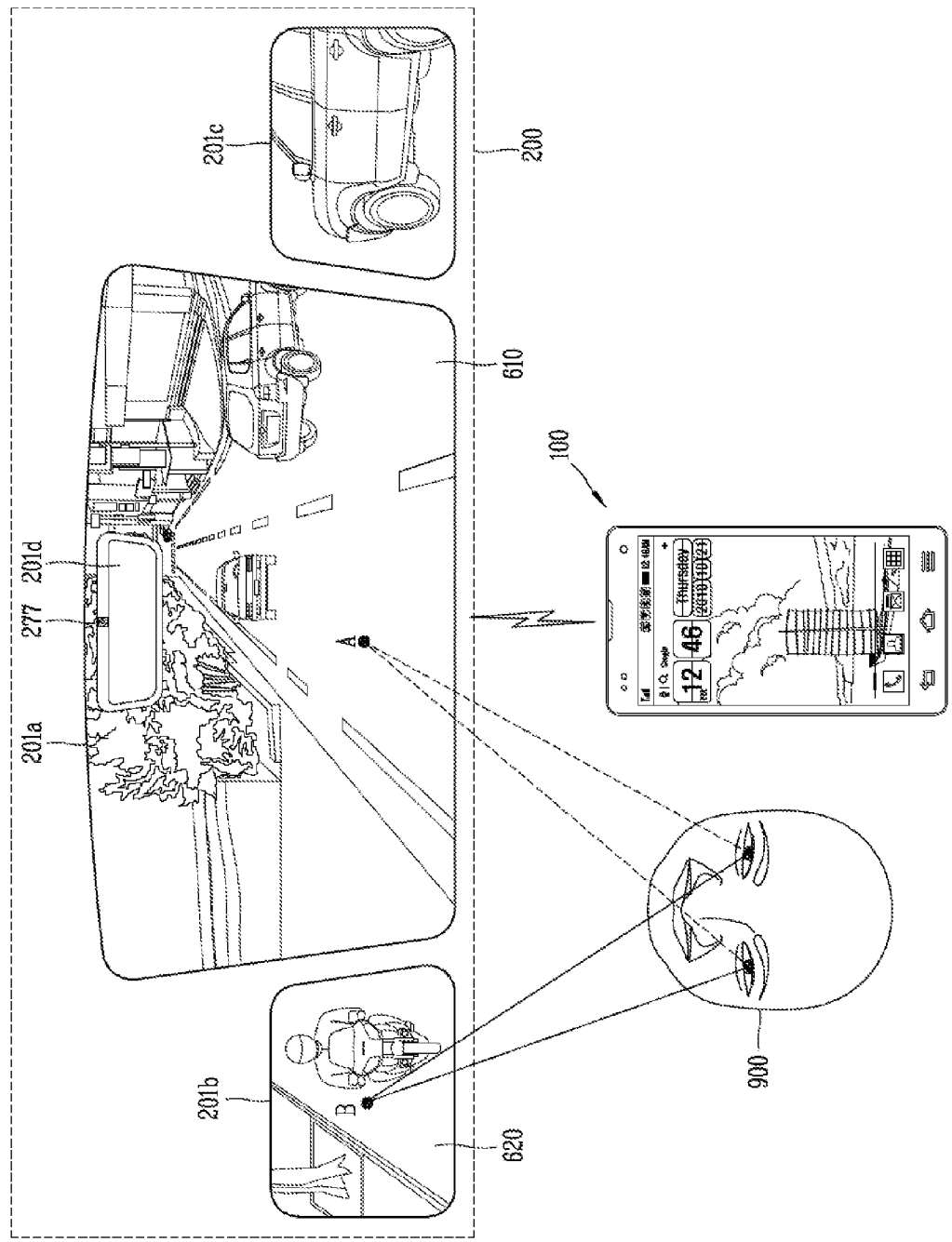

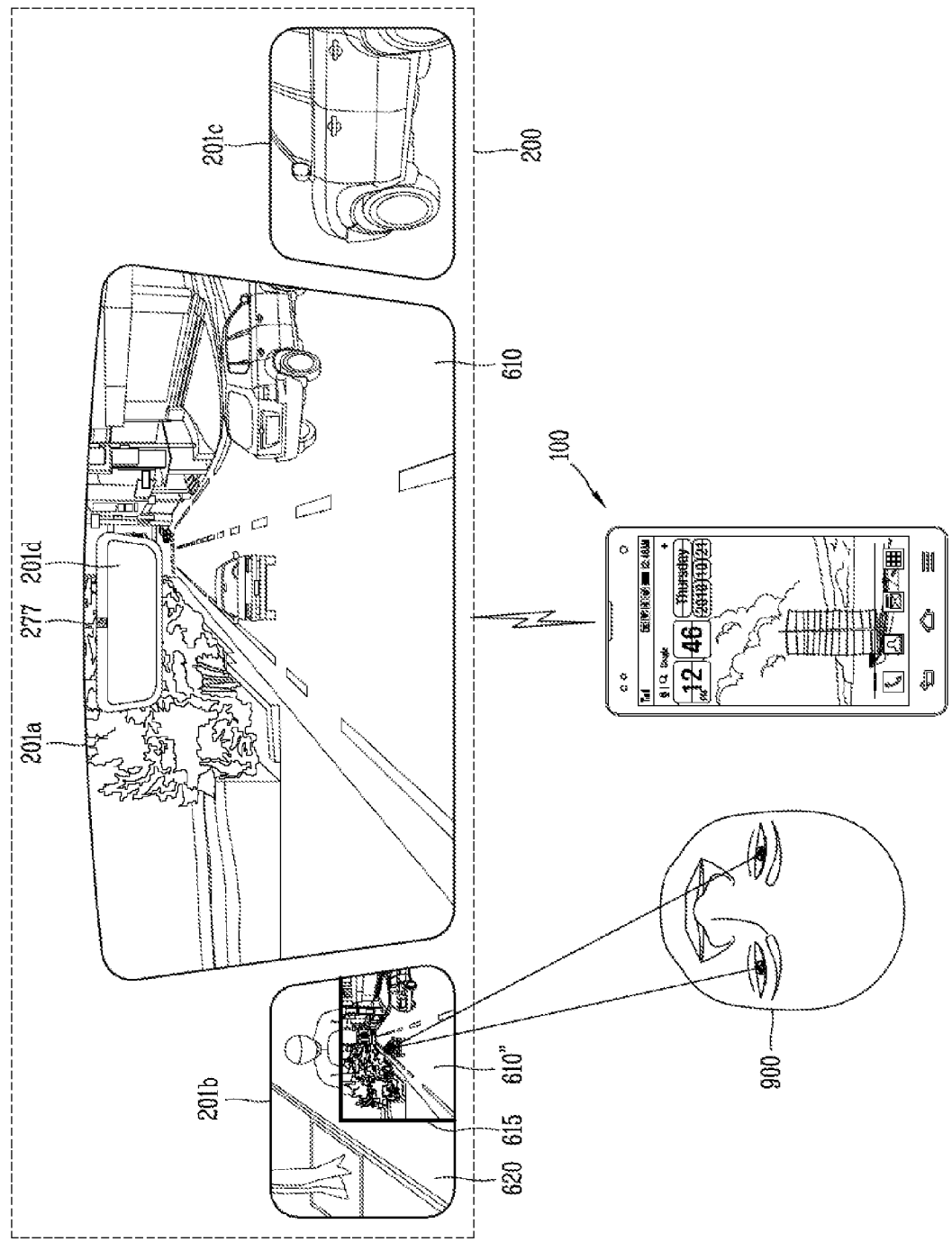

FIG. 9
(a) 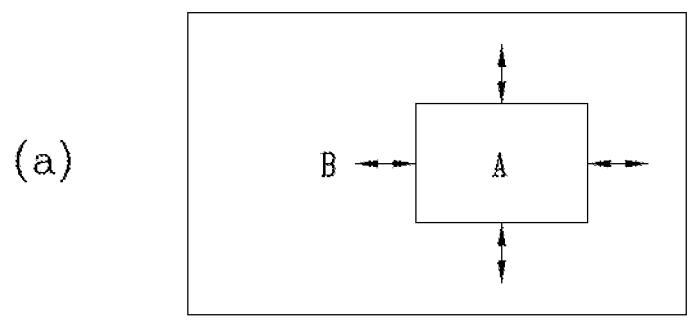
(b) 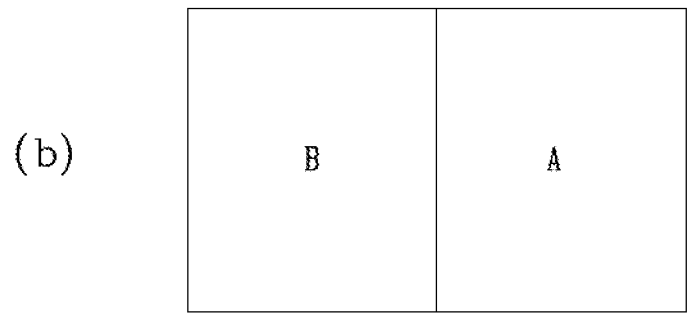

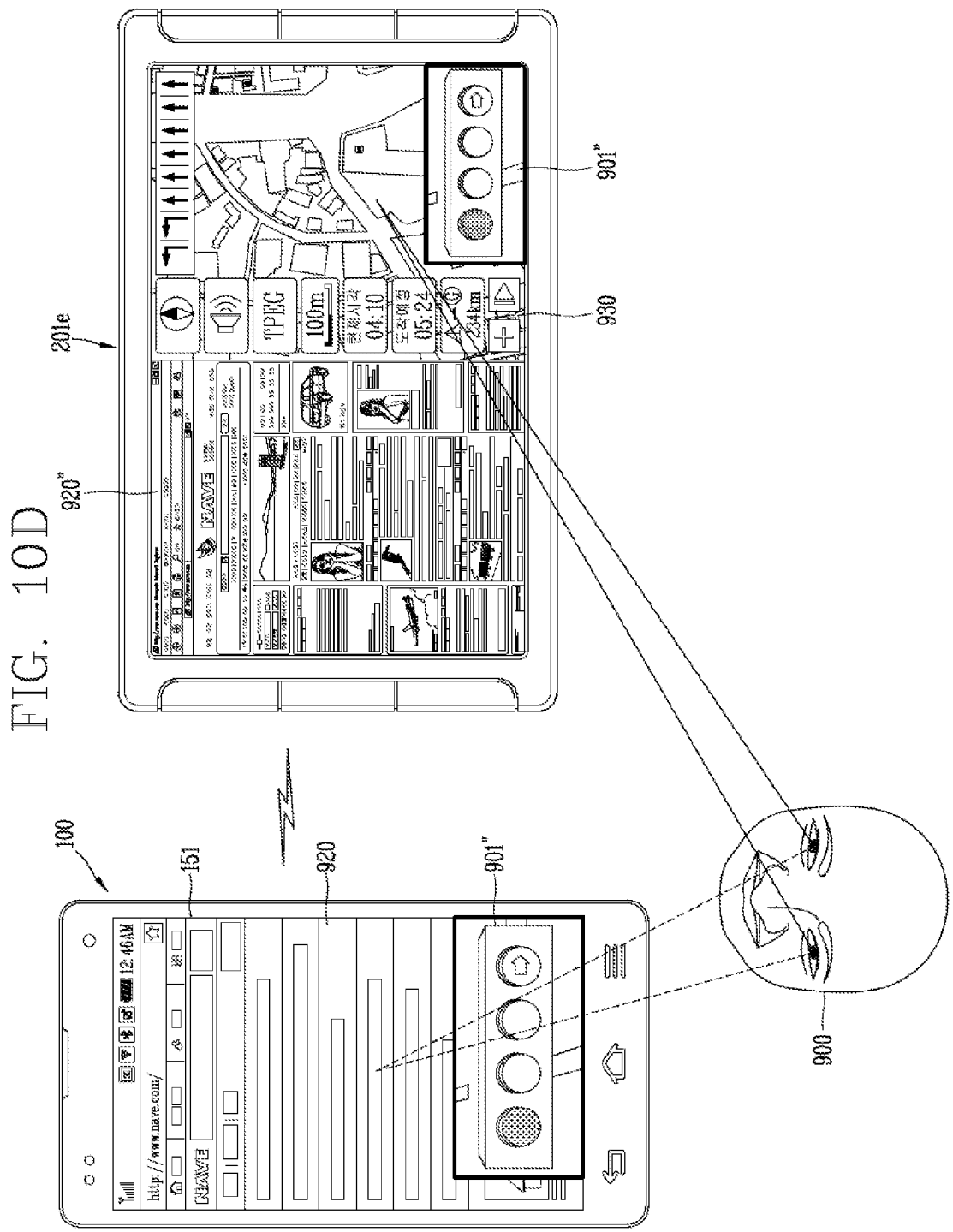

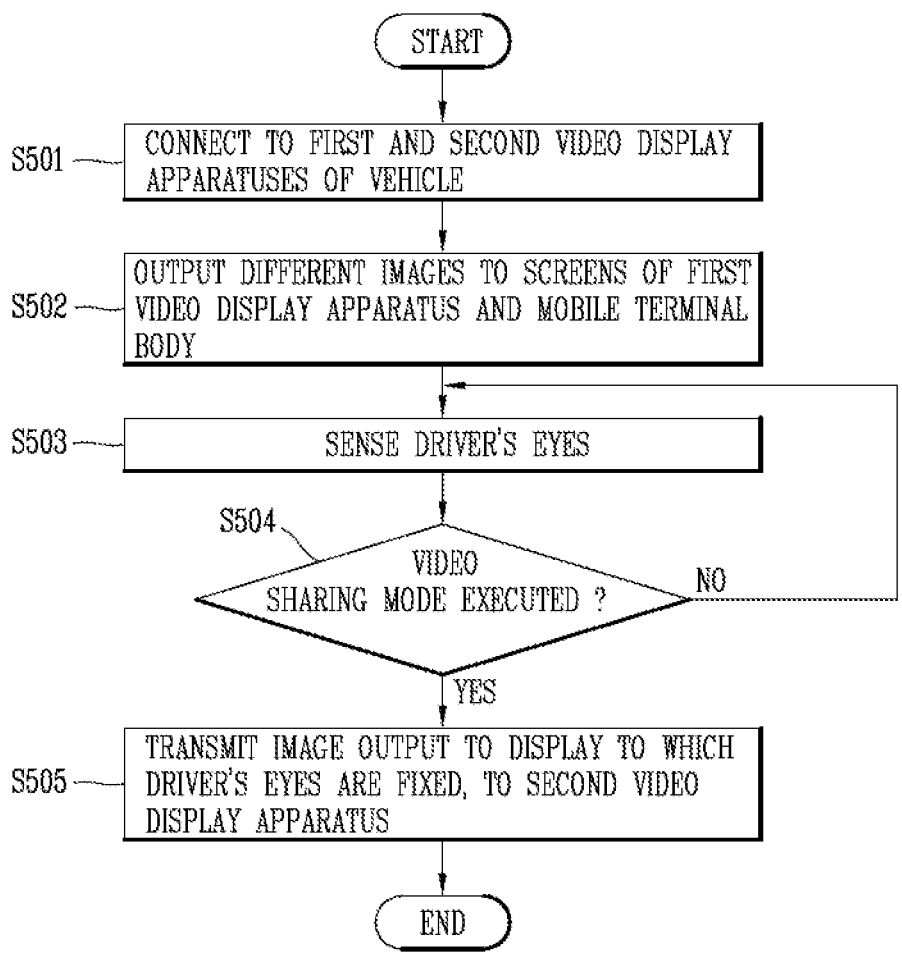

FIG. 19C
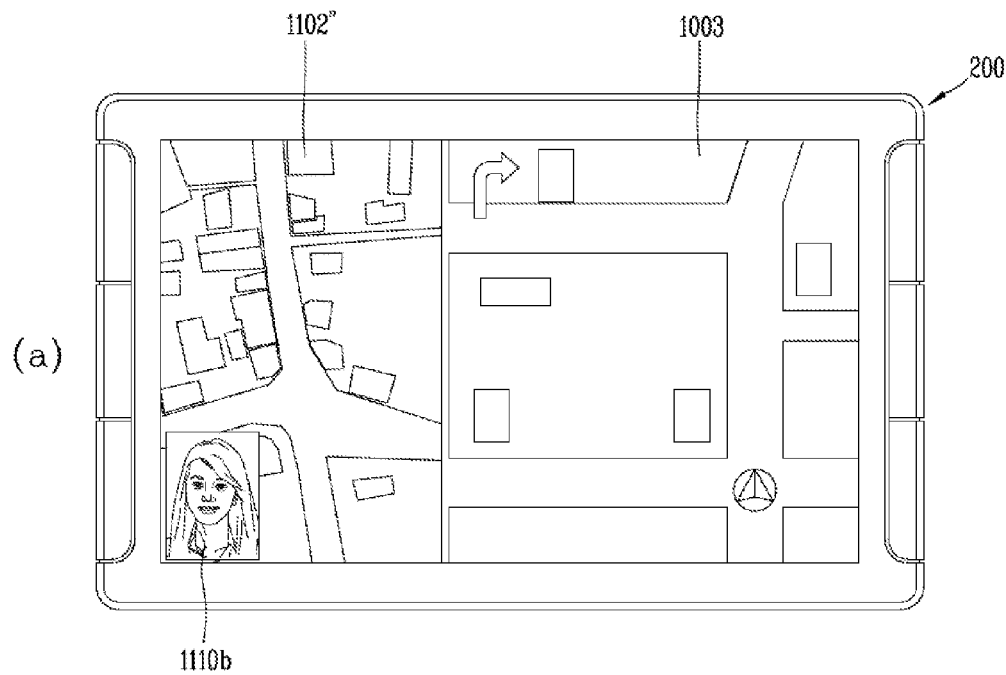
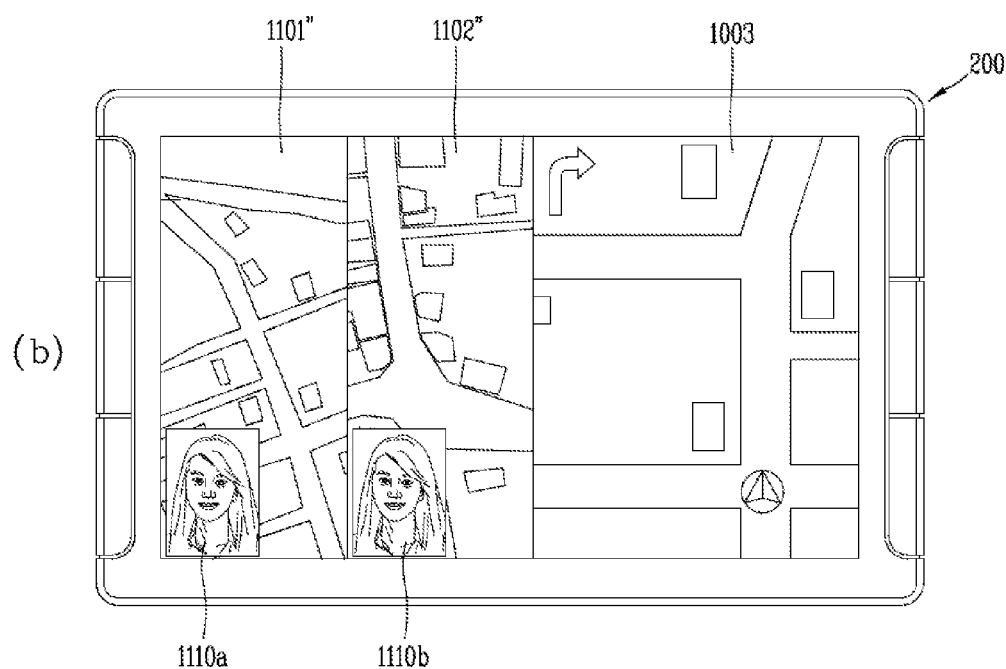

MOBILE TERMINAL FOR VEHICULAR DISPLAY SYSTEM WITH GAZE DETECTION

CROSS REFERENCE TO RELATED APPLICATIONS

Pursuant to 35 U.S.C. §119(a), this application claims the benefit of earlier filing date and right of priority to Korean Application No. 10-2013-0083062 filed on Jul. 15, 2013 and right of priority to Korean Application No. 10-2013-0083064 filed on Jul. 15, 2013 the contents of which is incorporated by reference herein in its entirety.

BACKGROUND OF THE INVENTION

1. Field of the Invention

The present invention relates to a mobile terminal and a control method thereof, and more particularly, to a mobile terminal that may be connected to a video display apparatus placed in a vehicle, and a control method thereof.

2. Description of the Related Art

In general, terminals may be divided into a mobile terminal and stationary terminal. In addition, mobile terminals may be divided into a handheld terminal and a vehicle mounted terminal.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device. Meanwhile, a terminal may be connected to a video display apparatus disposed in a vehicle (hereinafter, referred to as an 'in-vehicle video display apparatus') to display content. Here, the in-vehicle video display apparatus may include any apparatus installed in a fixed type apparatus or a detachable apparatus and having a function of imaging the exterior of a vehicle through a camera for a driver's convenience, guiding a vehicle to a destination, and outputting an image and a sound allowing a user to view and listen to.

An in-vehicle video display apparatus is generally attached to a dash board positioned in front of a driver's seat, and it may be designated as a head unit (H/U), for example. In this manner, as in-vehicle video display apparatuses have been digitalized and functions of mobile terminals have been diversified, services interworking between head units and mobile terminals have been increasingly developed. For example, a navigation application or a service screen of a mobile terminal may be displayed in the same manner in a display of a head unit within a vehicle, or a mobile terminal may be manipulated by a head unit.

However, for safe driving, manipulations to control an application or a service screen as mentioned above through a head unit and a mobile terminal are limited while a vehicle is running.

SUMMARY OF THE INVENTION

An aspect of the present invention is to provide a mobile terminal capable of controlling an output of a screen displayed on a video display apparatus placed in a vehicle according to a direction of driver's eyes without interfering with driving, and a control method thereof.

An aspect of the present invention is also to provide a mobile terminal capable of outputting video, which is displayed on a display to which driver's eyes are fixed, to a different video display apparatus within a vehicle to allow a fellow passenger to share the video the driver is viewing, and a control method thereof.

According to an embodiment of the present invention, there is provided a mobile terminal including: a terminal body; a wireless communication unit connected to an in-vehicle video display apparatus; a user tracking unit configured to detect a direction of driver's eyes based on an image of the driver captured based on a first display of the connected in-vehicle video display apparatus and an image of the driver captured based on a second display of the connected in-vehicle video display apparatus; and a controller configured to control the wireless communication unit to display at least a portion of a first screen displayed on the first display, in a region of the second display, in response to the detected movement of the driver's sights from the first display to the second display.

In an embodiment of the present invention, the first and second displays may be connected a plurality of cameras detachably disposed in a vehicle, and the plurality of cameras may simultaneously obtain an image of the driver present within a predetermined range based on each of the displays and an external image of the vehicle.

In an embodiment of the present invention, the controller may provide control to extract a partial screen to which the driver's eyes were fixed in the first screen, and display the extracted partial screen in a region of the second display.

In an embodiment of the present invention, in response to the detected movement of the driver's eyes from the first display to the second display, the controller may request transmission of the first screen displayed on the first display from the in-vehicle video display apparatus in real time, and control the wireless communication unit to display the first screen received according to the request in a region of the second display in real time.

In an embodiment of the present invention, in response to a detected movement of the driver's eyes from the second display to the first display, the controller may provide control such that the first screen output to a region of the second display disappears and at least a portion of the second screen displayed on the second display is output to a region of the first display.

In an embodiment of the present invention, in response to a detected movement of the driver's eyes from the first display to a display unit of the terminal body, the controller may provide control to output at least a portion of the first screen output to the first display, to a region of the display unit to which the driver's eyes are fixed.

In an embodiment of the present invention, when a vehicle running stop signal is input and the driver's eyes are moved to the display unit, the controller may provide control such that at least a portion of the first screen is output to a region of the display unit.

In an embodiment of the present invention, when an operating state of a signal lamp included in an image obtained by a front camera within the vehicle is recognized as indicating 'stop', the controller may determine that the vehicle running stop signal has been input.

In an embodiment of the present invention, when an operating state of the signal lamp included in the image obtained by the front camera within the vehicle is changed from 'stop' to 'operation', the controller may determine that a vehicle running resume signal has been input, and output a warning notification to the display unit.

In an embodiment of the present invention, when a first input applied to the first screen output to the display unit in a pre-set direction is sensed, the controller may control an output range of the first screen to be changed to correspond to the first input.

In an embodiment of the present invention, when a second input applied to the first screen output to the display unit in a pre-set direction is sensed, the controller may provide control such that a screen displayed on a different display of the connected in-vehicle video display apparatus and the first screen are output to the display unit together.

In an embodiment of the present invention, when the driver's eyes to the display unit are not sensed for a pre-set period of time, the controller may provide control such that the first screen disappears from the display unit, and outputs an indicator icon for outputting the first screen again to a region of the display unit.

According to another embodiment of the present invention, there is provided a mobile terminal including: a terminal body; a wireless communication unit connected to first and second video display apparatuses; a user tracking unit configured to sense a direction of driver's eyes within a predetermined range based on the connected first video display apparatus and a display unit of the terminal body; and a controller configured to control the wireless communication unit to transmit an image corresponding to the detected direction of the driver's eyes among a first image displayed on a display of the first video display apparatus and a second image displayed on the display unit to the connected second video display apparatus, when a video sharing mode is executed.

In an embodiment of the present invention, when the detected driver's eyes are fixed to the second image, the controller may transmit a message inquiring whether to display the second image to the second video display apparatus, and when a response signal with respect to the transmitted message is received, the controller may provide control to transmit the second image to the second video display apparatus in real time.

In an embodiment of the present invention, the controller may receive an updated image obtained by including a predetermined input in the transmitted image from the second video display apparatus, and when a video sharing accept signal is received, the controller may control the wireless communication unit to transmit the received updated image to the first video display apparatus.

In an embodiment of the present invention, when the video sharing mode is executed, the controller may receive a content image transmitted from the second video display apparatus, and when a video sharing accept signal is received from the first video display apparatus, the controller may control the wireless communication unit to display an image object corresponding to the content image on a display of the first video display apparatus.

In an embodiment of the present invention, the image object corresponding to the content image may include at least one of a representative image of the content image and a user imago of the second video display apparatus.

In an embodiment of the present invention, in a state in which the image object corresponding to the content image is displayed on the display of the first video display apparatus, when the driver's eyes are fixed to the image object for a pre-set period of time, the controller may control the wireless communication unit to change the image object into the content image and display the same.

In an embodiment of the present invention, in a state in which the image object corresponding to the content image is displayed on the display of the first video display apparatus, when a lock function is activated, the controller may control the wireless communication unit to continuously display the content image on the display of the first video display apparatus.

In an embodiment of the present invention, in a state in which the image object corresponding to the content image is displayed on the display of the first video display apparatus, when a request for sharing a new image is received from the second video display apparatus, the controller may control the wireless communication unit to output a notification message corresponding to the request for sharing a new image to a region discriminated from a region in which the content image is displayed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 3 is a view illustrating a configuration of a mobile terminal according to an embodiment of the present invention.

FIGS. 5 and 6 are flow charts illustrating a control method of a mobile terminal according to an embodiment of the present invention.

FIGS. 7A through 7C are conceptual views illustrating a control method of a mobile terminal to display a screen, which is displayed on a first display of an in-vehicle video display apparatus, on a second display according to a direction of driver's eyes according to an embodiment of the present invention.

FIG. 9 is a view illustrating an example in which a size and a position of a previous screen displayed on a display of an in-vehicle video display apparatus are changed according to a direction of driver's eyes according to an embodiment of the present invention.

FIGS. 10A through 10D are views illustrating an example in which a screen displayed on an in-vehicle video display apparatus is displayed on a screen of a mobile terminal to which the in-vehicle video display apparatus is connected, according to a direction of driver's eyes in a state in which a vehicle is stopped from running, according to an embodiment of the present invention.

FIG. 12 is a flow chart illustrating a control method of a mobile terminal according to another embodiment of the present invention.

FIGS. 19A through 19C are conceptual views illustrating a method for displaying video in an in-vehicle video display apparatus when there is a request to share new video from the same video display apparatus according to an embodiment of the present invention.

DETAILED DESCRIPTION OF THE INVENTION

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, In addition, similarly, a second element could be termed a first element, without departing from the scope of the present invention.

The embodiments of the present invention will now be described with reference to the accompanying drawings, in which like numbers refer to like elements throughout.

Figure 1:
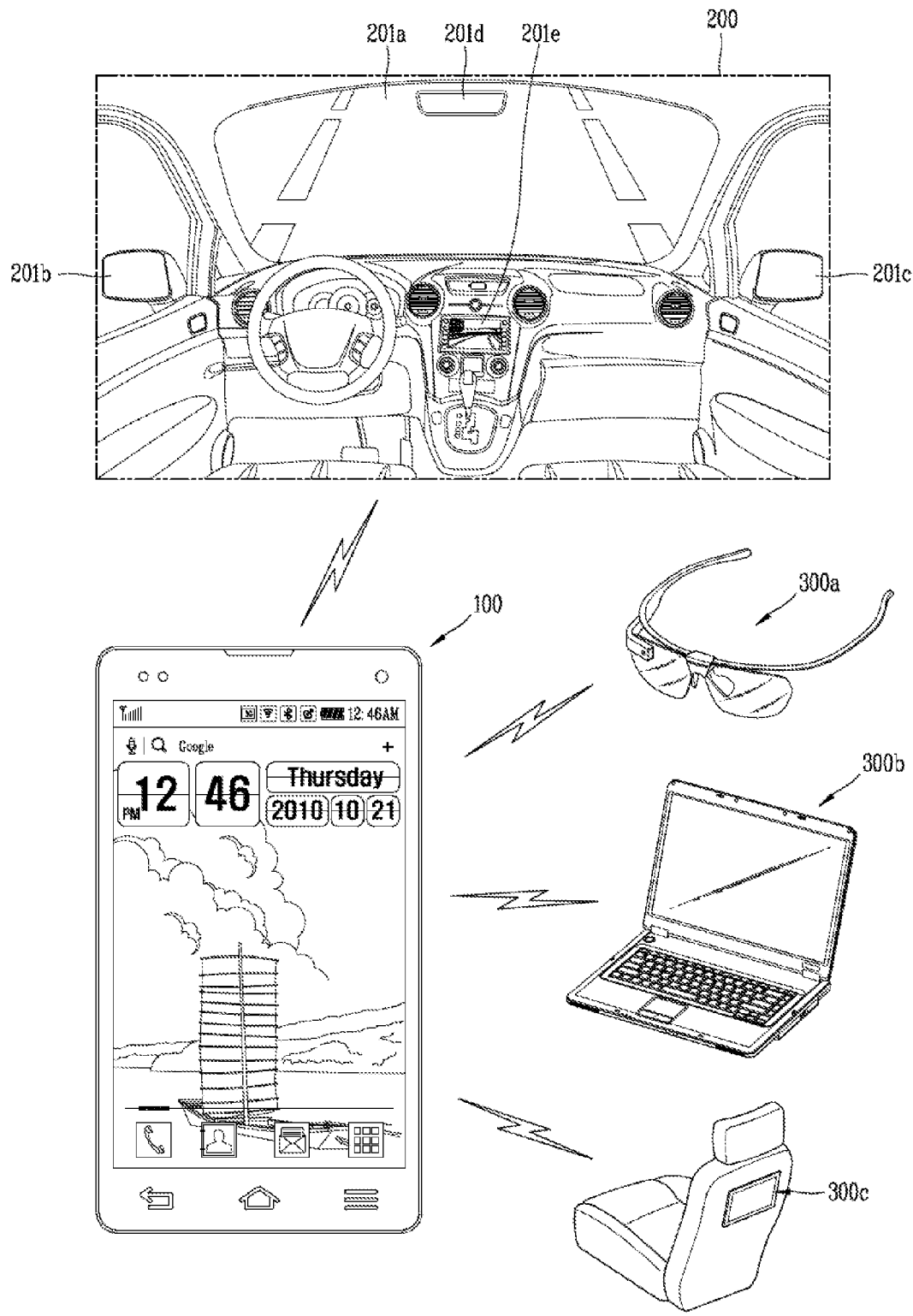
FIG. 1 is a view illustrating a mobile terminal and an in-vehicle video display apparatus connected to the mobile terminal according to an embodiment of the present invention.

FIG. 1 is a view illustrating a mobile terminal and an in-vehicle video display apparatus connected to the mobile terminal according to an embodiment of the present invention. In the present invention, a mobile terminal 100 described in the present invention may include a portable phone, a smartphone, a laptop computer, a digital broadcast terminal, a personal digital assistant (PDA), a portable multimedia player (PMP), a slate PC, a tablet PC, an ultrabook, or the like.

Also, as illustrated in FIG. 1, an in-vehicle video display apparatus 200 described in the present invention may display a screen transmitted from the mobile terminal 100 to which the in-vehicle video display apparatus 200 is connected, on a reflector (e.g., side mirrors 201b and 201c) or a rear view mirror 201d, on a display 201e of a navigation device, on a dashboard of the vehicle, or on a front window 201a of the vehicle by using a head-up display (HUD) or a projector, based on various driving viewing angles according to an operation of a vehicle. Namely, a display unit of the in-vehicle video display apparatus 200 may be provided in a position spaced apart from a body of the in-vehicle video display apparatus 200 or may be provided in plural according to driving viewing angles as described hereinafter.

Also, as illustrated in FIG. 1, besides the in-vehicle video display apparatus 200, a head-mounted display (HMD) 300a or a different mobile terminal 300b such as a notebook computer, or the like, placed within the vehicle may also be provided as other in-vehicle video display apparatuses.

Also, the in-vehicle video display apparatus 200 and the in-vehicle video display apparatuses 300a and 300b may be connected via the mobile terminal 100 to exchange an external situation of the vehicle (e.g., appearance of an object in a blind spot, or the like), internal state information (e.g., a brake operation signal) of the vehicle, and content for providing information or providing an entertainment effect (e.g., map information, information received from a Web server, or the like), thereby operating like a single vehicle system.

The in-vehicle video display apparatuses 200, 300a, and 300b may be connected to a display positioned in a back seat through the mobile terminal 100 to perform communication. Also, the in-vehicle, video display apparatuses 200, 300a, and 300b may be connected to a single mobile terminal or a plurality of mobile terminals.

Meanwhile, the in-vehicle video display apparatuses 200, 300a, and 300b may be connected to an information providing center, or the like, providing traffic information and various data (e.g., a program, an execution file, or the like) through a wired/wireless communication network such as a local area network (LAN), a wide area network (WAN), or the like. Also, the vehicle refer to every transporter or carrier implement by using mechanical or electronic devices for the purpose of transportation of people or things or objects, such as a general car, bus, train, ship, airplane, or the like.

Hereinafter, for the description purposes, the mobile terminal 100 and the in-vehicle video display apparatus 200 connected to the mobile terminal 100 will be described as an example. Thus, the present invention may also be applied to the other in-vehicle video display apparatuses 300a and 300b in the same manner.

Referring to FIG. 1, the mobile terminal 100 may be connected to the in-vehicle video display apparatus 200 in a wired manner or wirelessly to receive a screen displayed on the in-vehicle video display apparatus 200, process the received screen, and transmit the processed screen to a different video display apparatus or a different display. Also, the mobile terminal 100 may transmit execution result (e.g., a screen image or sound) of an application executed in the mobile terminal 100 or information regarding a destination of the vehicle or a traveling path thereof to the in-vehicle video display apparatus 200 through an interface.

Here, the mobile terminal 100 may be positioned within the vehicle or may be positioned outside of the vehicle within a range in which a wireless connection is available.

Also, the in-vehicle video display apparatus 200 may be connected to the at least one mobile terminal 100 in a wired manner or wirelessly to receive a screen or a sound or information regarding a destination or a traveling path of the vehicle transmitted from the mobile terminal 100 and output the same. In this manner, an interworking state in which the mobile terminal 100 is connected to the in-vehicle video display apparatus 200 positioned in the vehicle may be referred to as a 'connected car'.

In the state of the connected car, the mobile terminal 100 may transmit a screen displayed on the mobile terminal 100 or a sound or a screen displayed on different video display apparatuses 300a and 300b to the in-vehicle video display apparatus 200 through an interface. Here, for example, a mechanism of interface for screen transmission may be a mechanism supporting wireless communication such as a wireless fidelity (Wi-Fi) transceiver, a Bluetooth transceiver, or the like, or a means supporting wired communication such as a universal serial bus (USB) terminal, or the like.

Also, the in-vehicle video display apparatus 201 may obtain an external image of the vehicle through a camera provided within the vehicle, for example, a front camera or a front camera within a black box, and transmit the obtained external image to the connected mobile terminal 100. Then, the mobile terminal may analyze the captured image to recognize a direction of the driver's face and/or a direction of the driver's pupils.

Accordingly, the mobile terminal 100 may detect a change in the driver's sights while the vehicle is running. The mobile terminal 100 may execute at least one corresponding function according to the detected change in the driver's sights. For example, when the driver's sights toward the front side is turned to the left side mirror, the mobile terminal 100 may provide control to receive an external image of the vehicle captured in the front side as described in detail hereinafter in real time, and display the same on one side of the left side mirror.

Also, the in-vehicle video display apparatus 200 may receive a specific command from the driver or a fellow passenger of the vehicle through an interface, and transmits the received specific command to the connected mobile terminal 100. For example, when the driver inputs a specific command by touching or pressing touch pad or a key pad provided in a screen of the in-vehicle video display apparatus 200, the in-vehicle video display apparatus 200 may sense a position of a point to which the input has been applied, and transmit information regarding the sensed position to the connected mobile terminal 100.

Then, the mobile terminal 100 may determine, that a touch even has occurred in the point to which the touch input was applied, and perform an operation corresponding to the generated event. Namely, the driver or the fellow passenger of the vehicle may control the operation of the mobile terminal 100 by using the touch pad, keypad, or the like, provided in the in-vehicle video display apparatus 200.

Also, in the state of the connected car, the fellow passenger of the vehicle may execute a road guidance application (or dialing, phone book, e-mail, a video playback application, or the like) installed in the mobile terminal 100 and allow the mobile terminal 100 to transmit an executed image of the road guidance application to the in-vehicle video display apparatus 200, so that the executed image of the road guidance application may be displayed in the in-vehicle video display apparatus 200.

Accordingly, the driver may view the executed image of the road guidance application in a large screen of the in-vehicle video display apparatus 200, instead of the small screen of the mobile terminal 100. Also, the driver may listen to a road guidance information through a speaker provided in the vehicle, in the place of a speaker of the mobile terminal 100.

Meanwhile, the driver may put on the head mounted display (HMD) 300a illustrated in FIG. 1 and when the HMD is connected to the mobile terminal 100, a screen to be displayed on displays 201a, 201b, 201c, 201d, and 201e of the in-vehicle video display apparatus 200 may be displayed in front of both eyes of the driver who is wearing the HMD 300a.

Also, when the fellow passenger of the vehicle is connected to the mobile terminal 100 by using the different mobile terminal 300b illustrated in FIG. 1, a screen to and/or additional information of the vehicle to be displayed on the displays 201a, 201b, 201c, 201d, and 201e of the in-vehicle video display apparatus 200 may be displayed on a display of the different mobile terminal 300b.

Also, the in-vehicle video display apparatus 200 and the mobile terminal 100 connected thereto may exchange additionally required information based on a separate protocol. For example, the in-vehicle video display apparatus 200 may provide vehicle state information such as vehicle running information, speed information, fuel information, or the like, to the mobile terminal 100. Also, some applications installed in the mobile terminal 100 may use vehicle state information received from the in-vehicle video display apparatus 200 by using a separate protocol. Such applications may provide information regarding an application type (for example, road guidance, multimedia, games, and the like), a graphic user interface (GUI) type (for example, a map, video, a menu, and the like), an application state (for example, when an application is being executed in a foreground or in a background), and the like, to the in-vehicle video display apparatus 200.

Figure 2A:
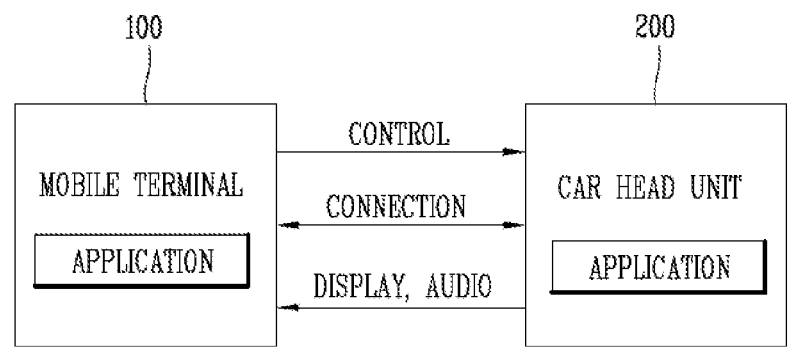
FIGS. 2A and 2B are views conceptually illustrating how a mobile terminal and an in-vehicle video display apparatus connected to the mobile terminal interact according to an embodiment of the present invention.
Figure 2B:
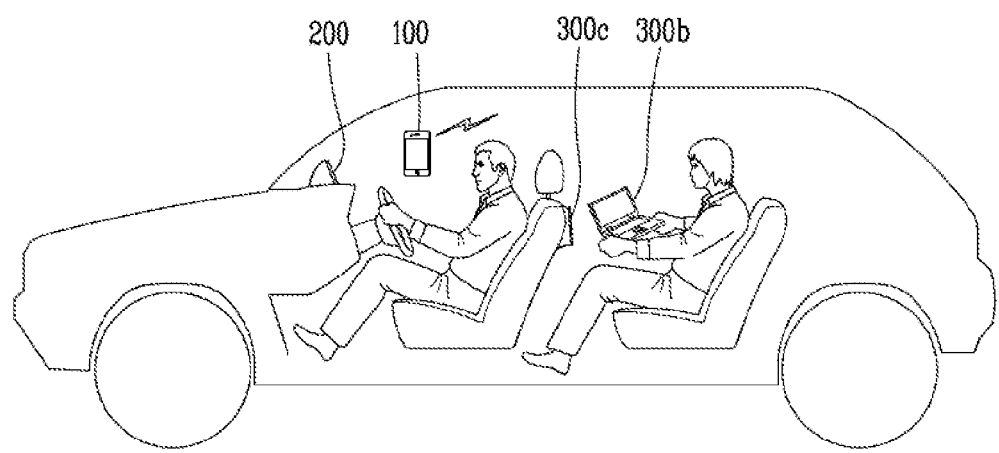

FIGS. 2A and 2B are views conceptually illustrating how a mobile terminal and an in-vehicle video display apparatus connected to the mobile terminal interact according to an embodiment of the present invention. As illustrated in FIG. 2A, the mobile terminal 100 and the in-vehicle video display apparatus 200 connected to each other in a vehicle are provided according to an embodiment of the present invention.

The mobile terminal 100 may be wirelessly connected to the in-vehicle video display apparatus 200 and transmit at least one of an image and a sound to the in-vehicle video display apparatus 200. The in-vehicle video display apparatus 200 may be installed in a fixed manner in the vehicle, and wirelessly connected to the mobile terminal 100 to receive at least one of a screen image and a sound from the mobile terminal 100. Also, the in-vehicle video display apparatus 200 may output at least one of the image and sound received from the mobile terminal 100.

The in-vehicle video display apparatus 200 may receive an input from a user, and transmit the received input to the mobile terminal 100. For example, when the user applies a touch input through a touch screen provided in the in-vehicle video display apparatus 200, the in-vehicle video display apparatus 200 may recognize a position of a point to which the touch input was applied in a screen image, and transmit information regarding the recognized position to the mobile terminal 100. The mobile terminal 100 determines that a touch event has occurred in the point to which the touch input was applied, and perform an operation corresponding to the generated touch event. Namely, the user may control an operation of the mobile terminal 100 by using a touch screen, a hard key, or the like, provided in the in-vehicle video display apparatus 200.

In an example in which a video transmission system is applied, when the user may execute a road guidance application (or dialing, a phone book, an e-mail, video playback application, and the like) installed in the mobile terminal 100, the mobile terminal 100 transmits an executed image of the road guidance application to the in-vehicle video display apparatus 200 so that the in-vehicle video display apparatus 200 may display the executed image of the road guidance application.

The user may view the executed image of the road guidance application in a large screen of the in-vehicle video display apparatus 200, instead of a small screen of the mobile terminal 100. Also, the user may listen to a road guidance sound through a speaker provided in the vehicle, instead of a speaker of the mobile terminal 100. Also, when the user selects a menu related to road guidance by using a touch screen or a hard key provided in the in-vehicle video display apparatus 200, the mobile terminal 100 may perform an operation regarding the corresponding menu. Also, the mobile terminal 100 may transmit results of performing the operation regarding the corresponding menu to the in-vehicle video display apparatus 200 so as to be output.

The mobile terminal 100 and the in-vehicle video display apparatus 200 may be connected by using a near field communication standard such as Bluetooth™, or the like, a wireless Internet standard such as Wi-Fi, or the like, an external device interface standard such as USB, or the like.

Also, a server application providing a service according to a client's request may be installed in the mobile terminal 100, and a client application that may be connected to a service provided by a server may be installed in the in-vehicle video display apparatus 200.

The server application of the mobile terminal may capture a screen of the mobile terminal 100 regardless of an application type of the mobile terminal, and transmit the captured screen to the client application of the in-vehicle video display apparatus 200. Also, the server application may control an operation of the mobile terminal 100 based on information regarding an event occurring in the in-vehicle video display apparatus 200 from a client application.

For example, the in-vehicle video display apparatus 200 may remotely control the mobile terminal 100 according to a virtual network computing (VNC) scheme using a remote frame buffer (RFB) protocol providing a remote access with respect to a graphic user interface (GUI). According to the VNC scheme, while the mobile terminal 100 delivers updated screen to the in-vehicle video display apparatus 200 through a network, an input event generated in the in-vehicle video display apparatus 200 may be transmitted to the mobile terminal 100.

Also, for example, the mobile terminal 100 may transmit a sound to the in-vehicle video display apparatus 200, a headset, a handsfree, or the like, according to an advanced audio distribution profile (A2DP) defining sound quality of an audio signal (stereo or mono signal) that may be streamed from a first device to a second device through a Bluetooth™ connection, in particular, a headset profile (LISP) regarding a Bluetooth headset, in particular, hands-free applied to a vehicle handsfree kit, and the like.

Meanwhile, the mobile terminal 100 and the in-vehicle video display apparatus 200 may exchange additional information based on a separate protocol. For example, the in-vehicle video display apparatus 200 may provide vehicle state information such as vehicle running information, speed information, fuel information, and the like, to the mobile terminal 100.

Some applications installed in the mobile terminal 100 may use vehicle state information received from the in-vehicle video display apparatus 200 by using a separate protocol. Such applications may provide information regarding an application type (for example, road guidance, multimedia, games, and the like), a graphic user interface (GUI) type (for example, a map, video, a menu, and the like), an application state (for example, when an application is being executed in a foreground or in a background), and the like, to the in-vehicle video display apparatus 200.

Subsequently, referring to FIG. 2B, the in-vehicle video display apparatus 200 connected to the mobile terminal 100 according to an embodiment of the present invention may be, for example, a head-up display (HUD) 200 positioned in a front seat of the vehicle. The HUD 200 may display an image in a display provided in a body thereof or an image projected through a projector on a dashboard, a front window, or the like. Also, the in-vehicle video display apparatus 200 may be, for example, a display 300c positioned in a back seat of the vehicle or may be a terminal 300b of a notebook computer, or the like, of the other fellow passenger of the vehicle. Also, the in-vehicle video display apparatus 200 may be connected to a single external electronic device or a plurality of external electronic devices.

Meanwhile, the in-vehicle video display apparatus 200 may be connected to an information providing center, or the like, providing traffic information and various data (e.g., a program, an execution file, traffic information, and the like) through a wired/wireless communication network such as a local area network (LAN), a wide area network (WAN).

FIG. 3 is a view illustrating a configuration of a mobile terminal according to an embodiment of the present invention. As illustrated in FIG. 3, the mobile terminal 100 may include a wireless communication unit 110, a user tracking unit 120, a user input unit 130, a sensing unit 140, an output unit (p 150, a memory 160, an interface unit 170, a controller 180, and a power supply unit 190, etc. FIG. 3 shows the mobile terminal 100 as having various components, but implementing all of the illustrated components is not a requirement. Greater or fewer components may alternatively be implemented.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

Meanwhile, the broadcast associated information may also be provided via a mobile communication network In addition, the broadcast associated information may be received by the mobile communication module 112. The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive broadcast signals by using various types of broadcast systems. In particular, the broadcast receiving module 111 may receive a digital broadcast signal by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, radio frequency identification (RFID), infrared data association (IrDA), ultra-wideband (UWB), ZigBee™, wireless LAN (protocol of Bluetooth, 802.11n, or the like), and the like.

The location information module 115 is a module for checking or acquiring a location (or position) of the mobile communication terminal (when the mobile communication terminal is located in a vehicle, the location of the vehicle can be checked). For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or a hybrid positioning system may be used.

The user tracking unit 120 is configured to receive an audio or video signal, and track a user by using the received signal. The user tracking unit 120 may include a camera 121, a microphone 122, a video analyzing module 123, or the like. The camera 121 processes image data of still pictures or video obtained by an image capturing device in a video capturing mode or an image capturing mode. The image frames processed by the camera 121 may be displayed on a display unit 151. The image frames may be stored in the memory 160 or may be transmitted to the outside through the wireless communication unit 110. Two or more cameras 121 may be provided according to a usage environment.

The microphone 122 may process an audio signal input from the other side in a phone call mode, a recording mode, a voice selection mode, and the like, into electrical audio data. The processed audio data may be converted for output into a format transmittable to a mobile communication base station via the mobile communication module 112 when the phone call mode. The microphone 122 may implement various types of noise canceling (or suppression) algorithms to cancel (or suppress) noise or interference generated in the course of receiving and transmitting audio signals.

The video analyzing module 123 analyzes an image transmitted via an interface to determine a direction of user's eyes. In more detail, the video analyzing module 123 may detect a change in a direction of the user's face and/or a direction of the user's pupils upon recognizing positions of both eyes of the user. The analysis results are delivered to the controller 180 and the controller 180 can control to execute a function corresponding to the direction of the user's eyes.

The user input unit 130 may generate input data for controlling an operation of the mobile terminal from a driver. The user input unit 130 may include a keypad, a dome switch, a touch pad (e.g., a touch sensitive member that detects changes in resistance, pressure, capacitance, etc. due to being contacted), a jog wheel, a jog switch, and the like. In particular, when the touch pad is overlaid on the display unit 151 in a layered manner, it may form a touch screen.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141, a pressure sensor 143, a motion sensor 145, or the like. The proximity sensor 141 may detect, without any mechanical contact, an object approaching the mobile terminal 100, an object present in the vicinity of the mobile terminal 100, and the like. The proximity sensor 141 may detect an object approaching the mobile terminal 100 using a change in AC magnetic field or static magnetic field, a change in capacitance, and the like. The proximity sensor 141 may be provided with two or more proximity sensors according to the environment used.

The pressure sensor 143 may detect whether or not pressure is applied to the mobile terminal 100, the strength of the pressure, and the like. The pressure sensor 143 may be mounted at a portion required for detection of pressure in the mobile terminal 100 according to a usage environment. If the pressure sensor 143 is mounted in the display unit 151, the pressure sensor 143 may identify a touch input through the display unit 151 and a pressure touch input of which pressure is greater than that of the touch input, according to the signal output from the pressure sensor 143. The pressure sensor 143 may detect the strength of the pressure applied to the display unit 151 when a pressure touch is input, according to the signal output from the pressure sensor 143.

The motion sensor 145 senses a position or motion of the mobile terminal 100 using an acceleration sensor, gyro sensor, and the like. The acceleration sensor that may be used in the motion sensor 145 is an element for converting, a change in acceleration in any one direction into an electrical signal, which is commonly used in line with the development of an MEMS (micro-electromechanical systems) technology.

The acceleration sensor includes various types of acceleration sensors from an acceleration sensor installed in an airbag system of a vehicle to measure acceleration having a great value used to sense collision to an acceleration sensor measuring acceleration having a fine value and used as an input unit for games, or the like, by recognizing a fine operation of user's hand. The acceleration sensor is configured by installing sensors for measuring acceleration corresponding to 2-axis or 3-axis in a single package, and according to a usage environment, only a Z-axis may be required. Thus, when an acceleration sensor, in an X-axis direction or Y-axis direction, instead of Z-axis direction, is required to be used for some reasons, the acceleration sensor may be installed to be stood on a main board by using a separate piece board. The gyro sensor is a sensor that measures an angular velocity, and may sense a direction turned with respect to a reference direction.

The output unit 150 is used to generate an audio signal, a video signal, or an alarm signal. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, as UI or GUI.

The display unit 151 may include at least one of a liquid crystal display (LCD), a thin film transistor-LCD (TFT-LCD), an organic light emitting diode (OLED) display, a flexible display, a three-dimensional (3D) display, or the like. The mobile terminal 100 may include two or more display units (or other display means) according to its particular desired embodiment. For example, the mobile terminal may include both an external display unit and an internal display unit.

When the display unit 151 and a sensor sensing a touch operation (hereinafter, referred to as a 'touch sensor') are overlaid in a layered manner to form a touch screen, the display unit 151 may function as both an input device and an output device. The touch sensor may have the form of for example, a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input position and a touch input area. When there is a touch input with respect to the touch sensor, the corresponding signal(s) are sent to a touch controller. The touch controller processes the signal(s) and transmits corresponding data to the controller 180. Accordingly, the controller 180 can recognize a touched region of the display unit 151.

The proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric, field according to the approach of the pointer. In this instance, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this instance, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be output to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 101). Events generated in the mobile terminal may include, call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. When a call signal is received or a message is received, the alarm unit 153 may vibrate the mobile terminal through a vibration means. Or, when a key signal is input, the alarm unit 153 may vibrate the mobile terminal 100 through a vibration means as a feedback with respect to the key signal input. Through the vibration, the user may recognize the occurrence of an event. A signal for notifying, about the occurrence of an event may be output to the display unit 151 or to the audio output module 152.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are input, or output.

The memory 160 may include at least one type of storage medium including a Flash memory, a hard disk, a multimedia card micro type, a card-typo memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. Here, the identification module may be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 101) via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 can include a multimedia module 181 for reproducing multimedia data. The multimedia module 181 may be configured within the controller 180 or may be configured to be separated from the controller 180.

The controller 180 can perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself. For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

The voice recognition module 182 recognizes a voice pronounced by the user and performs a corresponding function according to the recognized voice signal.

A navigation session applied to the mobile terminal 100 displays a driving route on map data. Meanwhile, the mobile terminal 100 according to an embodiment of the present invention may search a destination or a stop by using the multimedia module 181, and transmit the searched destination or stop by communicating with an in-vehicle video display apparatus 200 described hereinafter through the wireless communication unit 110.

Also, the mobile terminal 100 may receive information related to a vehicle provided from the in-vehicle video display apparatus 200 as described hereinafter through the wireless communication unit 110. For example, the in-vehicle video display apparatus 200 may receive information regarding a vehicle such as a driving route of a vehicle, a speed and a gear state of a vehicle, or may receive information regarding an ON/OFF state of an emergency light of a vehicle, an ON/OFF state of a headlight, whether a fellow passenger is seated through a sensor installed in a seat within a vehicle, an ON/OFF state of a hoot, or the like.

Also, the mobile terminal 100 may transmit a driving route together with the searched destination or stop to the in-vehicle video display apparatus 200. Then, the in-vehicle video display apparatus 200 may display the driving route in a dashboard of a vehicle, in a head-up display (HUM or in a front window of a vehicle by using a projector. Here, the HUD may be installed in a dashboard of a vehicle, and a the HUD and the projector may use a generally known scheme, so a detailed description thereof will be omitted.

Figure 4:
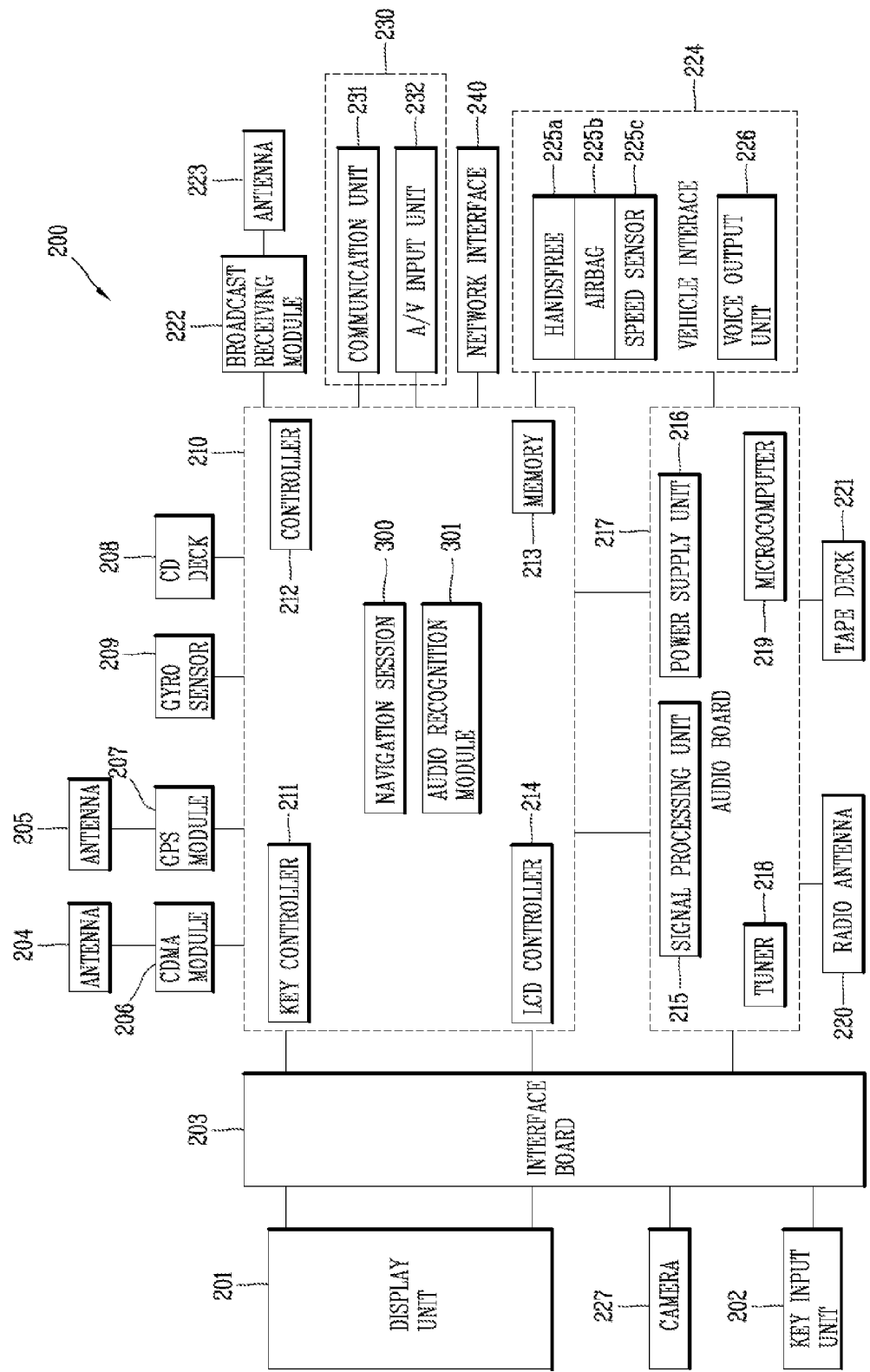
FIG. 4 is a block diagram illustrating a configuration of an in-vehicle video display apparatus connected to a mobile terminal according to an embodiment of the present invention.

FIG. 4 is a block diagram illustrating a configuration of an in-vehicle video display apparatus connected to a mobile terminal according to an embodiment of the present invention.

The in-vehicle video display apparatus 200 according to an embodiment of the present invention may include a plurality of displays. The plurality of displays may be positioned to be spaced apart from the in-vehicle video display apparatus 200, for example, an HUD body. For example, a body of the in-vehicle video display apparatus 200 may be an HUD, and the plurality of displays included therein may include a front window of a vehicle, a dashboard of a vehicle, side mirrors and a rear view mirror of a vehicle, and the like. Also, in order to display a predetermined image on the plurality of displays, the HUD may have a projector. Namely, the HUD may display an image previously stored in a memory or an image received from the mobile terminal 100 on one of the plurality of displays by using a projector.

As illustrated in FIG. 4, the in-vehicle video display apparatus 200 includes a main board 210 including a controller (for example, a central processing unit (CPU)) 212 for controlling a general operation of the in-vehicle video display apparatus 200, a memory 213 for storing various types of information, a key controller 211 for controlling various key signals, and a liquid crystal display (LCD) controller 214 for controlling an LCD.

The memory 213 stores map data for displaying road guidance information on a digital map. Also, the memory 213 stores a traffic information collecting control algorithm for inputting traffic information according to the situation of a road in which a vehicle is running, and information for controlling the algorithm.

The main board 210 includes a wireless communication module (or a CDMA module) 206 performing wireless communication between the in-vehicle video display apparatus 200 and the external mobile terminal 100 or wireless communication between the in-vehicle video display apparatus 200 and a network in which the in-vehicle video display apparatus 200 is positioned, a location information module 207 for receiving a UPS signal to guide a location of a vehicle or receiving a global positioning system (UPS) signal for tracking a driving route from a start point to a destination, or transmitting traffic information collected by a driver as a UPS signal, a CD deck 208 for reproducing a signal recorded in a CD (Compact Disk), a gyro sensor 209, or the like. The wireless communication module 206 and the location information module 207 transmit or receive signals via antennas 204 and 205 for each module.

The wireless communication module 206 may include a mobile communication module 206a for transmitting and receiving a wireless signal to and from at least one of a base station, an external terminal, and a server in a mobile communication network, as a mobile terminal assigned with a unique device number, a wireless Internet module 206b for accessing a wireless Internet according to a scheme such as a wireless LAN (WLAN), Wi-Fi, wireless broadband (Wi-bro), world interoperability for microwave access (Wimax), high speed downlink packet access (HSDPA), or the like, a short-range communication module 206c performing communication according to Bluetooth™, radio frequency identification (RFID), infrared data association (IrDA), ultra wideband (UWB), ZigBee, wireless LAN (Bluetooth, 802.11n, etc., protocol), or the like.

Also, a broadcast receiving module 222 is connected to the main board 210 and receives a broadcast signal through an antenna 223. A display unit (i.e., an LCD) 201 under the control of the LCD controller 214, a front board 202 under the control of the key controller 211, and a camera 227 for capturing images of the interior and/or the exterior of a vehicle are connected to the main board 210 via an interface board 203. The display unit 201 displays various video signals and character signals, and the front board 202 includes buttons for various key signal inputs and provides a key signal corresponding to a button selected by a driver to the main board 210. Also, the display unit 201 may include a proximity sensor and a touch sensor (touch screen) of FIG. 1.

The front board 202 includes a menu key for directly inputting traffic information. The menu key may be configured to be controlled by the key controller 211.

The audio board 217 is connected with the main board 210 and processes various audio signals. The audio hoard 217 includes a microcomputer 219 for controlling the audio board 217, a tuner 218 for receiving a radio signal, a power source unit 216 for supplying power to the microcomputer 219, and a signal processing unit 215 for processing various audio signals.

The audio board 217 includes a radio antenna 220 for receiving a radio signal and a tape deck 221 for playing an audio tape. The audio board 217 may further include an audio output unit (for example, an amplifier) 226 for outputting an audio signal processed by the audio board 217.

The audio output unit (amplifier) 226 is connected to a vehicle interface 224. Namely, the audio board 217 and the main board 210 are connected to the vehicle interface 224. A handsfree 225a for inputting an audio signal, an airbag 225b configured for the security of a passenger, a speed sensor 225c for detecting a speed of a vehicle, or the like, may be connected to the vehicle interface 224. The speed sensor 225c calculates a vehicle speed and provides the calculated vehicle speed information to the CPU 212.

The navigation session (or a searching unit) 300 applied to the in-vehicle video display apparatus 200 generates road guidance information based on the map data and current location information of a vehicle and provides the generated road guidance information to a driver.

The display unit 201 senses a proximity touch within a display window via a proximity sensor. For example, when a pointer (e.g., user's finger or stylus) is proximity-touched, the display unit 201 detects a position of the proximity touch and outputs position information corresponding to the detected position to the controller 212.

Also, as described hereinafter, the display unit 201 may include a plurality of displays, and each of the displays may display a different image corresponding to a driving viewing angle of a vehicle. Also, the display unit 201 may be connected to at least one camera 227, and the camera 227 may capture an image of a user within a predetermined range based on the display unit 201 and delivers the captured image of the user to a connected external device or the main board 210.

The camera 227 may be generally installed in a front side of a vehicle or detachably attached to capture an external image according to driving of a vehicle. Also, the camera 227 may be replaced by a camera installed in a black box within a vehicle. Also, a plurality of cameras 227 may be installed (at positions where a side mirror or a rear view mirror is disposed) to capture a corresponding external image of a vehicle or a single camera may capture an external image of a vehicle corresponding to various driving viewing angles when a vehicle runs.

Meanwhile, map data for searching a driving route may be stored in the memory 213 or may be received from an external network through the wireless communication unit 110. A voice recognition module 301 recognizes a sound pronounced by a driver and performs a corresponding function according to the recognized audio signal.

The navigation session 300 applied to the in-vehicle video display apparatus 200 displays a driving route on map data, and when the mobile terminal 100 is located within a pre-set distance from a blind spot included in the driving route, the navigation session 300 automatically forms a wireless network together with a terminal (e.g., a vehicle navigation device) mounted in a nearby vehicle or a mobile terminal carried around by a nearby pedestrian via wireless communication (e.g., a short-range wireless communication network) to receive location information of a nearby vehicle from the terminal mounted in the nearby vehicle and receive location information of the nearby pedestrian from the mobile terminal carried around by the nearby pedestrian.

Meanwhile, the main board 210 may be connected to an interface unit. The interface unit includes an external device interface unit and a network interface unit. The external device interface unit may connect an external device to the in-vehicle video display apparatus 200. Thus, the external device interface unit may include an A/V input/output unit or a wireless communication unit. The external device interface unit 231 may be connected to an external device, for example, a DVD (Digital Versatile Disk), Blu-ray, a game machine, a camera, a camcorder, a computer (or a notebook computer), and the like, in a wired manner or wirelessly. Also, the network interface unit may be connected to a predetermined Web page through a connected network or a different network linked to the connected network. Namely, the network interface unit may be connected to a predetermined Web page through a network to exchange data with a corresponding server.

In an embodiment of the present invention, the in-vehicle video display apparatus 200 may be a head-up display (HUD) or a projector, or may be a display apparatus positioned in the back seat of the vehicle. Here, in the case in which the video display apparatus 200 is a display apparatus positioned in the back seat of the vehicle, it may communicate with an HUD or a projector positioned in the front seat of the vehicle through the wireless communication module 206.

The mobile terminal 100 according to an embodiment of the present invention including one or more components as described above may be connected to the in-vehicle video display apparatus 200 as described above through the wireless communication unit 110.

When the in-vehicle video display apparatus 200 and the mobile terminal 100 are connected, the user tracking unit 120 of the mobile terminal 100 may detect a driver's line of sight based on images of the driver captured based on each of the displays 201a to 201e of the in-vehicle video display apparatus 200 connected to the mobile terminal. Thus, each of the displays 201a to 201e of the in-vehicle video display apparatus 200 may be connected to at least one camera (which is preferably positioned in the driver's seat) in order to capture an image of the driver.

When the driver's sights have been changed, namely, when a direction corresponding to the driver's sights has been turned from the first display to the second display of the in-vehicle video display apparatus 200, the controller 180 may display at least a portion of a screen displayed on the first display, for example, at least a portion of a screen corresponding to the front visual field of the vehicle, on the second display to which the driver's sights having moved for example, on the display displaying a rear visual field of the vehicle together.

For example, the controller 180 can display the at least a portion of the screen in a region of a side mirror display of the vehicle. Namely, when the driver's sights have moved from the front visual field to the rear visual field displayed on the side mirror, the controller 180 displays a front image corresponding to the previous running visual field on the display to which the driver's sights having moved together.

Here, the controller 180 can extract only a partial screen of a predetermined range to which the driver's sights are fixed from the screen before the driver's sights are moved, adjust the extracted partial screen according to a ratio fitting the display to which the driver's sights having moved and transmit the extracted partial screen to the display to which the driver's sights having moved in real time.

Here, the first display may be a display in which a driving route of the vehicle is imaged in a front side of the vehicle and displayed. For example, the first display may be a head up display (HUD) or a front window (or a windscreen) (hereinafter, it will be generally referred to as a 'vehicle head unit'). A screen corresponding to the front visual field of the vehicle may be displayed on the first display, and state information of the vehicle may be further displayed together.

The second display may be positioned in the door of the driver's seat and/or the passenger's seat or above the driver's seat to image a rear side of the vehicle and/or display the same. For example, the second display may be a side mirror or a rear view mirror (hereinafter, it may be referred to as a 'vehicle reflecting mirror') connected to at least one camera. A screen corresponding to a rear visual field of the vehicle may be displayed on the second display.

For example, keeping eyes forward while on the move, when the driver views left/right side mirrors or turns his eyes to a rear view mirror according to a driving route, the controller of the mobile terminal 100 in a 'connected car' state controls the screen of the front visual field that the driver has kept his eyes previously, to be displayed together in a region of the side mirror to which the driver's eyes have moved. Accordingly, even when the driver views a rear viewing angle, while keeping his eyes on the front side while driving the vehicle, he or she may know a situation of the front side in real time. Thus, when an object suddenly appears in the front visual field, the driver can recognize the object, thus preventing an occurrence of an accident.

As described above, since the driver's sights are variously changed according to a driving route while driving the vehicle, a screen corresponding to a previous driving viewing angle is displayed together with the display corresponding to a current driving viewing angle, thereby assisting safe driving of the driver and enhancing driver convenience.

Figure 5:
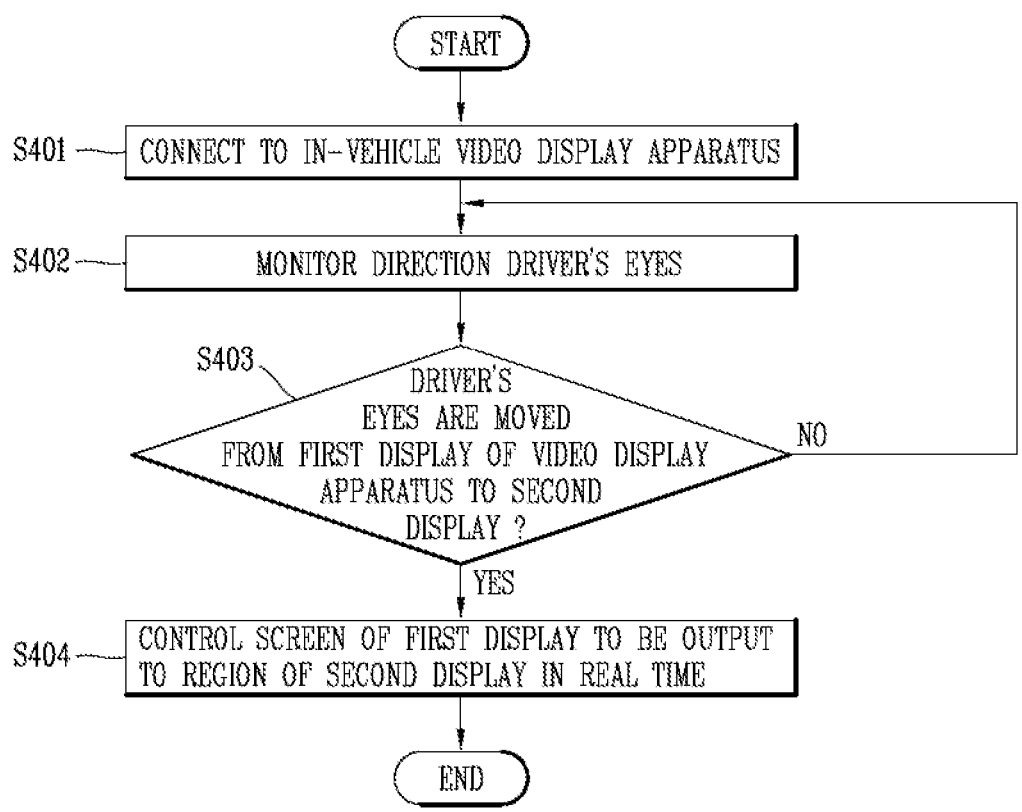

Hereinafter, a control method of a mobile terminal to display an image of a previous driving viewing angle together on a display at a position corresponding to a change in driver's sights while the driver is running a vehicle will be described in detail with reference to FIG. 5. FIG. 5 is a flow chart illustrating a control method of a mobile terminal according to an embodiment of the present invention.

First, referring to FIG. 5, the mobile terminal 100 according to an embodiment of the present invention may be connected to the in-vehicle video display apparatus 200 (S401). For example, the mobile terminal 100 and the in-vehicle video display apparatus 200 may be connected by using a near field communication standard such as Bluetooth™, or the like, a wireless Internet standard such as or the like, an external device interface standard such as USB, or the like, so as to be in the 'connected ear' state as illustrated in FIG. 1.

Thus, the mobile terminal 100 can output a message or a sound guiding that the mobile terminal 100 and the in-vehicle video display apparatus 200 may be operable in the connected car state. Also, the in-vehicle video display apparatus 200 connected to the mobile terminal 100 may be provided in plural (for example, 300a and 300b in FIG. 1).

When the mobile terminal 100 and the in-vehicle video display apparatus 200 are in the connected car state, the controller 180 of the mobile terminal 100 can detect a direction of the driver's eyes based on an image of the driver captured based on the first display of the connected in-vehicle video display apparatus 200 and an image of the driver captured based on the second display (S402).

Thus, each of the displays of the in-vehicle video display apparatus 200 may be connected to at least one camera 227 and the connected camera 227 may capture an image of the driver within a predetermined range based on each of the displays. In another example, an image of the driver may be captured only based on a single display (for example, based on only the front window display of the vehicle). In this instance, an effect similar to that obtained by capturing an image of the driver based on each of the displays according to a movement of the driver's head part and a movement of the driver's pupils may be obtained in the captured single image of the driver.

When the driver's image is captured based on the display, the user tracking unit 120 of the mobile terminal can receive the image of the driver present within a predetermined range based on the first display of the in-vehicle video display apparatus 200 and an image of the driver present within a predetermined range based on the second display. When the images of the driver are received, the image analysis module 123 of the user tracking unit 120 can recognize a change in a direction of the driver's face and/or a direction of the driver's eyes from the received image. Such image analyzing may also be performed by the controller 180.

In order to recognize the change in the direction of the driver's face and/or the change in the direction of the driver's eyes, each of the displays may be connected to at least one camera 227. Namely, the in-vehicle video display apparatus 200 may continuously obtain an image of the driver through a camera, for example, the front camera 227, and delivers the same to the mobile terminal 100.

Here, when images of the driver present within a predetermined range are captured based on each of the displays through the plurality of cameras, the in-vehicle video display apparatus 200 can transmit the captured images of the driver in time order to the mobile terminal 100 or include a point in time at which each image was captured, as additional information in each image.

Namely, the first and second displays of the in-vehicle video display apparatus 200 may be connected at least one camera detachably disposed in the vehicle and obtain images of the driver present within a predetermined range based on each of the displays. Also, the first and second displays of the in-vehicle video display apparatus 200 may be connected to front and rear cameras, respectively, to obtain external images of the vehicle.

A method of obtaining external images of the vehicle by each of the displays of the in-vehicle video display apparatus 200 will be described as an example. First, the first display of the in-vehicle video display apparatus 200 may be a head unit display (HUD) disposed in a front side of the vehicle or a front window of the vehicle. Also, the second display of the in vehicle video display apparatus 200 may be a lateral mirror or a rear mirror.

When the first display is a front window of the vehicle, a front visual field of the vehicle reflected to glass formed of a transparent material may be displayed as is on the vehicle, while the same image may be captured by using the front camera to obtain an external image of the vehicle. Also, when the first display is a vehicle head unit (HUD), previously stored map information and a current location and driving route of the vehicle are mapped to display a corresponding image on the HUD In addition, at the same time, an image of the front visual field of the vehicle may be captured by using the front camera or a front camera within a black box.

Meanwhile, the second display may display an image reflected from an object positioned in the rear side of the vehicle, namely, a rear visual field of the vehicle, as is. Also, the second display may be connected to the rear camera to capture a rear visual field of the vehicle and store to thus obtain a rear image of the vehicle.

Also, a camera configured to capture an image of the driver to detect a change in the driver's sights and a camera configured to capture an image corresponding to a driving visual field of the vehicle to obtain an external image of the vehicle may be separately provided. Namely, a first camera for capturing an image of the driver and a second camera (here, the second camera may include a front camera and a rear camera) for capturing an external image corresponding to a driving visual field of the vehicle may be provided.

According to the results of detecting the direction of the driver's eyes, the controller 180 of the mobile terminal 100 determines whether the driver's eyes have moved from the first display of the in-vehicle video display apparatus 200 to the second display thereof (S403). When it is determined that the driver's eyes have moved, the controller 180 provides displays at least a portion of a first screen displayed on the first display in a region of the second display to which the driver's eyes having moved in real time (S404).

Here, the first screen, which is a screen displayed on the first display, may be an image including, for example, every object present in front of a front visual field of the vehicle, a traffic signal display, a moving object, and the like. Also, current state information of the vehicle may also be further displayed in the first screen in addition to the images seen in the front visual field of the vehicle.

Referring to FIG. 7A, when a driver 900 keeps his or her eyes (A) on the front display 201a, for example, the HUD or the front window of the vehicle, and when the driver 900 turns his or her eyes to the left mirror display 201b to change a lane (B), the mobile terminal 100 in the 'connected car' state displays a screen 610 displayed on the front display 201a in a region of the left mirror display 201b to which the driver's eyes have been turned, as illustrated in FIG. 7B.

Namely, as illustrated in FIG. 78, the screen 610" corresponding to the front visual field of the vehicle that the user has viewed previously is displayed together with a screen 620 corresponding to a rear visual field of the vehicle which has been displayed on the left mirror display 201b. Thus, the driver can simultaneously recognize a change in a situation appearing in the front side of the vehicle, while he or she keeps his or her eyes on the left mirror display 201b.

In this instance, the first screen displayed in a region of the second display to which the driver's eyes have been turned may be moved through a user input. Namely, upon receiving an image of the driver present within a predetermined range based on the second display, the controller 180 can determine whether a pre-set gesture has been input, and when it is determined that a pre-set gesture has been input, the controller 180 can move the first screen in a direction corresponding to the gesture input to display it.

Figure 7C:
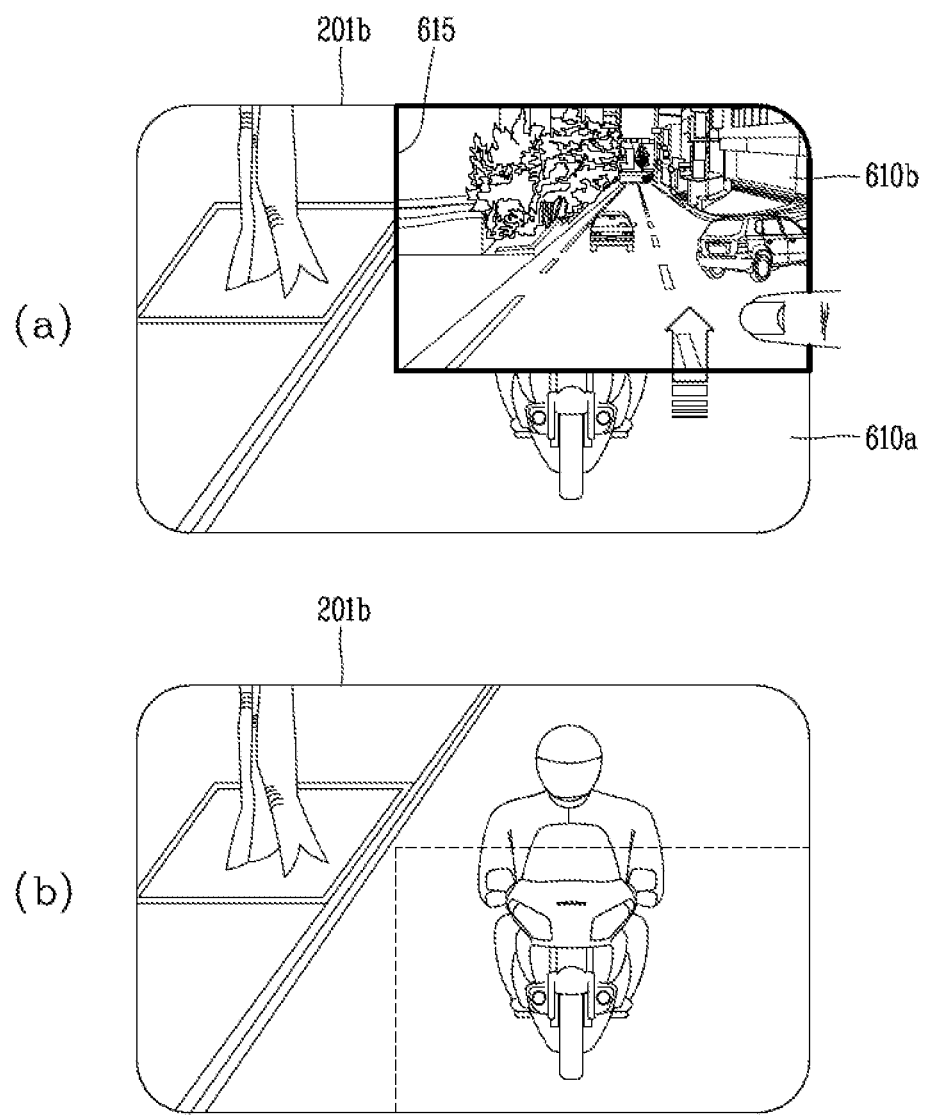

For example, referring to (a) of FIG. 7C, when the screen 610" corresponding to the front visual field of the vehicle is displayed in one region, for example, in a right lower end portion, of the left mirror display 201b of the in-vehicle video display apparatus 200 in real time, when a flicking touch input is applied, the controller 180 can move the screen 610" in a direction corresponding to the flicking touch input, namely, to a right upper end region of the second display 201b to display the same.

Also, when the first and second screens are simultaneously displayed in the second display, when the driver's sights are not changed or the driver does not gaze the first screen on purpose (for example, when the driver gazes only the second screen), the controller 180 can stop displaying the screen 610" corresponding to the front visual field of the vehicle which has been displayed on the second display 201b in real time, as illustrated in (b) of FIG. 7C.

Hereinafter, a method of displaying a screen of a previous display together in a display to which the driver's sights corresponding to operation S404 as described above have moved according to an embodiment of the present invention will be described in detail with reference to FIGS. 8A, 8B, and 9.

Figure 8A:
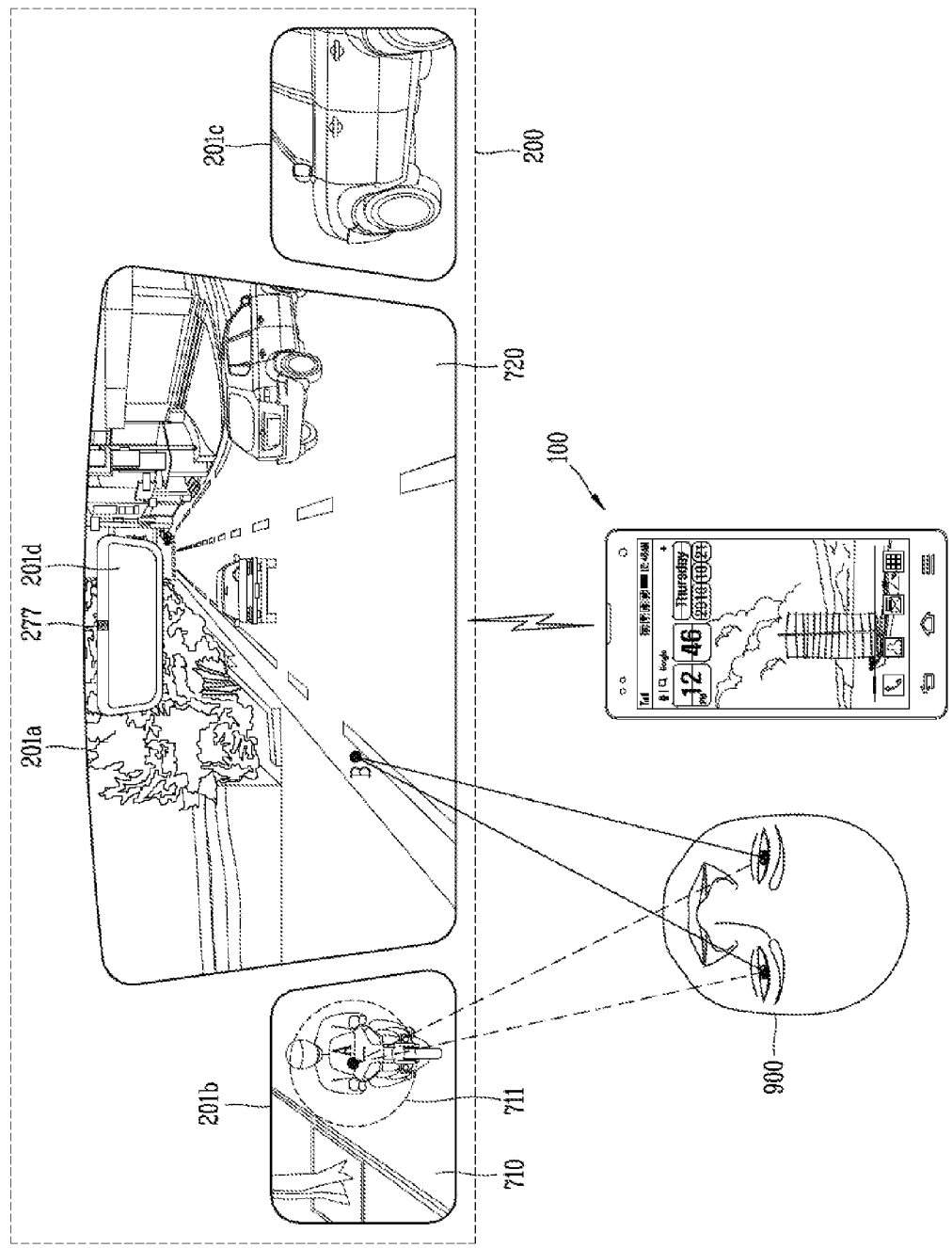
FIGS. 8A and 8B are conceptual views illustrating a control method of a mobile terminal to display only a portion of a screen displayed on a first display of an in-vehicle video display apparatus within a range to which driver's eyes are fixed, on a second display according to an embodiment of the present invention.
Figure 8B:
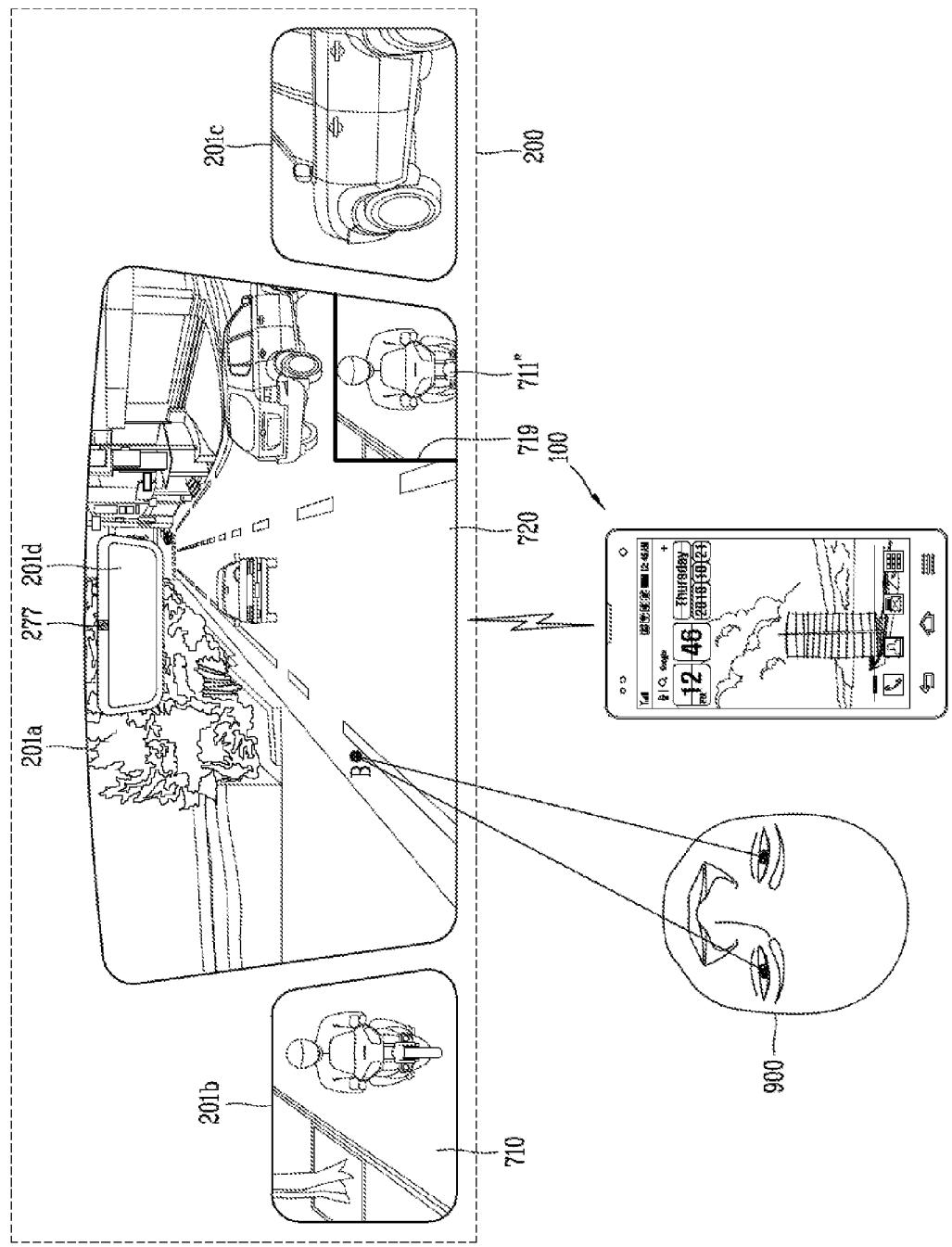

FIGS. 8A and 8B are conceptual views illustrating a control method of a mobile terminal to display only a portion of a screen displayed on a first display of the in-vehicle video display apparatus 200 within a range to which driver's eyes are fixed, on a second display according to an embodiment of the present invention. Also, FIG. 9 is a view illustrating an example in which a size and a position of a previous screen displayed on a display are changed according to a direction of driver's eyes according to an embodiment of the present invention.

Referring to FIG. 5, the user tracking unit 120 of the mobile terminal 100 in a 'connected car' state with the in-vehicle video display apparatus 200 detects a direction of the driver's eyes with respect to a plurality of displays of the in-vehicle video display apparatus 200, and as a result, the controller 180 can determine whether the driver's sights have moved from the first display of the in-vehicle video display apparatus 200 to the second display thereof.

When it is determined that the driver's eyes have moved to a different display of the in-vehicle video display apparatus 200, the controller 180 can display at least a portion of a first screen displayed on the first display to a region of the second display to which the driver's eyes have moved.

Here, the first display may be a head unit display (HUD) disposed in a front side of the vehicle and the second display may be a lateral mirror or a rear mirror. Also, the first screen displayed on the first display may be identical to an external image of the vehicle obtained through the front camera, namely, an image of the front visual field of the vehicle, and the second screen displayed on the second display may be identical to an external image of the vehicle obtained through the rear camera, namely, an image of the rear visual field of the vehicle.

The controller 180 of the mobile terminal 100 can request the first display to transmit the first screen to the in-vehicle video display apparatus 200 in real time through the wireless communication unit 110 in order to display the first screen displayed on the first display, on the second display. In response to the request, the first display transmits an image of the front visual field of the vehicle obtained through a connected camera to the mobile terminal 100. Then, the controller 180 processes the received image of the front visual field and transmits the same to the second display to which the driver's eyes have moved. Then, the second display displays the image of the front visual field of the vehicle transmitted from the mobile terminal 100 in a region of the screen in real time.

Here, the image of the front visual field of the vehicle displayed on the second display may be limited to be displayed within a range in which it does not cover an image displayed on the second display. Namely, because a screen corresponding to the rear visual field of the vehicle is displayed on the second screen of the second display, the image of the front visual field that the driver has previously viewed may be displayed together within a range in which it does not cover the image which has been displayed on the second display.

In more detail, the controller 180 can control the first screen to be displayed on the second display such that it is overlaid on the second screen of the second display. Here, the first screen may be displayed to have a size smaller than that of the second screen in an overlaid manner. For example, the controller 180 can limit the size of the first screen displayed on the second screen in an overlaid manner not to exceed one-fourth of the size of the entire screen.

Also, the controller 180 can scale up or down the first screen to be displayed on the second display. For example, when the driver's eyes are fixed only to the first screen for a pre-set period of time in the second display, the controller 180 can scale up the first screen by a predetermined range. Here, a maximum size of the first screen may be limited to be within the predetermined range as mentioned above. Also, for example, when the driver's eyes are fixed only to the second screen in the second display for a pre-set period of time, the controller 180 can scale down the first screen or make the first screen disappear (namely, remove the first screen).

For example, referring to (a) of FIG. 9, a screen (A) displayed on the display on which the driver has kept his or her eyes may be displayed on a screen (B) displayed on a display at which the driver currently takes a look, in a floating or overlaid manner. Here, a size of the screen (A) may be increased or decreased with a point to which the user's eyes are fixed, as a center. Also, the screen (A) may be displayed in a different region according to a change in the driver's sights within a current display or according to an occurrence of an event according to a change in an external situation.

Here, the occurrence of an event according to a change in an external situation may include, for example, when an object suddenly appears in a display region covered by the screen (A) displayed in a floating or overlaid manner or when an object present in a blind spot is sensed and a warning alarm is to be displayed on the display.

In the former case, the controller 180 can control the screen (A) to be moved to a different region of the display, for example, to a region in which the object is not present, so as to be displayed. In the latter case, the controller 180 can control the screen (A) to disappear from the display and display a warning alarm. Thus, the mobile terminal 100 can receive an external image of the vehicle and state information of the vehicle from the in-vehicle video display apparatus 200 connected thereto, for example, a signal corresponding to when an object is sensed in a blind spot.

Also, the controller 180 can display the first screen to be displayed on the second display, in a region discriminated from the second screen of the second display. Thus, the second screen, which has been displayed on the second display, for example, the screen corresponding to the rear visual field of the vehicle, may be replaced with an image captured by a camera. In this instance, the captured image may be reduced to correspond to a ratio between a width and a length of a region in which the second screen is to be displayed, so as to be displayed in real time.

For example, referring to (b) of FIG. 9, the second screen, which has been displayed in the entire display, is reduced to be displayed in a first region, for example, in a left region. Also, the first screen, which has been displayed on the display at which the driver took a look, is displayed in a second region, for example, in a right region. Here, a size of the second region may be limited to a size within a predetermined range not to interfere with the driver's driving, namely, not to cover the image of the rear visual field of the vehicle, as described above.

Also, in order to discriminate between the first and second screens simultaneously displayed on the second display of the in-vehicle video display apparatus 200, the controller 180 can display a predetermined frame in a boundary region of the first screen displayed in the second display or provide a highlighting effect thereto.

For example, referring to FIG. 8B, when an image 720 of a front visual field of the vehicle is displayed on the front window 201a of the vehicle and an image 711" of a rear visual field is displayed in an overlaid manner in a region of the front window 201a, a frame 719 may be displayed in the boundary region of the image 711" to allow the driver to visually discriminate between the different images. Here, the controller 180 of the mobile terminal 100 can control the frame 715 to be highlighted at predetermined time intervals.

Also, when it is determined that the driver's eyes have moved to a different display, the controller 180 can extract a partial screen of a predetermined range to which the driver's eyes are fixed in the first screen in real time, and display the extracted partial screen on the second display. Thus, the controller 180 can receive the first screen from the first display in real time, determine a range of the received first screen to which the driver's eyes are fixed, extract the determined range from the first screen, and transmits the extracted partial image to the second display.

For example, as illustrated in FIG. 8A, when the driver 900, who keeps his or her eyes on the left side mirror 201b while driving, turns his or her eyes to the front display 201a to change a lane, the controller 180 of the mobile terminal 100 in the 'connected car' state may extract a partial screen 711 within a predetermined range, in particular, based on a point (A) at which the driver has gazed from an image 720 displayed on the left side mirror 201b, in real time. The extracted partial screen 711" may be displayed on the front window 201a of the vehicle to which the driver's eyes have moved as illustrated in FIG. 8B.

When images of a plurality of driving viewing angles (for example, an image of the front visual field and the image of the rear visual field) are simultaneously displayed in the display at which the driver currently looks at, when the driver's eyes sensed by the user tracking unit 120 turn to a different display, the controller 180 can display an image corresponding to a previous driving viewing angle again on a different display to which the driver's eyes have moved.

In more detail, when it is detected that driver's eyes have moved from the second display to the first display, the controller 180 can provide control such that the first screen output to a region of the second display disappears and at least a portion of the second screen displayed on the second display is output to a region of the first display at which the driver's eyes are directed.

Meanwhile, when the driver's eyes have moved to a third display (e.g., a rear view mirror), both the first and second screens which have been displayed in the second display may be displayed together in a region of the third display.

Here, if the driver's eyes are not fixed to the third display for a predetermined period of time, the controller 180 can provide control such that the first and second screens disappear simultaneously, or in displayed order, namely, such that the first screen disappears and the second screen subsequently disappears. Also, in another example, the first and second screens may disappear according to a driver's voice command (e.g., a voice command of 'please delete') or a gesture input.

Hereinafter, a control method of a mobile terminal to display an image of a previous driving viewing angle together on a display at a position corresponding to a change in driver's sights, while a vehicle is running or when vehicle is stopped will be described in detail with reference to FIG. 6.

Referring to FIG. 6, first, the mobile terminal 100 is connected to the in-vehicle video display apparatus 200 (S501). When the in-vehicle video display apparatus 200 is provided in plural, each in-vehicle video display apparatus 200 may be connected to the terminal 100.

For example, as the mobile terminal 100 and the in-vehicle video display apparatus 200 are connected by using a near field communication standard such as Bluetooth™, or the like, a wireless Internet standard such as or the like, an external device interface standard such as USB, or the like, they are in a 'connected car' state as illustrated in FIG. 1. Thus, the mobile terminal may output a message or a sound indicating that it may be operated in a connected car state.

In the connected car state, the mobile terminal 100 and/or the in-vehicle video display apparatus 200 may output a predetermined notification indicating that they are connected (S502). For example, the notification may be output as a signal sound such as 'Beep', an audio signal such as 'connected', or in a predetermined message form output to a display.

When the mobile terminal 100 and the in-vehicle video display apparatus 200 are in the 'connected car' state, the controller 180 of the mobile terminal 100 can detect a direction of the driver's eyes based on an image of the driver captured based on the first display (for which it is connected to at least one camera) and an image of the driver captured based on the second display (S503).

Thus, the user tracking unit 120 of the mobile terminal may receive an image of the driver within a predetermined range based on the first display of the in-vehicle video display apparatus 200 and an image of the driver within a predetermined range of the second display through the wireless communication unit 110, and recognize a change in a direction of the driver's face and/or a change in a direction of the driver's eyes. For example, when the driver's pupils face the first display in the first received image and the driver's pupils face the second display in the second received image, the user tracking unit 120 may detect a change in the driver's eyes.

When the change in the driver's sights is detected, the controller 180 of the mobile terminal 100 can determine whether the driver's eyes have moved from the first display (e.g., a side mirror) of the in-vehicle video display apparatus 200 to the second display (e.g., the front window of the vehicle or the vehicle head unit), while the vehicle is running in real time (S504).

When the controller 180 determines that the driver's eyes have moved from the first display of the in-vehicle video display apparatus 100 to the second display, the controller 180 requests the in-vehicle video display apparatus 200 to transmit a first screen (an image of a rear visual field of the vehicle mirrored in the side mirror) displayed on the first display in real time, and extracts a partial screen within a predetermined range to which the driver's eyes have been fixed from the first screen received in real time according to the request (S505). Also, a process of scaling down the received image to fit the display in which the received image is to be displayed may be performed.

When the foregoing image processing process is performed, the controller 180 provides control such that the extracted partial image is displayed in a region of the second display to which the driver's eyes having moved in real time (S506). Meanwhile, when a vehicle running stop signal is input, the controller 180 can determine whether the driver's eyes have moved from the in-vehicle video display apparatus 200 to the display unit 151 of the mobile terminal 100 (S507).

When a signal lamp included in an image captured by the front camera (or a front camera of a black box) within the vehicle is a signal lamp indicating 'stop' (e.g., a red light), the controller 180 can determine that the vehicle running stop signal has been input. Also, in order to determine whether the stop signal has been input, the controller 180 can determine whether operational state information of the vehicle such as a brake operating signal of the vehicle has been received, as a secondary determination condition.

Thus, the mobile terminal 100 can receive an image corresponding to a front visual field of the vehicle from the in-vehicle video display apparatus 200. Also, the mobile terminal 100 can receive an operational state information of the vehicle from the in-vehicle video display apparatus 200 or a vehicle system.

When the vehicle running stop signal is input and the driver's eyes are moved to the display unit 151 of the mobile terminal 100, the controller 180 provides control such that the screen of the display on which the driver kept his or her eyes, is output to a region outside of the predetermined range to which the driver's eyes are fixed in the display unit 151 (S508).

Figure 10A:
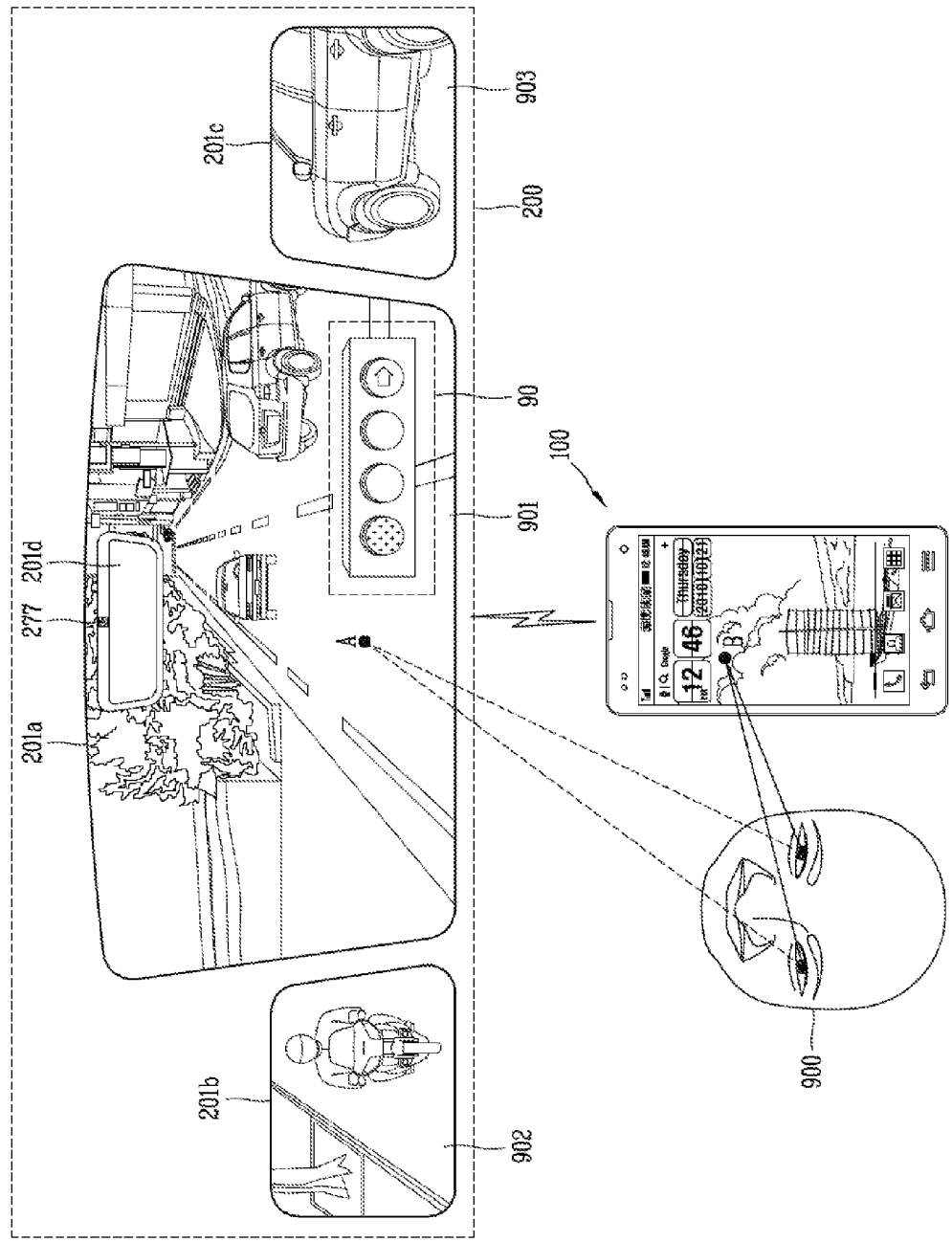

Referring to FIG. 10A, when the driver 900, who has driven the vehicle while keeping his or her eyes on the display 201*a* displaying an image 901 corresponding to the front visual field, stops driving the vehicle, the mobile terminal 100 in the 'connected car' state may recognize that the running the vehicle has stopped based on state information of the vehicle received from the vehicle system, for example, a brake operating signal and a 'stop' signal displayed in a signal lamp 90 included in the image 901 of the front visual field of the vehicle.

Figure 10B:
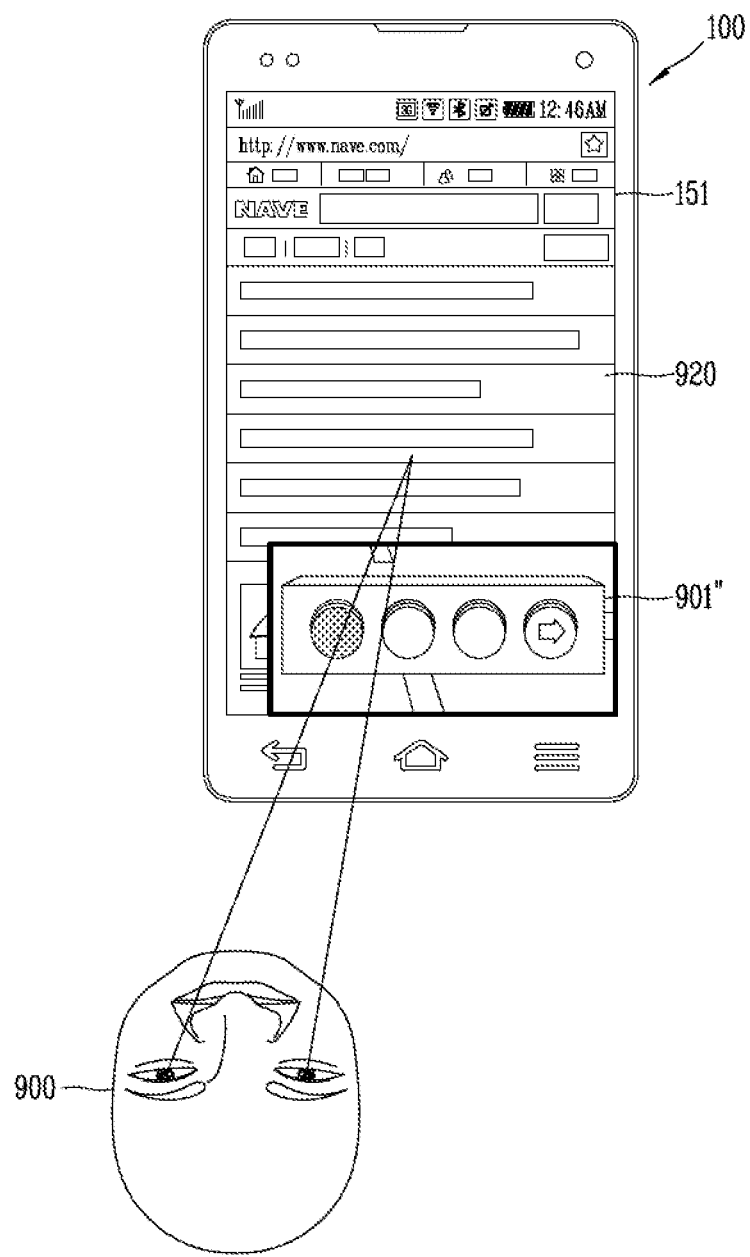

In the vehicle running stop state, when the driver 900 moves his eyes to the display unit 151 of the connected mobile terminal 100, a screen 901" corresponding to the front visual field of the vehicle which has been displayed in the display 201*a* on which the driver kept his or her eyes, is simultaneously displayed together with predetermined, content on the display unit 151 of the mobile terminal 100 as illustrated in FIG. 10B. Here, the screen 901" corresponding to the front visual field of the vehicle may be disposed to be displayed in a region outside of a predetermined range of a point to which the driver 900's eyes are fixed. For example, the screen 901" is displayed in a lower region of the display unit 151 in FIG. 10B.

In this state, the controller 180 can detect a predetermined input applied to the screen 901" corresponding to the front visual field of the vehicle displayed on the display unit 151 (S509). Here, the predetermined input may be, for example, a touch input applied to the screen 901" in a predetermined direction or may include a gesture input having a pre-set shape and both an input signal or a voice command corresponding to the driver's eyes.

When the input applied to the screen 901" is detected, the controller 180 can change a state of the screen related to the in-vehicle video display apparatus 200 displayed on the display unit 151 and/or an output range of the screen so as to be output (S510).

Hereinafter, various embodiments in which a screen displayed in the in-vehicle video display apparatus 200 is output to the display unit 151 will be described with reference to FIG. 10C.

Figure 10C:
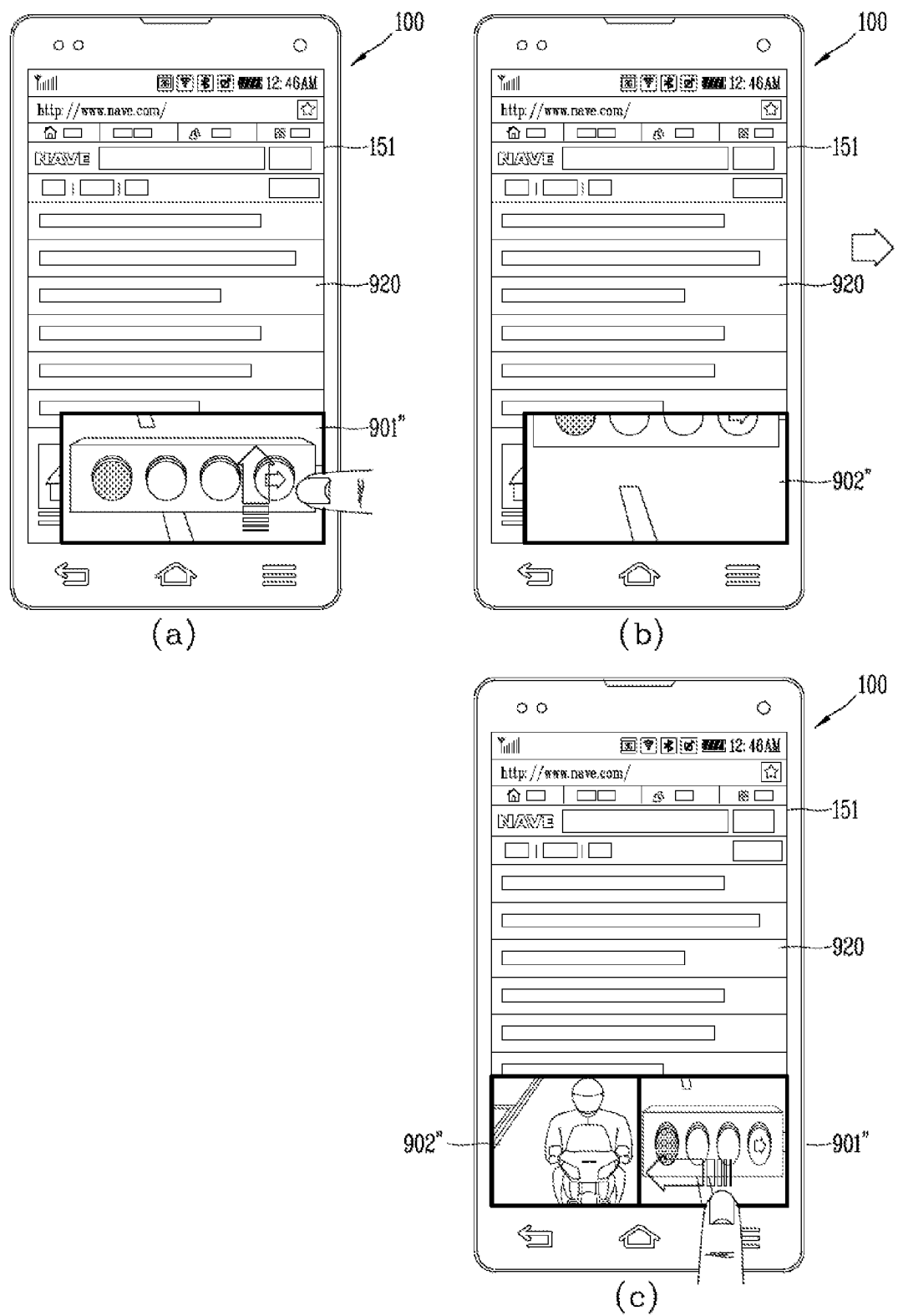

FIG. 10C includes views illustrating various embodiments in which a screen of the in-vehicle video display apparatus 200 is changed to be output according to a predetermined input applied to the display unit 151 of the mobile terminal 100 according to an embodiment of the present invention.

When a vehicle running stop signal is received and the driver's eyes are moved from the display displaying a front visual field of the vehicle to the mobile terminal 100, a content screen 920 corresponding to a user manipulation is output to a first region of the display unit 151 of the mobile terminal 100, and an image 901" of the front visual field of the vehicle on which the driver kept his or her eyes is displayed in a second region discriminated from the first region in real time, as illustrated in FIG. 10B.

In this state, the controller 180 can detect a first input applied to the first screen output to the display unit 151, for example, the image of the front visual field of the vehicle in a predetermined direction, and provide control such that an output range of the first screen is changed to correspond to the first input.

For example, in (a) of FIG. 10C, when a flicking touch input in a predetermined direction, for example, a flicking touch input in an upward/downward direction, is applied to the screen 901" of the front visual field of the vehicle displayed on the display unit 151, an output range of the screen 901" displayed on the display unit 151 in the entire screen is changed and the screen 901" is moved in a direction corresponding to the input, namely, moved up/down, so as to be displayed. Accordingly, the driver may view a screen 902" of the front visual field changed to have a desired viewing angle, as illustrated in (b) of FIG. 10C.

Also, for example, when a zoom-out touch input applied to the screen 901" of the front visual field of the vehicle displayed on the display unit 151 is sensed, an output range of the screen 901" displayed on the display unit 151 is scaled down. Meanwhile, when a zoom-in touch input applied to the screen 901" is sensed, an output range of the screen 901" displayed on the display unit 151 is scaled up so as to be displayed.

Also, when the content screen and the image 901" corresponding to the front visual field on which the driver kept his or her eyes are discriminately displayed in the first and second regions of the display unit 151, when a second input in a predetermined direction applied to the first screen, namely, the image of the front visual field of the vehicle, output to the display unit 151 is sensed, the controller 180 can provide control such that a screen of the display corresponding to a different driving viewing angle is output to the display unit 151 in real time.

For example, referring to (c) of FIG. 10C, when the driver applies a flicking touch input in a predetermined direction, for example, a flicking touch input in a left/right direction, to the image 901" of the front visual field of the vehicle, an image 902" of the rear visual field may be further displayed together with the image 901" of the front visual field of the vehicle on the display unit 151. Namely, images corresponding to various driving viewing angles are sequentially displayed. Here, order in which the images are displayed may correspond to order in which the displays are disposed within the vehicle (for example, from the driver's seat to the passenger's seat, or the reverse) or may correspond to order in which the driver's eyes are moved (in this instance, a duplicated image is deleted).

Hereinafter, examples of a method of outputting a screen when the driver's eyes are moved from the mobile terminal 100 to a different display of the in-vehicle video display apparatus 200 as running the vehicle is resumed will be described with reference to FIG. 10D.

When a vehicle running resume signal is input, the mobile terminal 100 in the 'connected car' state can recognize that the vehicle running has been changed from a stopped state to a resumed state. When the signal lamp included in the image captured by the front camera within the vehicle is changed from 'stop' to 'operation', the controller 180 determines that a resume signal for running the vehicle has been input.

In more detail, the mobile terminal 100 can recognize that running vehicle has resumed based on an 'operation' signal (for example, green or left-turn signal) indicated in the signal lamp included in the front visual field of the vehicle. Also, the controller 180 can determine a resumed state of the vehicle running based on vehicle state information (for example, a brake signal, is stopped) received from the in-vehicle video display apparatus 200 or the vehicle system as a secondary determination reference.

When the vehicle running is changed to a resumed state, the mobile terminal 100 can output a warning notification requesting the driver to concentrate on driving to the display unit 151 to guide the user's eyes to turn to the front visual field of the vehicle. For example, when a vehicle running resume signal is input, the controller 180 can output a predetermined warning notification (for example, a pop-up window displaying a phrase such as "please concentrate forward!") in order to inform about the resumed state of the vehicle running to allow the driver's eyes to be taken away from the display unit 151.

Accordingly, when the driver's eyes are moved from the mobile terminal 100 to the in-vehicle video display apparatus 200, the controller 180 can display a content screen, which has been displayed on the display unit 151 of the mobile terminal 100, to a region of the display, for example, a vehicle head unit (HUD), to which the driver's eyes have moved, in more detail, the user tracking unit 120 of the connected mobile terminal 100 can detect a direction of the driver's eyes by further considering images of the driver captured based on a third display together with the first and second displays of the in-vehicle video display apparatus 200.

Then, in response to the detected movement of the driver's eyes from the display unit to the third display, the controller 180 of the mobile terminal 100 can output the content screen, which has been output to the display unit 151 and the screen (first screen) corresponding to the front visual field of the vehicle, to the third display to which the driver's eyes have moved (here, the content screen and the first screen may be displayed on the third display even when the driver's eyes have moved to from the display unit 151 to the third display while the vehicle is running).

For example, referring to FIG. 10D, when the vehicle running is resumed and movement of the driver 900's eyes from the mobile terminal 100 to the head unit display 201e of the in-vehicle video display apparatus 200 is detected, a content screen 920" and the screen 901" of the front visual field of the vehicle, which had been displayed on the display unit 151 before the driver's eyes were moved, may be displayed together with a map screen 930 guiding a driving path.

Here, when a predetermined time has lapsed or when a control command (for example, a voice command of the driver) is input, the content screen 920" and the screen 901" of the front visual field of the vehicle displayed on the head unit display 201e can disappear from the screen. Meanwhile, the external image of the vehicle corresponding to the change in the driver's sights may also be output to other in-vehicle video display apparatuses 300a and 300b.

For example, as described above with reference to FIG. 1, the mobile terminal 100 is connected to a glass-type head mounted display (HMD) 300a that may be put on a part of driver's body, for example, on the head of the driver. However, the present invention is not limited thereto and various types of wearable devices that are wearable in the driver's body, such as a glass-type device, a ring-type device, a necklace-type device, and a clothes installation-type device may also be implemented.

When the first in-vehicle video display apparatus 200 (for example, the vehicle head unit) 200 and the second in-vehicle video display apparatus (for example, a head-mounted display) 300a of the vehicle are in a 'connected car' state with the mobile terminal 100, the controller 180 can detect that the driver's eyes are moved from a first display (for example, the display displaying a front visual field of the vehicle) of the first in-vehicle video display apparatus 200 to a second display (for example, a display displaying a rear visual field of the vehicle) thereof.

When the driver's eyes are moved from the first display of the first in-vehicle video display apparatus 200 to the second display thereof, the controller 180 displays the first screen (for example, the image of the front visual field) displayed on the first display together with the second screen (for example, the image of the rear visual field of the vehicle) displayed on the second display, on the display of the second in-vehicle video display apparatus 300*a*.

Thus, since the first and second screens are displayed in the plurality of displays of the in-vehicle video display apparatus 200, there is no need to change according to a change in the driver's sights.

Hereinafter, a method in which a driver or a fellow passenger of a vehicle check an external image of the vehicle corresponding to a change in driver's sights from the connected mobile terminal 100 while the vehicle is in a stopped state will be described.

Figure 11:
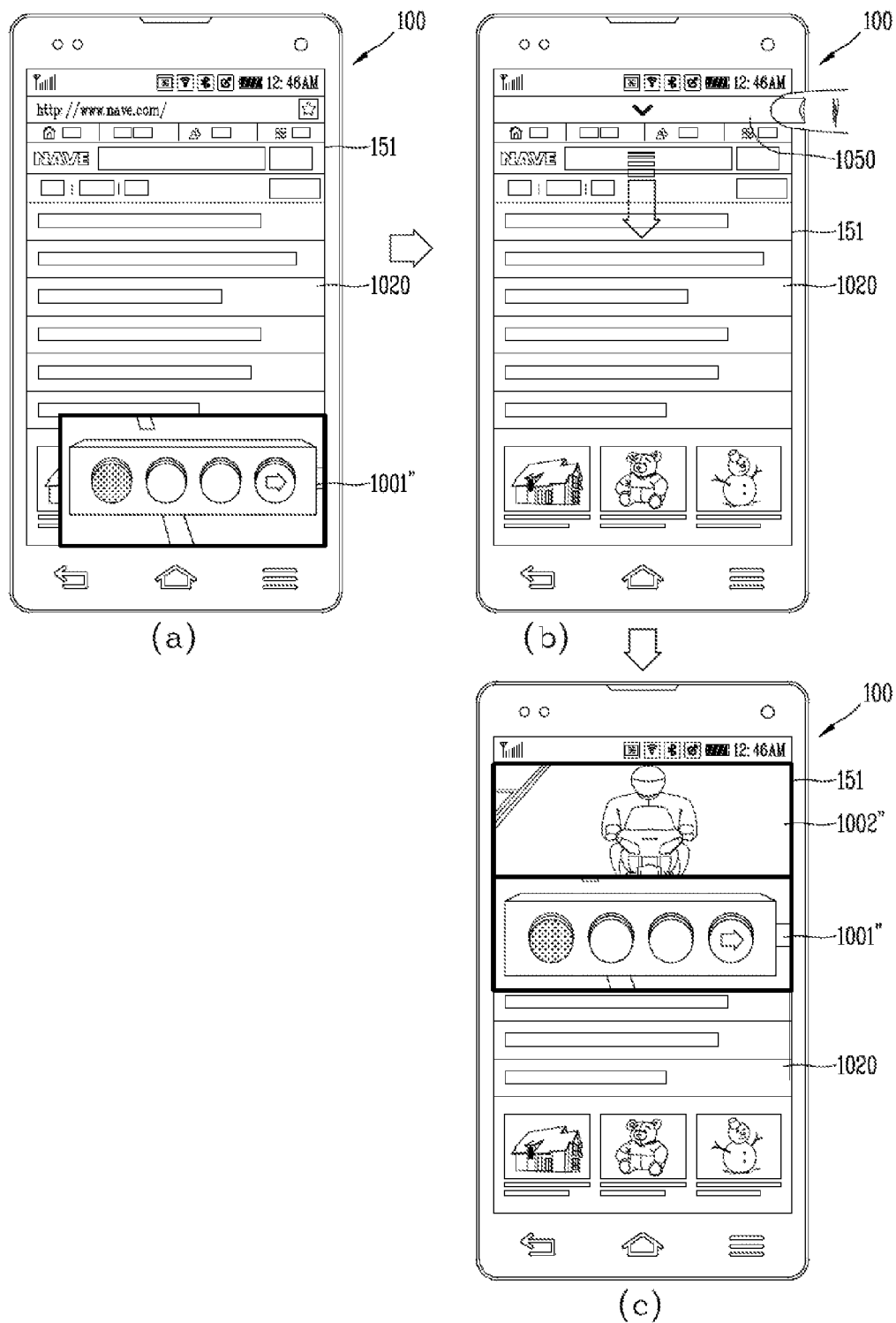
FIG. 11 is a conceptual view illustrating a control method of a mobile terminal to allow a driver or a fellow passenger within a vehicle to check a screen corresponding to a previous driving viewing angle in a mobile terminal in a state in which a vehicle is stopped from running, according to an embodiment of the present invention.

When a vehicle running stop signal is received and the driver's eyes are moved from the display displaying a front visual field of the vehicle to the mobile terminal 100, as illustrated in (a) of FIG. 11, a content screen 1020 corresponding to a user manipulation is output to a first region of the display unit 151 of the mobile terminal 100 and an image 1001'' of a front visual field of the vehicle at which the driver has gazed previously is displayed in a second region discriminated from the first region in real time.

In this state, when driver's eyes directed to the display unit 151 are not detected for a pre-set period of time (for example, 5 seconds or more), the controller 151 can stop displaying the image 1001'' (first screen) of the front visual field of the vehicle.

Simultaneously or thereafter, the controller 180 can display an indicator for enabling the first screen to appear, in a region of the display unit 151. Here, the indicator is an icon for displaying a screen corresponding to a front visual field or a rear visual field of the vehicle. For example, the indicator may be displayed as a progress bar, or the like, in an upper or lower end region of the display unit 151. Also, the indicator may include a direction indicator in which an image to be displayed as illustrated in (b) of FIG. 11 appears.

When the indicator is displayed on the display unit 151, and the driver or the fellow passenger applies a touch input to the indicator in a predetermined direction, the controller 180 can display a first screen corresponding to the indicator in the direction of the applied touch input. For example, when the user flicks downward an indicator 1050 displayed in an upper end region of the display unit 151 as illustrated in (b) of FIG. 11, images corresponding to various driving viewing angles of the vehicle, for example, a screen 1001'' of the front visual field and a screen 1002'' of the rear visual field, are displayed according to the direction of the flicking touch input as illustrated in (c) of FIG. 11.

When the user applies a flicking touch input to the displayed screen, the controller 180 can make the screen 1001'' of the front visual field and the screen 1002'' of the rear visual field disappear according to the direction of the touch input. Also, in the 'connected car' state as described above, the mobile terminal 100 and the in-vehicle video display apparatus 200 may exchange a screen, a sound, and other data through the wireless communication unit 110.

When the mobile terminal 100 and the in-vehicle video display apparatus 200 are in a connected state, the user tracking unit 120 of the mobile terminal 100 can detect a direction of the driver's eyes within a predetermined range based on the in-vehicle video display apparatus 200, for example, a vehicle head unit, connected to the mobile terminal 100 and the display unit 151 of the mobile terminal 100.

For example, the controller 180 of the mobile terminal 100 can determine whether the driver's face faces the display of the in-vehicle video display apparatus 200 or whether the driver gazes at the front window of the vehicle, namely, the front visual field by analyzing images of the driver obtained by the front camera provided in the vehicle or the camera provided in the mobile terminal 100 or the in-vehicle video display apparatus 200. Thus, the controller 180 can receive an image of the driver or a signal indicating whether the driver's eyes are fixed to the display of the in-vehicle video display apparatus 200 from the in-vehicle video display apparatus 200.

In this manner, while a change in the driver's sights is being detected, and when it is determined that the mobile terminal 100 has entered a video sharing mode, the controller 180 can transmit an image displayed in the in-vehicle video display apparatus 200 ('first video display apparatus'), for example, an external image appearing in the front visual field, and an image displayed on the display unit 151, for example, an image corresponding to the direction of the driver's eyes in a Web page screen, to a different video display apparatus 300*c* or 300*b* ('second video display apparatus'), for example a back seat display device or a terminal of the fellow passenger.

Here, when the driver's eyes are moved to a different direction from the in-vehicle video display apparatus 200 or the display unit 151 of the mobile terminal 100, the controller 180 can change a screen display in the connected different video display apparatus 300*a* or 300*b*, namely, the second video display apparatus, to an image corresponding to corresponding to the position to which the driver's eyes having moved and display the same.

When an image corresponding to the driver's eyes is transmitted from the mobile terminal 100 to the second video display apparatus, the user of the second video display apparatus may apply a predetermined input to the received image. The second video display apparatus, while transmitting an updated image obtained by including the input to the received image to the mobile terminal 100, may deliver an image sharing request to the in-vehicle video display apparatus 200 connected to the mobile terminal 100. Then, the mobile terminal 100 transmits the received updated image to the first video display apparatus which has accepted the image sharing, through the wireless communication unit 110.

Meanwhile, the second video display apparatus may accept or reject image sharing in response to the image sharing request transmitted from the mobile terminal 100. When a sharing accept signal is received, the controller 180 transmits an image displayed on a screen to which the driver's eyes are directed, to the second video display apparatus. The controller 180 can control the display unit 151 or the audio output module 152 of the mobile terminal 100 to output a sharing reject message. Accordingly, although the different video display apparatus 200 within the vehicle rejects the image sharing request, the corresponding intention is only displayed in the mobile terminal 1 of the driver, and thus, the driver's driving is not directly interfered with.

As described above, because a fellow passenger within the vehicle can also view the image that the driver looks at, in real time, the distraction of the driver is minimized while he or she is driving the vehicle, providing for safer driving, and because the driver can view an image with the fellow passenger without performing a manipulation, the driver convenience is enhanced.

Figure 13A:
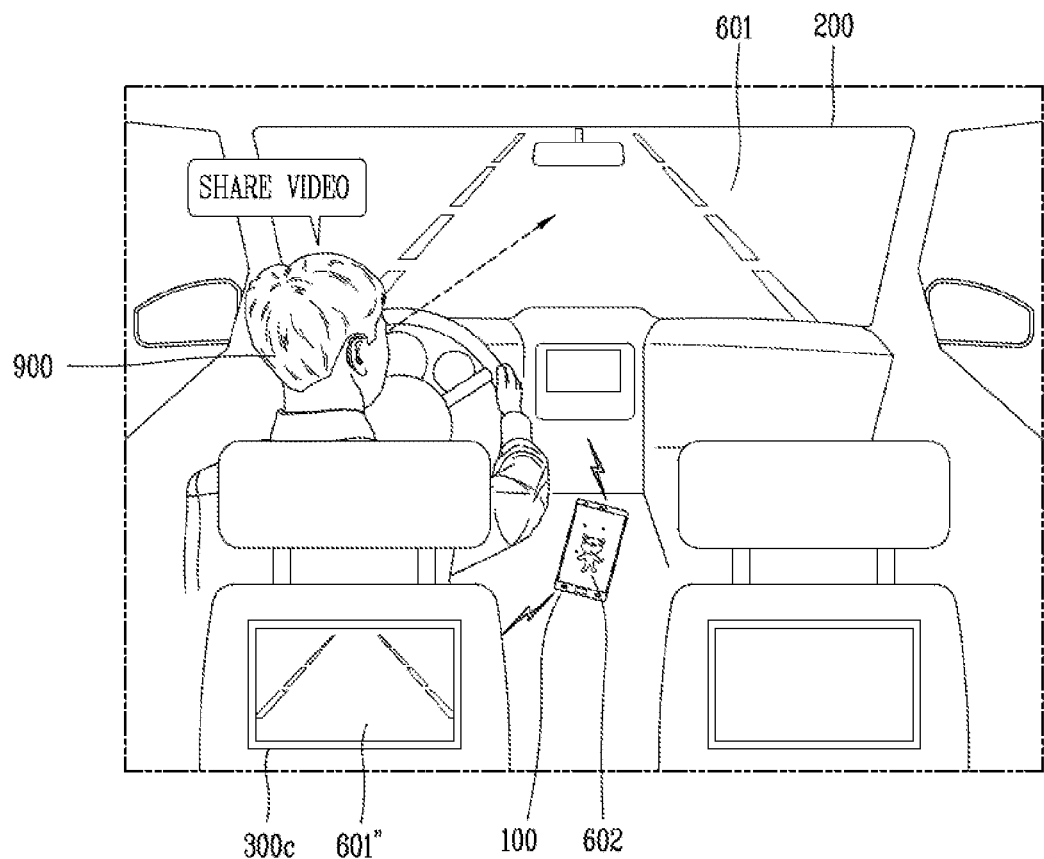
FIG. 13A and FIG. 13B are conceptual views illustrating the flow chart of FIG. 12.
Figure 13B:
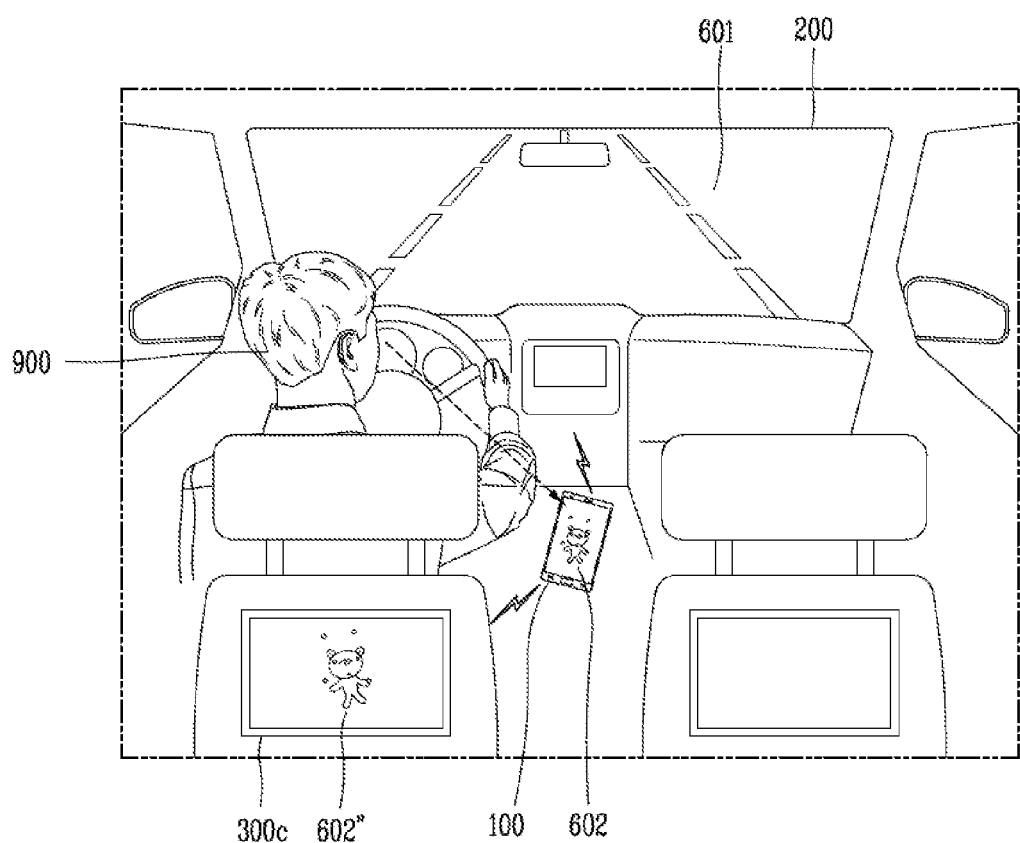

Hereinafter, a control method of a mobile terminal according to another embodiment of the present invention will be described in detail with reference to FIGS. 12, 13A, and 13B. In particular, FIG. 12 is a flow chart illustrating a control method of a mobile terminal according to another embodiment of the present invention, and FIGS. 13A through 13C are conceptual views illustrating the flow chart of FIG. 12.

First, referring to FIG. 12, the mobile terminal 100 is wirelessly connected to a plurality of video display apparatuses 200, 300c, and 300b (hereinafter, the plurality of video display apparatuses may be referred to as reference numeral '200'), namely, first and second video display apparatuses (S501).

Here, the first video display apparatus may be a vehicle head unit disposed in a front seat of a vehicle, or may be a projector that may project an image to a front window of the vehicle, or the like. Also, the second video display apparatus may be a display device disposed in a back seat of the vehicle or a mobile terminal of the fellow passenger of the vehicle.

Also, a connection between the mobile terminal 100 and the video display apparatuses refers to a 'connected car' state in which a mobile device and an infotainment system (including, for example, a head-up display (HUD), a projector, a dashboard of a vehicle, a back seat display device of a vehicle, or the like, which may be referred to as a 'vehicle head unit', hereinafter) according to a phone to car (P2C) service standard stipulated by the car connectivity consortium (CCC) as described above.

In the 'connected car' state, the mobile terminal 100 and the in-vehicle video display apparatus 200 can exchange a screen, a sound, other data, or the like, through the wireless communication unit 110. In particular, in an embodiment of the present invention, the mobile terminal 100 and the in-vehicle video display apparatus 200 being wirelessly connected through, for example, a wireless fidelity (Wi-Fi) transceiver, a Bluetooth transceiver, or the like, will be described as an example. However, such a connection is not limited to a wireless connection and the mobile terminal 100 can be connected to at least one in-vehicle video display apparatus 200 in a wired manner.

Different images can also be output to screens of the mobile terminal and the in-vehicle video display apparatus 200 connected to each other (S502). For example, a content screen, for example, an executed screen of an application or a Web page screen, may be output to the display unit 151 of the mobile terminal 100 according to user manipulation. Also, an external image corresponding to a front visual field of a vehicle or map data for performing road guidance may be output to a display (for example, a front head of the vehicle, a head unit display, or the like) of the in-vehicle video display apparatus 200.

Also, in the 'connected car' state, the user tracking unit 120 of the mobile terminal 100 can detect a direction of the driver's eyes within a predetermined range based on the first video display apparatus (for example, the vehicle head unit) and the display unit 151 of the body of the mobile terminal 100 connected to each other (S503).

In more detail, the mobile terminal 100 continuously detects whether a driver looks at the display of the first video display apparatus or whether the driver looks at the display unit 151 of the mobile terminal 100 through the camera 121 provided in the mobile terminal 100 body.

Also, the mobile terminal 100 can receive a first capture image obtained through the camera (first camera) within the vehicle from the in-vehicle video display apparatus 200. Then, the mobile terminal 100 can detect a direction of the driver's eyes by analyzing the received first capture image and a second capture image obtained through a camera (second camera) of the mobile terminal 100. The video analysis process may be performed through the video analyzing module 123 of the user tracking unit 120. Also, the controller 180 can determine a direction of the driver's eyes, a position to which the driver's eyes are fixed, or the like, by recognizing a direction of the driver's face and/or a direction of the driver's pupils upon receiving the first and second capture images.

While a change in the driver's sights is continuously monitored, the controller 180 can determine whether the mobile terminal enters a video sharing mode (504). Namely, the controller 180 can determine whether a video sharing request signal has been received from the first video display apparatus or the mobile terminal 180 body. In another example, such a video sharing request signal may be received from a different video display apparatus (for example, the second video display apparatus) within the vehicle.

Here, entering the video sharing mode, which refers to the in-vehicle apparatuses in the 'connected car' state being able to share a screen, a sound, and other data, may include both when an image displayed on the display of the first video display apparatus is shared with a different device within the vehicle and when a content screen displayed on the display unit 151 of the mobile terminal 100 is shared with a different connected device within the vehicle.

Further, entering the video sharing mode may be performed by a pre-set voice command, a gesture input, or a key input. Here, when the video sharing mode is entered by the driver, the video sharing mode may be entered only by a voice command (for example, shouting 'share video') or video sharing is set to be performed as a default when the 'connected car' state begins, to ensure safe driving. Namely, it may be implemented such that, as soon as connected, the video sharing function is executed. Also, the controller 180 can output a notification message (e.g., a pop-up window or a signal sound) indicating that the video sharing mode has entered, to the display unit 151 or the audio output module 152.

When the video sharing mode has entered according to the determination result in operation S504, the controller 180 transmits a screen corresponding to the detected driver's eyes to a different device within the vehicle, namely, to the second video display apparatus (S505). That is, the controller 180 transmits an image corresponding to a direction of the driver's eyes detected by the user tracking unit 120, among a first image displayed on the first video display apparatus and a second image displayed on the display unit 151, to the connected second video display apparatus. Accordingly, the fellow passenger of the vehicle can view an image that the driver views, in real time. Here, an image identical to the image transmitted to the second video display apparatus may be output to the display unit 151 or an initially displayed screen may be displayed as is.

For example, referring to FIG. 13A, when driver's eyes are fixed to a display (for example, the front window of the vehicle to which an image in a front visual field is projected through a projector of the vehicle head unit) 200 displaying the front visual field of the vehicle, and when the driver inputs a voice command "share video", the connected mobile terminal 100 receives an image 601 in the front visual field of the vehicle and transmits the received image 601 to the back seat display apparatus 300c of the vehicle in real time.

Accordingly, the image 601" of the front visual field of the vehicle is displayed in at least a region of the back seat display apparatus 300c in real time. The driver's voice command may be compared with a voice command stared in the memory 160. When the driver's voice command is identical to the stored voice command, the voice command may be recognized as a control command.

Also, referring to FIG. 13B, when the driver 900 eyes are fixed to the display unit 151 of the mobile terminal 100 and a video sharing request signal is input (for example, a voice command or a key input signal), the mobile terminal 100 transmits a screen output to the display unit 151, for example, an executed screen 602 of an application, to the back seat display device 300c in real time. Accordingly, an executed screen 602" of the application is displayed in at least one region of the back seat display device 300e in real time. Here, the driver is limited from viewing a general content screen through the mobile terminal 100 according to driving restrictions, while driving. Thus, although a video sharing request signal is input, the video sharing process may be performed only when a vehicle running stop signal (for example, a brake operating signal) is input.

Here, when the driver keeps his or her eyes forward to drive the vehicle, as illustrated in FIG. 13A, the image 601" of the front visual field of the vehicle is displayed on the back seat display apparatus 300c of the vehicle. The image 602", which has been displayed on the back seat display apparatus 300c before the driver's eyes are moved, may disappear, may be sealed down to be displayed, or may be executed in a background.

Also, the controller 180 can scale the image 601 displayed on the first video display apparatus or the image 602 output to the display unit 151 and display the same in the back seat display apparatus 300c. Here, pixels of the images may be changed based on an apparatus having lower pixels.

Also, the controller 180 can extract only a partial image corresponding to a predetermined range to which the driver's eyes are fixed and transmit the extracted partial image to the back seat display apparatus 300c. Also, the controller 180 can include an image of a blind spot that the driver cannot view in the image corresponding to the driver's eyes, and transmit the same to the back seat display apparatus 300c.

Meanwhile, the shared image displayed on the second video display apparatus 300c may be moved to a different region of the screen according to a user manipulation (for example, according to a change in the driver's sights), corrected contents may be input, or the shared image may be scaled up or down or may disappear from the screen.

As described above, according to the mobile terminal connected with the in-vehicle video display apparatus according to an embodiment of the present invention, an image that the driver currently views may be shared with a fellow passenger of the vehicle in real time, and such video sharing is performed by a driver's voice command and eye-tracking, whereby distraction of the driver may be minimized while driving a vehicle, providing an environment for safe driving.

Figure 14:
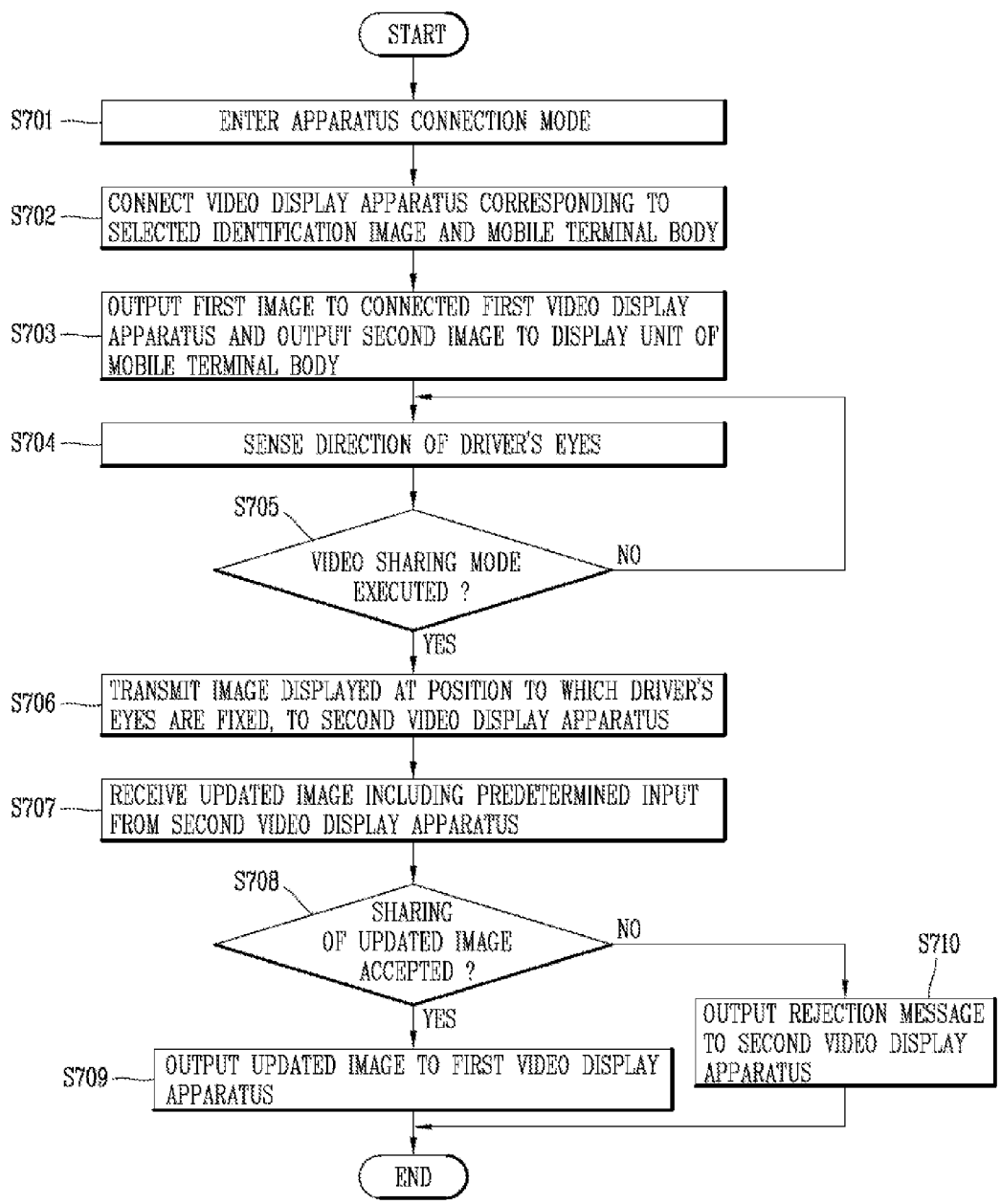
FIG. 14 is a flow chart illustrating a control method of a mobile terminal according to an embodiment of the present invention.

Hereinafter, a control method of a mobile terminal in which a driver and a fellow passenger interact through an in-vehicle connected device according to an embodiment of the present invention will be described in detail with reference to FIG. 14 and FIGS. 15A through 15E. FIG. 14 is a flow chart illustrating a control method of a mobile terminal according to an embodiment of the present invention, and FIGS. 15A through 15E are conceptual views illustrating the flow chart of FIG. 14.

First, referring to FIG. 14, the mobile terminal 100 according to an embodiment of the present invention may enter an apparatus connection mode based on a predetermined control command (S701). Here, the control command includes a specific key input, a voice command, a gesture input, or the like, and a screen for entering the apparatus connection mode is output to the display unit 151 according to the control command.

In more detail, the controller 180 receives a request for searching an in-vehicle video display apparatus available to be connected, from a user (or a driver). Such a request may be generated as soon as the screen for entering the apparatus connection mode is output. When the search request is input, the controller 180 displays a plurality of video display apparatuses available for connection, on the display unit 151.

Here, the controller 180 can display identification images corresponding to the in-vehicle video display apparatuses available to be connected to the body of the mobile terminal 100 on the display unit 151. The identification images may be previously stored in the memory 160 of the mobile terminal 100 or may be any one of a default image, a capture image, a thumbnail image of corresponding apparatuses, and a user image of corresponding apparatuses may be further displayed together with the images related to the corresponding apparatuses. Thus, the controller 180 can retrieve a user image stored in an address list or a phone book of the mobile terminal 100.

When the connectable in-vehicle video display apparatuses are displayed as predetermined identification images on the display unit 151, the controller 180 connects a video display apparatus corresponding to an identification image selected according to a user input to the mobile terminal 180 body (S702). Here, the 'selection' by the user input may be performed by a user input, for example, a touch input, applied to the identification image or may be performed by a voice command or a gesture such as eye blinking, or the like, with respect to a particular identification image.

Figure 15A:
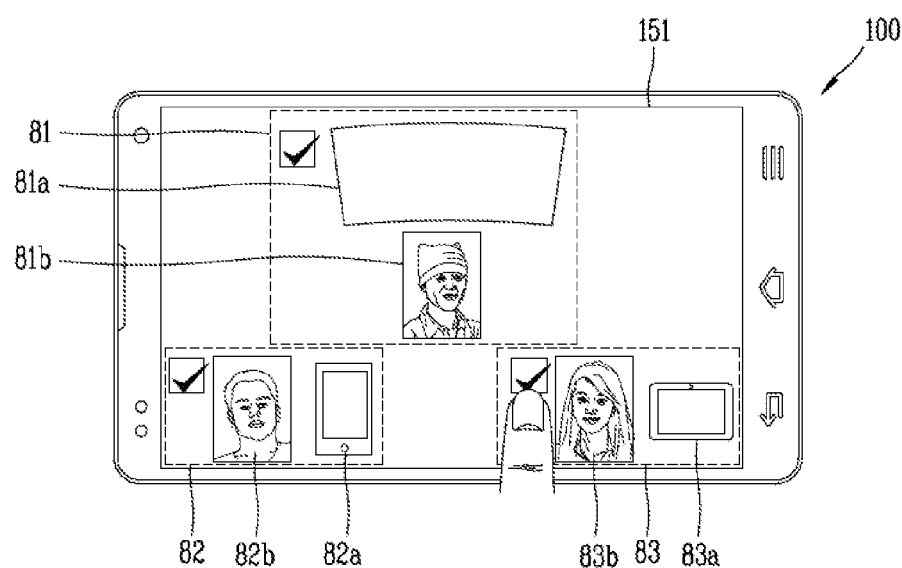
FIGS. 15A through 15E are conceptual views illustrating the flow chart of FIG. 14.

For example, referring to FIG. 15A, when the apparatus connection mode is entered, identification images 81, 82, and 83 of connectable apparatuses within the vehicle are displayed on the display unit 151. Here, the identification images 81, 82, and 83 may include thumbnail images 81a, 82a, and 83a, and user images 81b, 82b, and 83b. When the identification images of the connectable video display apparatuses are displayed, and when the user (or the driver) touches an identification image of a video display apparatus 200 desired to be connected, 'v' is marked in a check box thereof, and the controller 180 connects the corresponding apparatus to the mobile terminal 180 body.

Meanwhile, the controller 180 can display the identification images in consideration of a relative position of the connectable in-vehicle video display apparatus to help the user select. Also, as described above, 'v' may be marked in an identification image selected according to a user input as described above.

In this instance, a relative position of the connectable in-vehicle video display apparatus may be estimated based on signal strength using a wireless line sharer (for example, an access point (AP)) provided in the vehicle. For example, referring to FIG. 15A, when the connectable in-vehicle video display apparatus is positioned in the front seat of the vehicle, on identification image thereof may be displayed in an upper region of the display unit 151, and when the connectable in-vehicle video display apparatus is positioned in the back seat of the vehicle, an identification image thereof may be displayed in a lower region of the display unit 151. Also, an image of the vehicle may be displayed on the display unit 151 and an image of the connectable in-vehicle video display apparatus may be displayed thereon in consideration of a position within the vehicle.

Further, representation and selection of a connectable in-vehicle video display apparatus may be performed by the first video display apparatus (for example, a vehicle head unit) within the vehicle or may be performed by the second video display apparatus (for example, a back seat display apparatus or a mobile terminal of a fellow passenger) within the vehicle.

When the mobile terminal 100 and the in-vehicle video display apparatus 200 are connected and a first image (for example, an image of a front visual field of the vehicle) is output to the first video display apparatus 200 and a second image (for example, a Web page screen) is output to the display unit 151 of the mobile terminal 100 (S703), the controller 180 can detect a change in the driver's eyes through a camera provided in the vehicle and/or in the mobile terminal 180 body (S704).

In more detail, the user tracking unit 120 of the mobile terminal 100 can detect a position to which the driver's eyes are fixed, by analyzing an image of the driver captured based on the display of the first video display apparatus through a first camera and an image captured based on the display unit 151 of the body of the mobile terminal 180 through a second camera.

When a pre-set voice command (for example 'share') is input when the driver's eyes are fixed to a specific screen, the controller 180 can enter the video sharing mode (S705). Entering the video sharing mode may be performed by a pre-set voice command, gesture input, or key input.

Figure 15B:
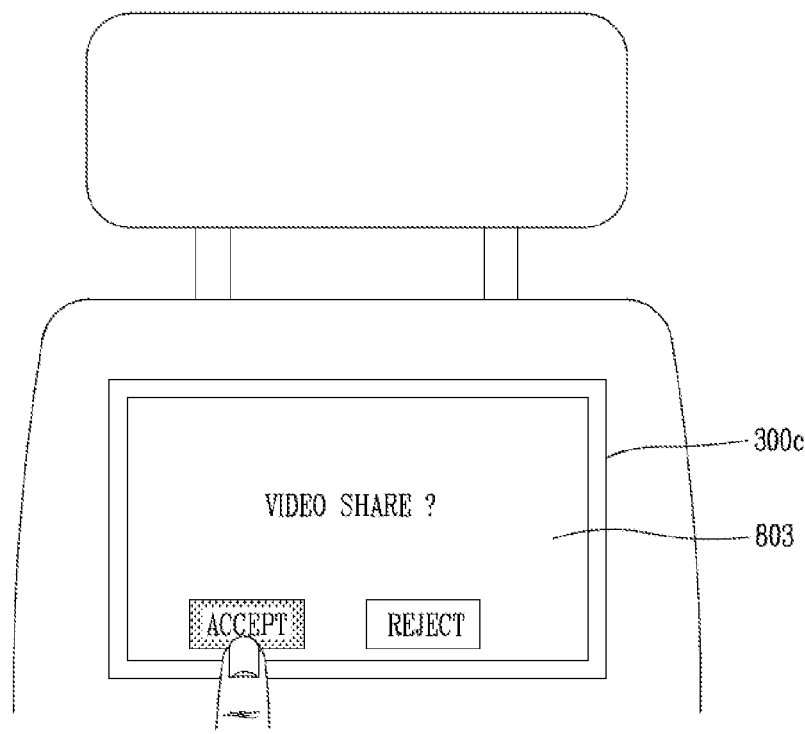

When the video sharing mode is entered, the controller 180 transmits the screen corresponding to the detected driver's eyes to a different apparatus, namely, to the second video display apparatus in real time (S706). In this instance, before the screen corresponding to the detected driver's eyes is displayed on the second video display apparatus, the controller 180 can transmit a message inquiring whether to accept video sharing to the second video display apparatus. Then, a message inquiring whether to accept video sharing is popped up in the display of the second video display apparatus as illustrated in FIG. 15B. Then, the user of the second video display apparatus applies a touch input to any one of an 'accept' icon and a 'reject' icon displayed in the pop-up window, and the second video display apparatus transmits a signal corresponding to the touch input to the mobile terminal 100.

When the sharing accept signal (or a response signal) is received from the second video display apparatus, the controller 180 can transmit screen information corresponding to the position to which the driver's eyes are fixed, to a video display apparatus corresponding to an identification image selected from an apparatus connection mode screen. Here, when a plurality of identification images are selected, the controller 180 simultaneously transmits the screen information to the plurality of video display apparatuses corresponding thereto.

Figure 15C:
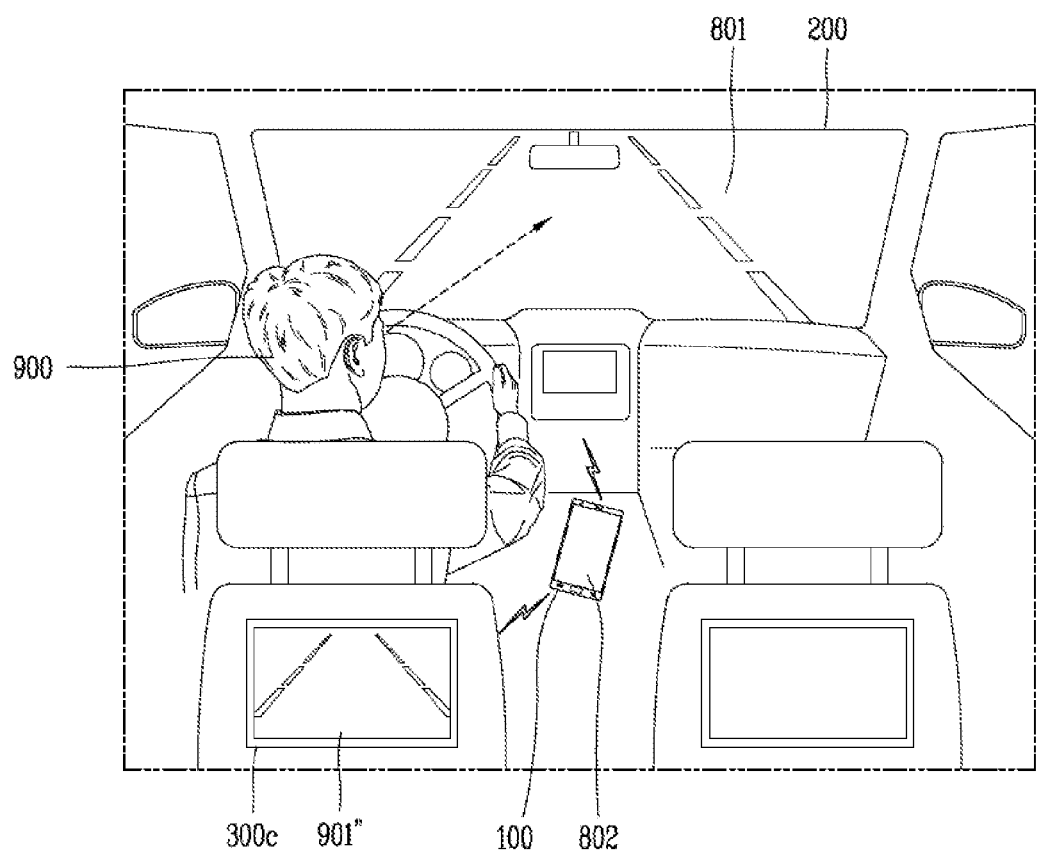

For example, as illustrated in FIG. 15C, when the driver 900 keeps his or her eyes on the front side through the front window 200, while driving the vehicle, and when the video sharing mode is entered, the same image 801" of the front visual field is output also to the back seat display 300*c* in real time. Further, an 'indicator' (for example, text indicating 'being transmitted' or a corresponding image) indicating that the image 801 of the front visual field that the driver looks at is received and transmitted to the different connected apparatus 300*c* may be displayed on the display unit 151 of the mobile terminal 100.

Meanwhile, when the driver's eyes are not detected for a pre-set period of time (for example, five seconds or more on the video display apparatus corresponding to the selected identification image, the controller 180 cannot transmit the screen information to the corresponding video display apparatus any longer, whereby an overload of a network is prevented and a transfer rate to a different video display apparatus may be increased.

When the image displayed on the first video display apparatus is shared by the second video display apparatus in real time through the mobile terminal 100, the controller 180 can receive an updated image including a predetermined input from the second video display apparatus (S707).

When the updated image is received, the controller 180 transmits a message inquiring whether to accept video sharing to the apparatus which has requested video sharing initially, namely, to the first video display apparatus (S708). When a response signal (or a sharing accept signal) is received from the first video display apparatus, the controller 180 transmits the updated image received from the second video display apparatus, to the first video display apparatus (S709).

Here, when the first video display apparatus is a vehicle head unit disposed in the driver's seat, a message inquiring whether to accept video sharing may be output by voice or may not be output, in order not to interfere with the driver's driving. Also, when a sharing accept signal is not received from the driver, it may be considered that video sharing has been rejected, and the updated image may not be displayed.

Meanwhile, the foregoing sequential process may be performed simultaneously when the second video display apparatus performs a predetermined input to the shared image. Here, the predetermined input may refer to directly drawing or adding a line, text, or an image to at least one region or a specific object of the shared image transmitted from the first video display apparatus or the mobile terminal 100.

Figure 15D:
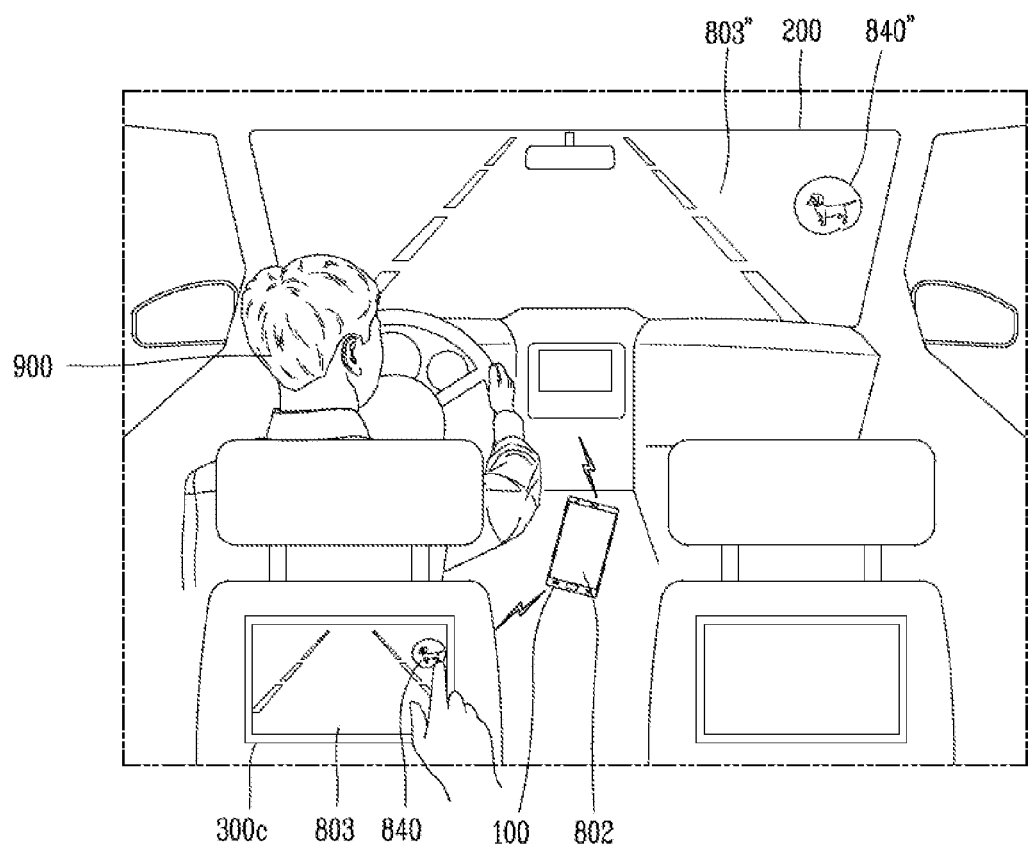

For example, referring to FIG. 15D, when an image of a front visual field displayed on the front window 200 of the vehicle that the driver looks at is shared in the back seat display apparatus 300*c* in real time, and when a fellow passenger present in the back seat draws a line 840 in a specific object (for example, a puppy that passes the way) included in the shared image, such an updated image 803 is displayed with the same line 840" on the front window 200 of the vehicle in real time through the mobile terminal 100 (803").

In another example, after corrected contents is input to the second video display apparatus and the updated image is generated by an input complete signal, it may be transmitted to the first video display apparatus through the mobile terminal 100. Thus, the driver may be induced to see the object with the drawn line.

Also, although the updated image is displayed on the first video display apparatus, if it interferes with the driver's driving, a previous image may be returned through a pre-determined control command. For example, when an updated image is displayed in the display (for example, the front window of the vehicle) of the first video display apparatus, and when the driver shouts or speaks a pre-set voice command "delete", the mobile terminal 100 can stop transmitting the updated image and display a previous image, namely, the image of the front visual field of the vehicle.

Figure 15E:
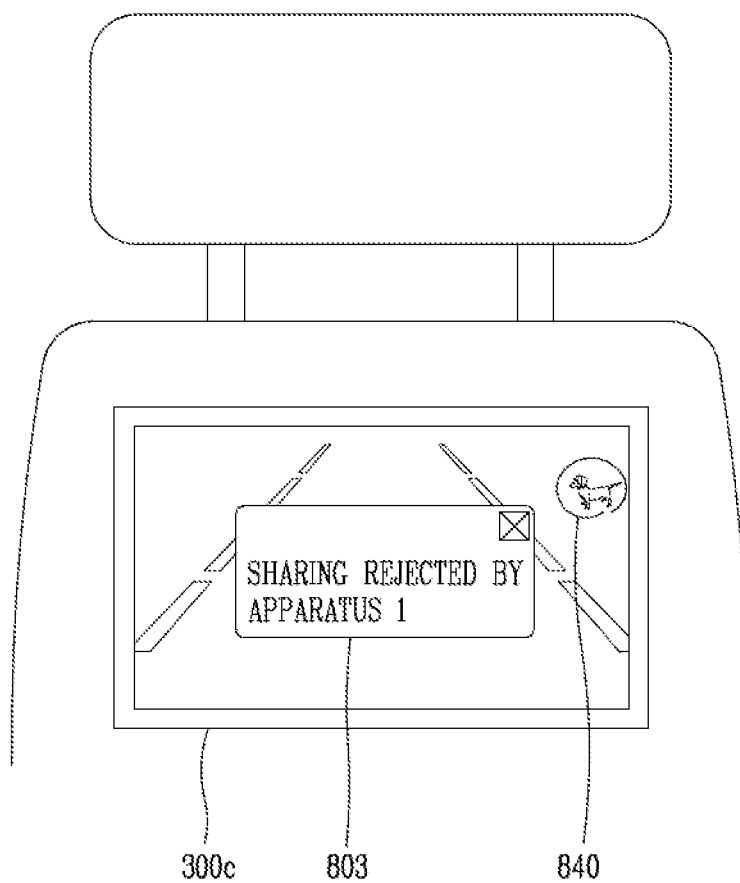

Also, with respect to the request for sharing the updated image, when a video sharing reject signal is received from the first video display apparatus, as illustrated in FIG. 15E, a message pop-up window 803 of "sharing rejected (by first video display apparatus)" may be displayed on the back seat display apparatus 300c (S710). In this instance, the updated image received through the mobile terminal 100 may be output to a different video display apparatus which has accepted the sharing request.

Figure 16:
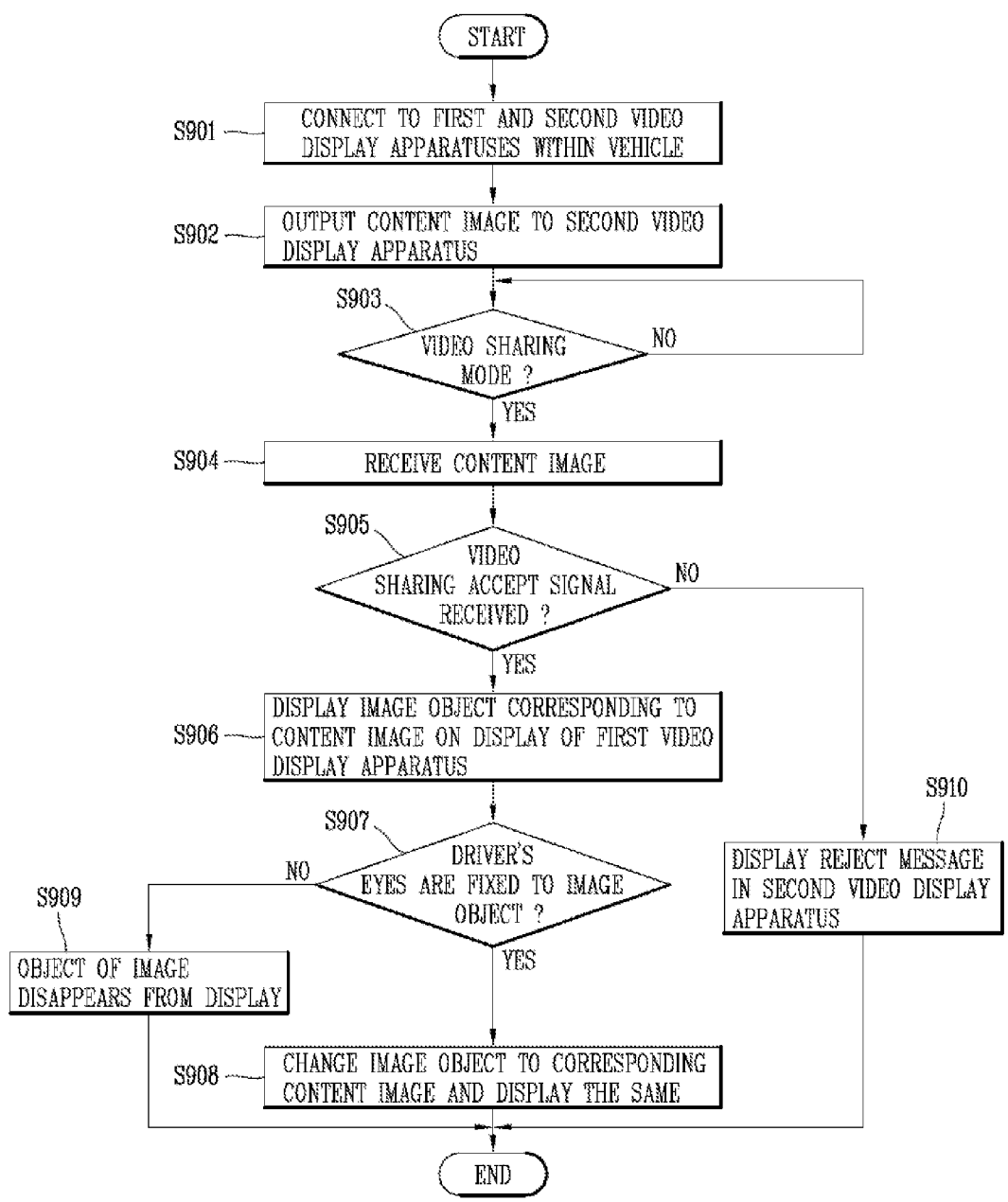
FIG. 16 is a flow chart illustrating a control method of a mobile terminal to allow a fellow passenger to share a provided video according to an embodiment of the present invention.
Figure 17A:
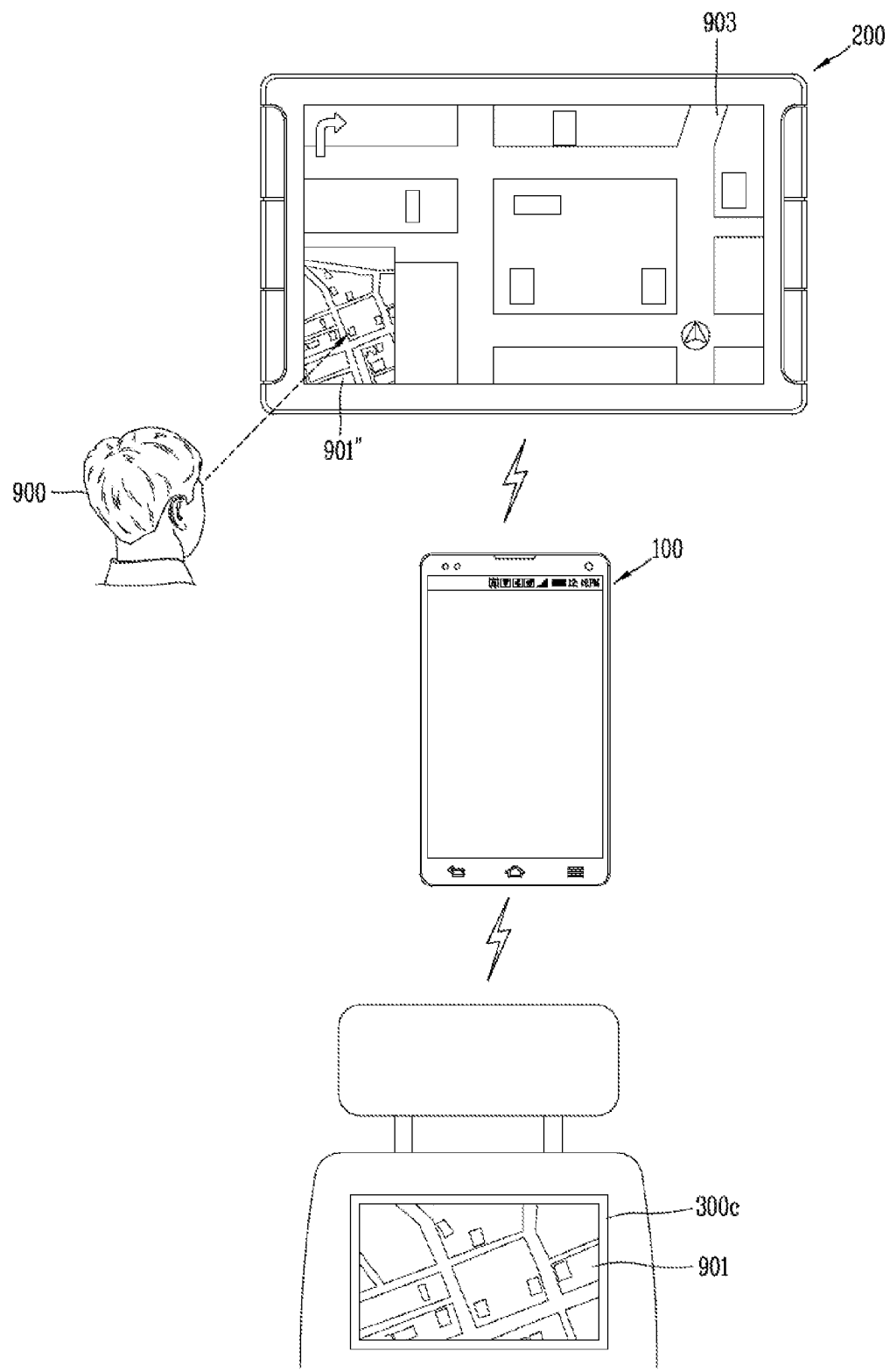
FIGS. 17A through 17C are conceptual views illustrating the flow chart of FIG. 16.
Figure 17B:
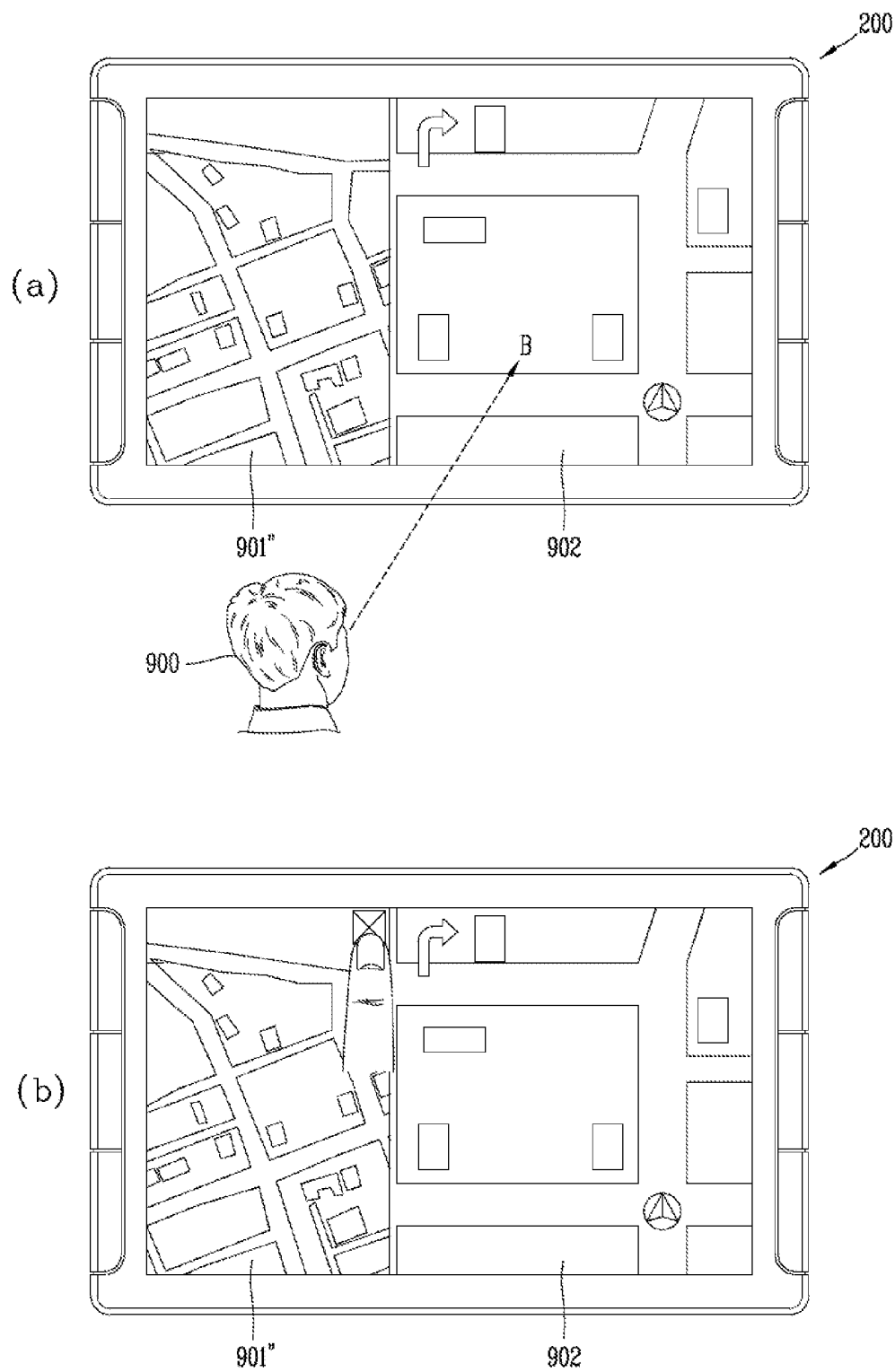
Figure 17C:
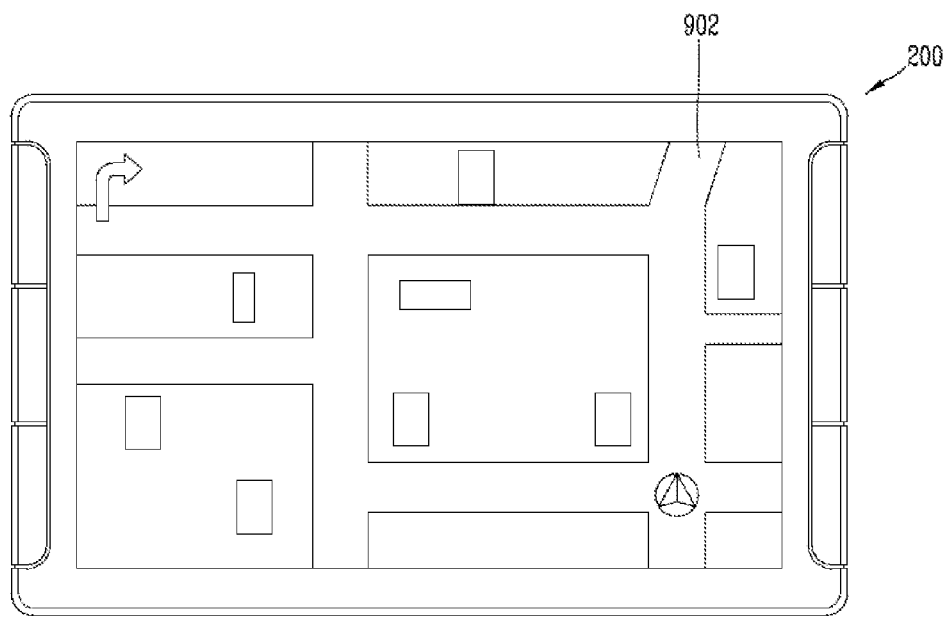
Figure 18A:
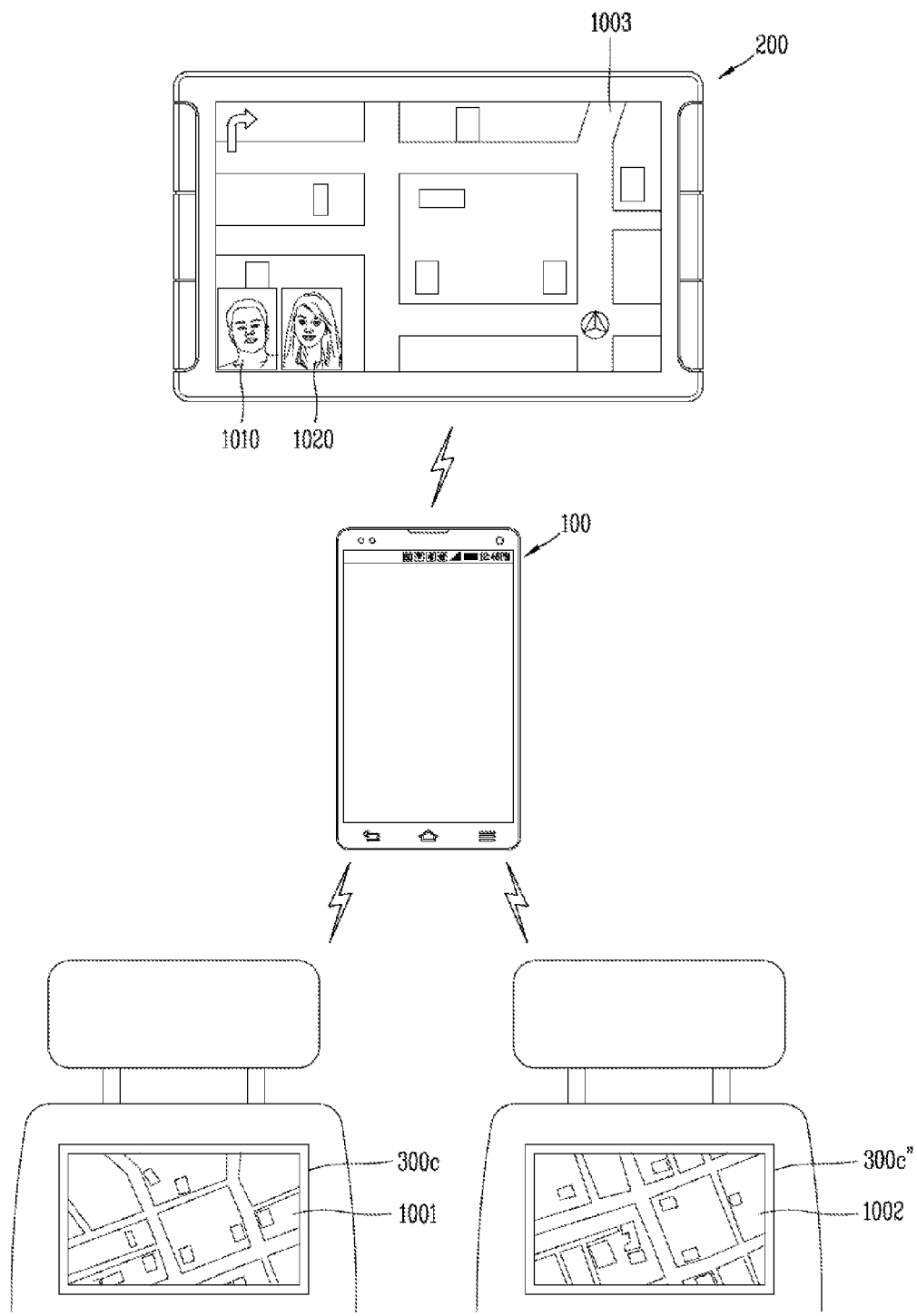
FIGS. 18A and 18B are conceptual views illustrating a method for displaying video in an in-vehicle video display apparatus when there are requests to share video from a plurality of video display apparatuses according to an embodiment of the present invention.
Figure 18B:
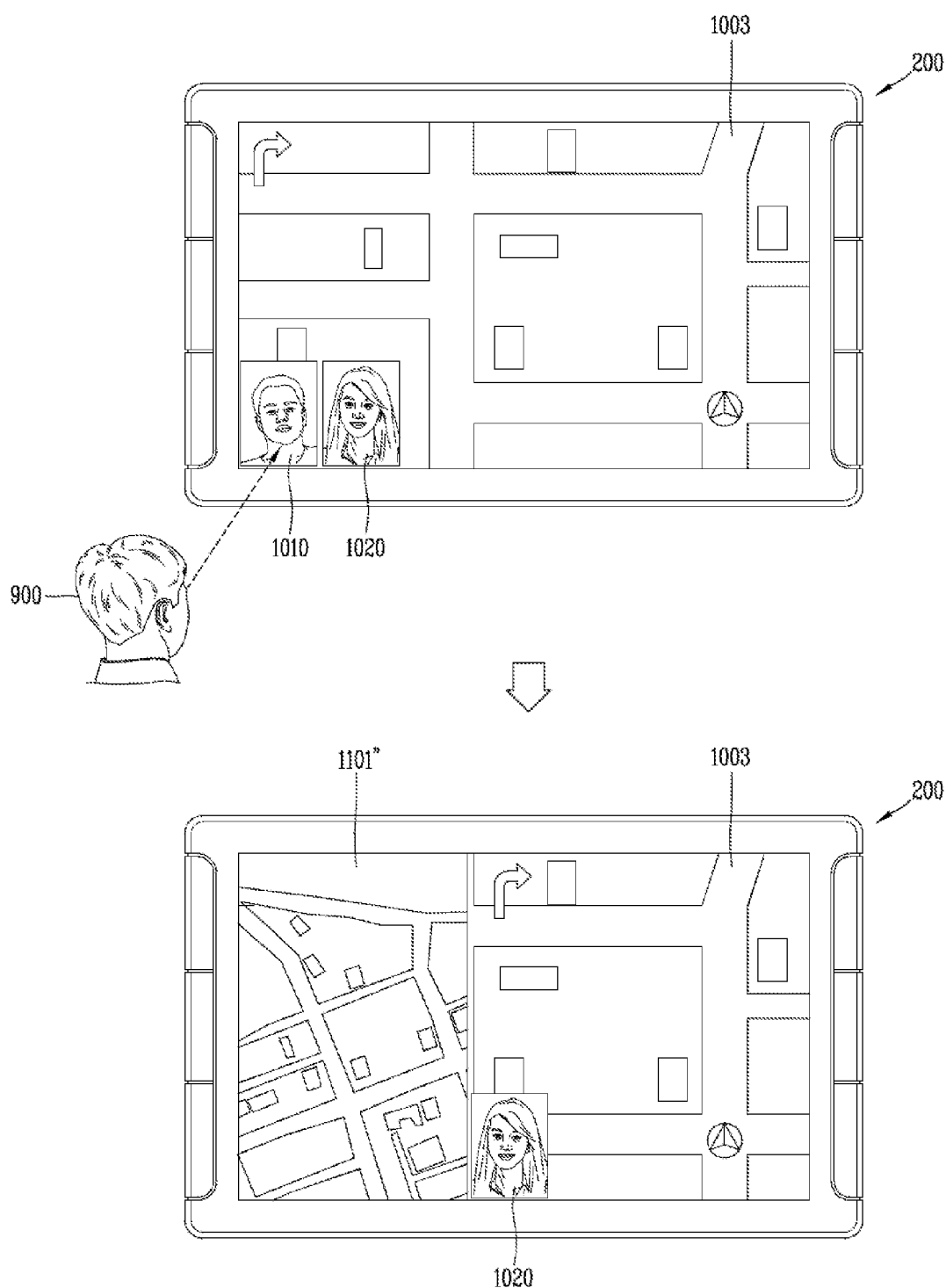

Hereinafter, a control method of a mobile terminal to share an image that a fellow passenger of the vehicle views in the 'connected car' state will be described with reference to FIGS. 16 through 18B. In particular, FIG. 16 is a flow chart illustrating a control method of a mobile terminal to allow a fellow passenger to share a provided video according to an embodiment of the present invention, FIGS. 17A through 17C are conceptual views illustrating the flow chart of FIG. 16, and FIGS. 18A and 18B are conceptual views illustrating a method for displaying video in an in-vehicle video display apparatus when there are requests to share video from a plurality of video display apparatuses according to an embodiment of the present invention.

First, the mobile terminal 100 according to an embodiment of the present invention may be connected to a plurality of video display apparatuses within a vehicle, namely, the first and second video display apparatuses (S901). For example, the mobile terminal 100 and the in-vehicle video display apparatus 200 may be wirelessly connected through a Wi-Fi transceiver or a Bluetooth transceiver (However, the present invention is not limited thereto and a wired connection may be made according to an environment).

As discussed above, the first video display apparatus may be a vehicle head unit disposed in the front seat of the vehicle or a projector that may project an image to the front window of the vehicle (a display of the first video display apparatus). Also, the second video display apparatus may be a display apparatus disposed in the back seat of the vehicle or a mobile terminal of the fellow passenger within the vehicle.

Also, as mentioned above, a connection between the mobile terminal 100 and the video display apparatuses refers to a 'connected car' state in which a mobile device and an infotainment system according to a phone to car (P2C) service standard stipulated by the car connectivity consortium (CCC). In the 'connected car' state, the mobile terminal 100 and the in-vehicle video display apparatus 200 may exchange a screen, a sound, other data, or the like, through the wireless communication unit 110.

Meanwhile, a content image corresponding to a manipulation of the fellow passenger is output to the display of the second video display apparatus (S902). The content image may be an image corresponding to a user's key manipulation or an execution command. For example, the content image may be an executed screen of an application, a video, an image, or the like. Here, for example, the fellow passenger may manipulate the second video display apparatus to execute a map application (or search a Web server) to obtain a search result of a destination or a driving route of a vehicle, and here, map data displaying the search result may be the foregoing content image.

When the predetermined content image is output to the second video display apparatus and the video sharing mode is entered (S903), the controller 180 receives the corresponding content image (for example, map data) from the second video display apparatus (S904). The received content image may be displayed on the display unit 151 or may not be displayed.

In addition, when the sharing request is received from the second video display apparatus, the controller 180 transmits a message inquiring whether to accept video sharing to the first video display apparatus through the wireless communication unit 110. When a response signal, namely, a sharing accept signal, is received from the first video display apparatus (S905), the controller 180 can display an image object corresponding to the received content image on the display of the first video display apparatus (S906).

FIG. 17A shows an example in which an image object corresponding to a content image is displayed in a lower end region of the display of the vehicle head unit, but in another example, the image object may be displayed in a position to which the driver's eyes are fixed. Also, in another embodiment, an image object corresponding to a content image may be displayed in a region that does not cover a front visual field of the vehicle.

Here, the image object corresponding to the content image may include any one of a representative image representing a corresponding content image and a user image of the second video display apparatus, or may include both of them. Also, the representative image may be any one of a thumbnail image of the corresponding content image, an icon of an application, and a preview screen.

Meanwhile, in operation S905, when a signal rejecting sharing of the content image is received from the first video display apparatus, the controller 180 transmits a sharing reject message to the second video display apparatus (S910). Accordingly, a corresponding message pop-up window is displayed on the display of the second video display apparatus. In this instance, the message pop-up window may include information regarding an apparatus which has rejected the sharing. Also, if the vehicle is currently running (namely, when a vehicle running stop signal is not input), such a sharing reject signal may be automatically generated to ensure safe driving.

When the content image is shared in the first video display apparatus (for example, the vehicle head unit), the driver may check and control the corresponding content image through eye-tracking. In more detail, the mobile terminal 100 can analyze an image obtained through a camera thereof to determine a point or a region of the display of the first video display apparatus to which the driver's eyes are fixed (S907).

When the driver's eyes are fixed to the image object corresponding to the content image for a pre-set period of time (for example, for two seconds or more) according to the determination result, the controller 180 can change the display image object into a corresponding content image (for example, map data transmitted from the back seat display apparatus of the vehicle) and display the same (S908).

For example, referring to FIG. 17A, when the fellow passenger searches a driving route of a destination through the back seat display apparatus 300c of the vehicle and requests sharing through a predetermined key or a predetermined user input (including a pre-set voice command and a gesture input), a corresponding image 901 is first received by the mobile terminal 100. When the driver accepts the sharing request, an image object 901" corresponding to the image 901, namely, a thumbnail image, is displayed on the display of the vehicle head unit 200.

When the driver 900 gazes at the image object 901" displayed on the display for a predetermined period of time, the mobile terminal 100 displays a content image 901"" obtained by magnifying the corresponding thumbnail image on the display. Namely, the driver may check the shared content image through eye-tracking. Also, the controller 180 can control the content image displayed on the display of the first video display apparatus based on the driver's eyes. Namely, a control function such as magnifying/reducing, moving, removing, retransmission, or the like, of the displayed content image may be controlled through eye-tracking of the driver.

For example, referring to (a) of FIG. 17B, when map data transmitted from the back seat display apparatus 300c is displayed in a first region of the display of the vehicle head unit 200, when the driver gazes at a second region discriminated from the first region for a predetermined period of time, the content image shared with the back seat display apparatus 300c may disappear as illustrated in FIG. 17C.

In another embodiment, as illustrated in (b) of FIG. 17B, the corresponding content image may disappear from the display according to a touch input. Accordingly, only an existing road guidance image 903 is displayed on the display of the vehicle head unit 200. Also, in another embodiment, when a pre-set touch is applied to the corresponding content image, the image may be zoomed in, zoomed out, or scaled up or scaled down so as to be displayed.

Meanwhile, when the driver's eyes are outside of the image object corresponding to the content image for a pre-set period of time according to the determination result in operation S907, the controller 180 can stop displaying the corresponding object on the display (S909).

According to an embodiment of the present invention, a video sharing request may be made by a plurality of video display apparatuses simultaneously or may be made at predetermined time intervals.

In this instance, a first screen 1001 corresponding to an image (for example, first map data) received from the second video display apparatus (for example, the back seat display apparatus of the vehicle or the mobile terminal of the fellow passenger) 300c and a second screen 1002 corresponding to an image (for example, second map data) received from a third video display apparatus (for example, a different back seat display apparatus of the vehicle or the mobile terminal of the fellow passenger) 300c'' may be displayed on the display of the first video display apparatus (for example the vehicle head unit) 200 which has accepted the video sharing, as illustrated in FIG. 18A.

Here, the first and second screens may include first and second objects 101 and 102 and include identification information of each of the video display apparatuses, user information, and/or position information within the vehicle. FIG. 18A illustrates an example in which the screen 1003 on the apparatus 200 includes first and second image objects 1010 and 1020 include user information.

When the first and second image objects 1010 and 1020 are displayed, and when the driver's eyes are fixed to a displayed specific image object, for example, the first image object 1010 in FIG. 18B, for a pre-set period of time, the controller 180 displays a content image corresponding to the first image object, namely, first map data 1101" on the display of the vehicle head unit 200. As illustrated, the second image object may be moved to be adjacent to the boundary of the first map data 1101" so as to be displayed. Also, in another example, the second image object and/or a content image corresponding to the second image object may disappear from the display of the vehicle head unit 200.

Meanwhile, when the driver wants to view both content images corresponding to the first and second image objects, a plurality of screens may be displayed in discriminated regions. Thus, a Java 2 micro-edition platform (J2ME platform) for simultaneously displaying execution results of a plurality of applications may be installed in the first video display apparatus, namely, the vehicle head unit (HUD). The J2ME platform has a multiple virtual machine (MVM) function and a function of simultaneously displaying execution results of a plurality of applications in a single screen.

In more detail, in order to allow an execution result of a first application, namely, a third image and an execution result of a second application, namely, a fourth image, to be displayed only in a required region in the entire screen of the display of the vehicle head unit, sizes of actual frame buffers and virtual frame buffers are adjusted to be different, and when sizes of images to be displayed in the virtual frame buffers are adjusted, the respective virtual frame butlers are integrated into a single virtual frame buffer. The integrated single virtual frame buffer is duplicated to an actual frame buffer so as to be simultaneously displayed on a single screen.

When a plurality of content images, namely, the third and fourth images, are simultaneously displayed in the vehicle head unit, when a first input applied to at least one of the first and second image objects is sensed, the controller 180 can magnify a content image corresponding to the corresponding image object so as to be displayed.

For example, when 'first map data' received from the second video display apparatus is displayed in the first region of the display of the vehicle head unit 200, 'second map data' received from the third video display apparatus is displayed in the second region, and image objects related to the corresponding apparatuses are included in the respective regions, for example, when the driver's eyes are fixed to the first region for a pre-set period of time, the 'first map data' may be displayed in the entire region of the display of the vehicle head unit 200. In this instance, the other images may be executed as a background or may disappear from the display.

Also, when the plurality of content images, namely, the third and fourth images, are simultaneously displayed in the first video display apparatus, namely, in the vehicle head unit, when a second input applied to at least one of the third and fourth images corresponding to the respective image objects is sensed, the controller 181) can remove the corresponding image from the display.

Further, when the image object corresponding to the third image is displayed on the display of the first video display apparatus, when a lock function is activated, the controller 180 can continuously display the third image on the display although the driver's eyes are not fixed thereto. Here, for example, the lock function may be set when a pre-set voice command (for example, shouting of 'keep displaying') of the driver according to voice guidance information is provided. However, the present invention is not limited thereto and the lock function may be set to be executed by a key manipulation of the driver or a gesture input.

Figure 19A:
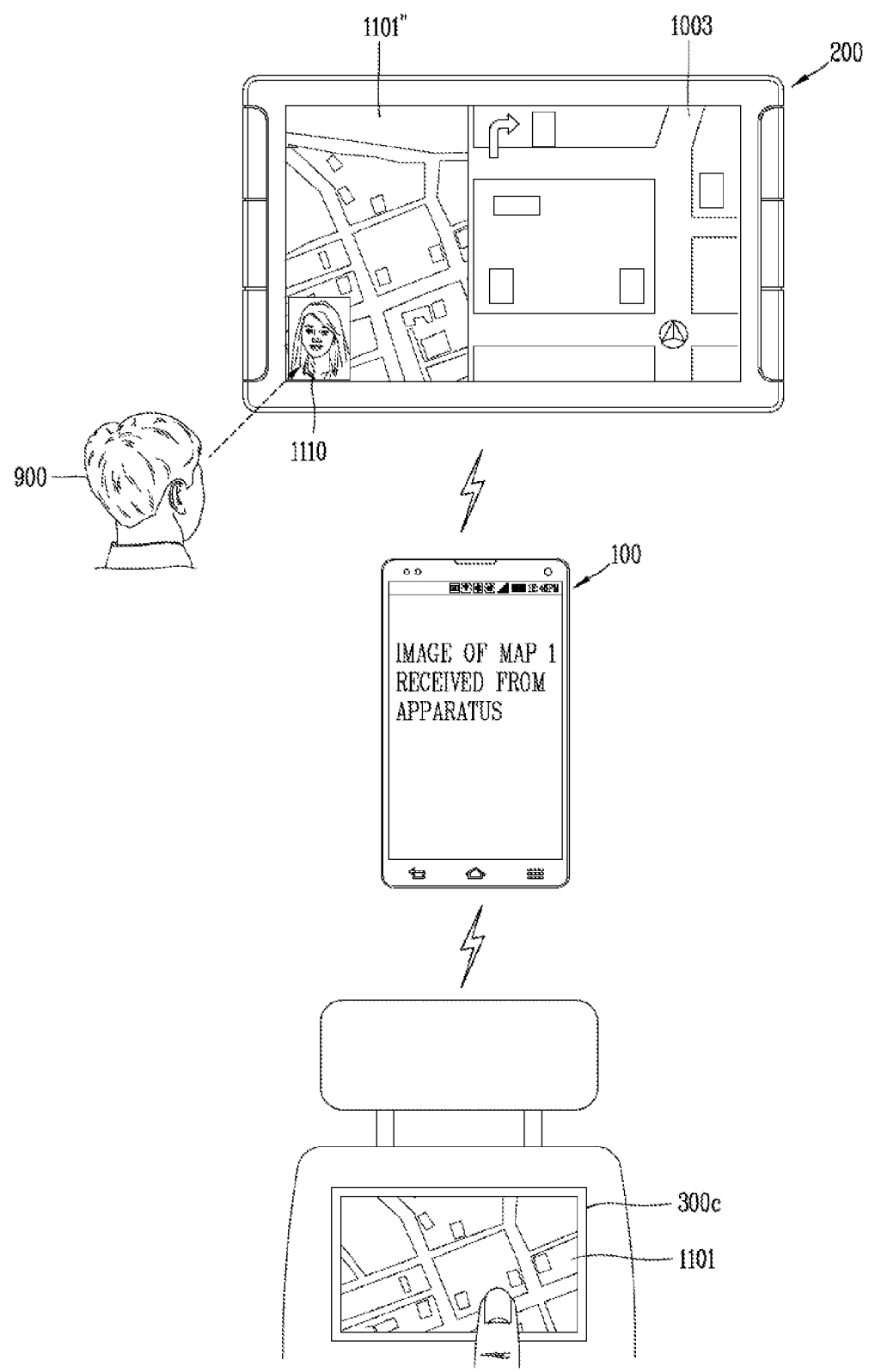
Figure 19B:
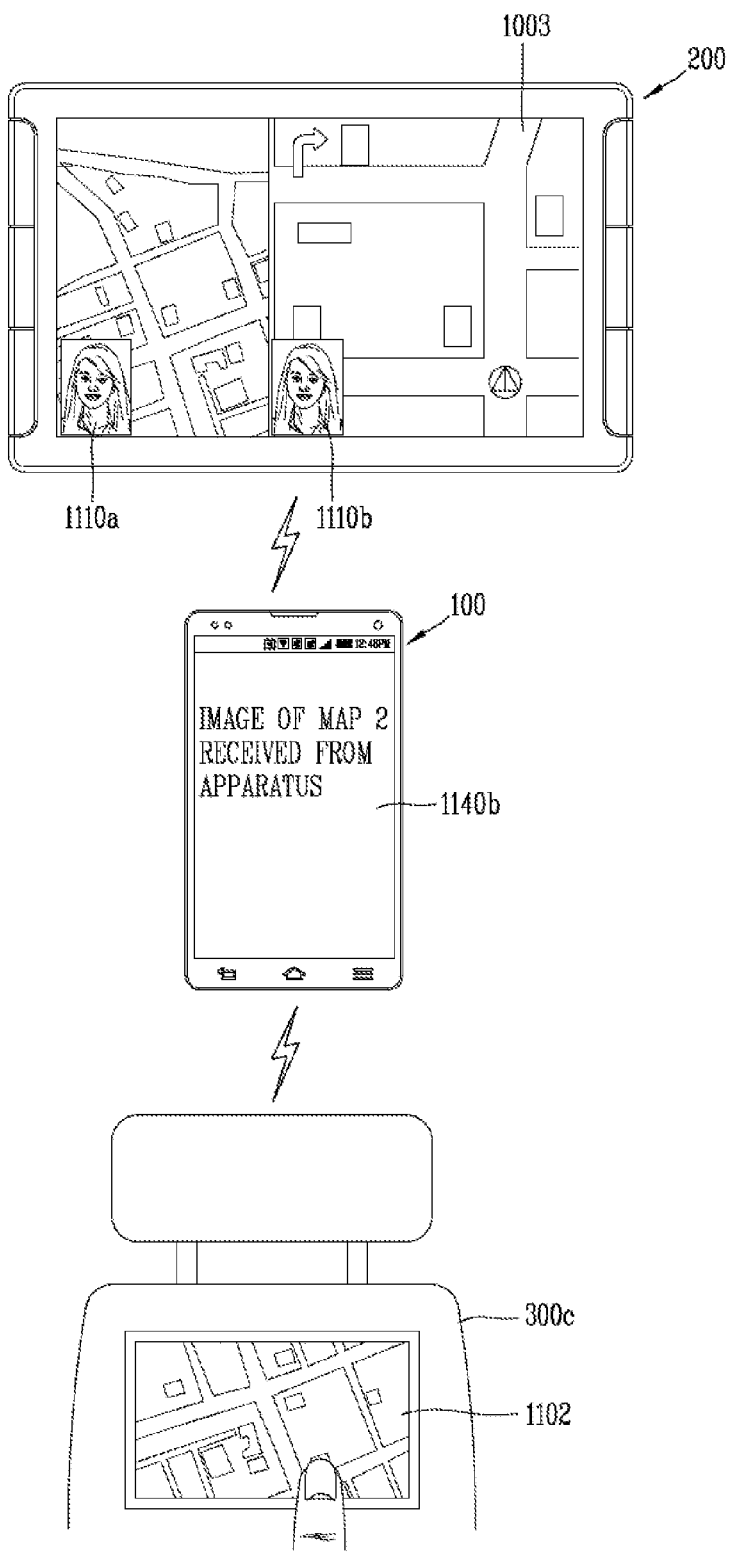

FIGS. 19A through 19C are conceptual views illustrating a method for displaying video in an in-vehicle video display apparatus when there is a request to share new video from the same video display apparatus according to an embodiment of the present invention.

First, referring to FIG. 19A, when a fellow passenger of the vehicle searches a driving route of a destination through the back seat display apparatus 300c and requests sharing from the driver through a predetermined key or a predetermined user input (including a pre-set voice command and a gesture input), the corresponding image 1101 is first received by the mobile terminal 100. In this instance, as illustrated, a message 'map 1 image is received from apparatus (back seat display apparatus)' may be output to the display unit 151 of the mobile terminal. When the driver accepts the sharing request, an image object 1110 corresponding to the image 1101, namely, a user image, is displayed in a region of the display of the vehicle head unit 200.

When the driver gazes at the image object 1110 displayed on the display for a predetermined period of time, a content image corresponding to the image object, namely, first map data, is displayed. In this instance, an existing displayed road guidance image 1003 is scaled down and continuously displayed in a region discriminated from the first map data or may be executed in a background.

In this state, when request for sharing a different content image, is received from the same video display apparatus, namely, from the back seat display apparatus 300*c* of the vehicle, the controller 180 can pop up a notification message corresponding to the request for sharing a new image in a region of the display of the vehicle head unit 200. Alternatively, as illustrated in FIG. 19B, a message 'map 2 image is received from apparatus (back seat display apparatus)' may be output to the display unit 151 of the mobile terminal 100 and an image object 1110*b* corresponding to the display apparatus may be displayed on the display of the vehicle head unit 200.

When a request for sharing an updated image or a different image (hereinafter, referred to as a 'new image') is received at predetermined time intervals from the same display apparatus and a sharing accept signal is received, the controller 180 can output a new image 1102" to an existing image 1101" in an overlaid manner as illustrated in (a) of FIG. 19C or display the new image 1102" and the existing image 1101" in different regions as illustrated in (b) of FIG. 19C.

Meanwhile, when a sharing reject signal is received with respect to the request for sharing a new image, the controller 180 can output a message indicating that sharing request has been rejected. Also, in the foregoing, embodiments, map data related to a destination or a stop of the vehicle is described as a content image, for example, but the present invention is not limited thereto and applied to when the in-vehicle video display apparatus shares information received from a predetermined, server, for example, traffic information, with a different video display apparatus.

As described above, in the mobile terminal and the control method thereof according to embodiments of the present invention, since a screen corresponding to a previous driving viewing angle is displayed together on a display corresponding to a current driving viewing angle according to a change in driver's eyes while a vehicle is running, the driver may safely drive the vehicle and driver convenience may be enhanced.

Also, by controlling a display of an in-vehicle video display apparatus according to a natural change in driver's eyes through a mobile terminal, the driver does not need to perform inputting while driving a vehicle. In addition, a fellow passenger may share an image that the driver looks it and the driver may check information related to a driving route searched by the fellow passenger, through eye-tracking, distraction of the driver may be minimized, ensuring safe driving, and the driver ma be provided with customized traffic information.

In the embodiments of the present invention, the foregoing method may be implemented as codes that can be read by a processor in a program-recorded medium. The processor-readable medium may include any types of recording devices in which data that can be read by a computer system is stored. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The mobile terminal according to the embodiments of the present invention is not limited in its application of the configurations and methods, but the entirety or a portion of the embodiments can be selectively combined to be configured into various modifications.

As the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
   a terminal body;
   a display unit;
   a wireless communication unit configured to be wirelessly connected to an in-vehicle video display apparatus for a vehicle; and
   a controller configured to:
   detect a directional change of a driver's eyes from a first display to a second display included in the in-vehicle video display apparatus, and
   control the second display to display at least a portion of a first screen displayed on the first display, in response to the detected directional change of the driver's eyes from the first display to the second display,
   wherein the portion of the first screen displayed on the first display corresponds to a front visual field of the vehicle, and
   wherein the second display displays the portion of the first screen overlapping with a second screen corresponding to a side visual field of the vehicle or a rear visual field of the vehicle.

2. The mobile terminal of claim 1, wherein the controller is further configured to detect the directional change of the driver's eyes based on a plurality of cameras detachably disposed in a vehicle.

3. The mobile terminal of claim 1, wherein the controller is further configured to:
   extract a partial image from the first screen to which the driver's eyes were fixed, and
   display the extracted partial screen in a region of the second display.

4. The mobile terminal of claim 1, wherein the controller is further configured to:
   request transmission of the first screen displayed on the first display from the in-vehicle video display apparatus in real time, and
   control the second display to display the first screen received according to the request in a region of the second display in real time.

5. The mobile terminal of claim 1, wherein the controller is further configured to:
   detect movement of the driver's eyes from the second display to the first display,
   control the second display to stop displaying the first screen on the region of the second display, and
   control the first display to display at least a portion of the second screen displayed on the second display on a region of the first display.

6. The mobile terminal of claim 1, wherein the controller is further configured to detect movement of the driver's eyes from the first display to the display unit of the mobile terminal, and display on the display unit of the mobile terminal at least a portion of the first screen displayed on the first display, and wherein the portion of the first screen displayed on the first display includes an image of a traffic light within the front visual field of the vehicle.

7. The mobile terminal of claim 1, wherein the controller is further configured to:

subsequent to detection of the directional change of the driver's eyes from the first display to the second display, detect movement of the driver's eyes from the second display to a third display, control the second display to stop displaying the portion of the first screen, and control the third display to display the portion of the first screen overlapping with a third screen corresponding to a side visual field of the vehicle or a rear visual field of the vehicle, and wherein the third screen is different than the second screen displayed on the second diplay.

8. The mobile terminal of claim 1, wherein the controller is further configured to:

detect movement of the driver's eyes from the first display to the display unit of the mobile terminal, and display on the display unit of the mobile terminal at least a portion of the first screen displayed on the first display.

9. The mobile terminal of claim 8, wherein when an input applied to the first screen output on the display unit of the mobile terminal in a pre-set direction is sensed, the controller is further configured to change an output range of the first screen to correspond to the input.

10. The mobile terminal of claim 8, wherein when an input applied to the first screen output on the display unit of the mobile terminal in a pre-set direction is sensed, the controller is further configured to display a screen displayed on a different display of the connected in-vehicle video display apparatus together with the first screen.

11. The mobile terminal of claim 8, wherein when the driver's eyes to the display unit are not sensed for a pre-set period of time, the controller is further configured to:

stop displaying the first screen on the display unit of the mobile terminal, and display an indicator icon for re-displaying the first screen to a region of the display unit of the mobile terminal.

12. The mobile terminal of claim 8, wherein the controller is further configured to only display said at least the portion of the first screen to a region of the display unit when a vehicle running stop signal is received.

13. The mobile terminal of claim 12, wherein the vehicle running stop signal corresponds to a stop operating state of a traffic light included in an image obtained by a front camera within the vehicle.

14. The mobile terminal of claim 13, wherein when the stop operating state of the traffic light is changed to a go operating state, the controller is further configured to determine that a vehicle running resume signal has been input, and display a warning notification on the display unit of the mobile terminal.

15. The mobile terminal of claim 14, wherein the warning notification displayed on the display unit is an image of the traffic light.

* * * * *